(12) United States Patent
Murray et al.

(10) Patent No.: US 10,616,926 B2
(45) Date of Patent: Apr. 7, 2020

(54) RANDOM ACCESS PROCEDURES IN NEXT GEN NETWORKS

(71) Applicant: CONVIDA WIRELESS, LLC, Wilmington, DE (US)

(72) Inventors: Joseph M. Murray, Schwenksville, PA (US); Pascal M. Adjakple, Great Neck, NY (US); Wei Chen, San Diego, CA (US); Lakshmi R. Iyer, King of Prussia, PA (US); Qian (Emily) Zhang, Basking Ridge, NJ (US); Allan Y. Tsai, Boonton, NJ (US); Guodong Zhang, Syosset, NY (US); Qing Li, Princeton Junction, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/204,922

(22) Filed: Nov. 29, 2018

(65) Prior Publication Data

US 2019/0098672 A1     Mar. 28, 2019

Related U.S. Application Data

(63) Continuation of application No. 15/624,124, filed on Jun. 15, 2017, now Pat. No. 10,182,459.

(Continued)

(51) Int. Cl.
*H04W 74/08* (2009.01)
*H04B 7/08* (2006.01)
(Continued)

(52) U.S. Cl.
CPC ...... *H04W 74/0833* (2013.01); *H04B 7/0695* (2013.01); *H04B 7/088* (2013.01);
(Continued)

(58) Field of Classification Search
CPC .......... H04W 74/0833; H04W 72/046; H04W 72/0413; H04W 72/042; H04W 16/28;
(Continued)

(56) References Cited

U.S. PATENT DOCUMENTS

| 10,182,459 B2* | 1/2019 | Murray ............... H04B 7/0695 |
| 2014/0177607 A1* | 6/2014 | Li ....................... H04B 7/0617 370/336 |
| 2018/0124796 A1* | 5/2018 | Noh ..................... H04B 1/1027 |

FOREIGN PATENT DOCUMENTS

| WO | 2015/147717 A1 | 10/2015 |
| WO | 2016/086144 A1 | 6/2016 |

OTHER PUBLICATIONS

Recommendation ITU-R M.2083-0, IMT Vision—Framework and Overall Objectives of the Future Development of IMT for 2020 and Beyond, M Series, Mobile, Radiodetermination, Amateur and Related Satellite Services, Sep. 2015, 21 pages.

(Continued)

*Primary Examiner* — Afshawn M Towfighi
(74) *Attorney, Agent, or Firm* — BakerHostetler

(57) ABSTRACT

The present application is at leastsed directed to an apparatus including a non-transitory memory including instructions to perform random access in a beam sweeping network having a cell. The network includes a downlink sweeping subframe, an uplink sweeping subframe and a regular sweeping subframe. The apparatus also includes a processor operably coupled to the non-transitory memory. The processor is configured to execute the instructions of selecting an optimal downlink transmission beam transmitted by the cell during the downlink sweeping subframe. The processor is also configured to execute the instructions of determining an optimal downlink reception beam from the optimal downlink transmission beam. The processor is further configured to execute the instructions of determining a random access (Continued)

preamble and a physical random access channel (PRACH) resource via resource selection from the optimal downlink transmission beam.

21 Claims, 53 Drawing Sheets

Related U.S. Application Data

(60) Provisional application No. 62/350,379, filed on Jun. 15, 2016, provisional application No. 62/400,813, filed on Sep. 28, 2016.

(51) Int. Cl.
| | |
|---|---|
| *H04B 7/06* | (2006.01) |
| *H04L 5/00* | (2006.01) |
| *H04B 7/26* | (2006.01) |
| *H04W 72/04* | (2009.01) |
| *H04W 16/28* | (2009.01) |
| *H04B 7/0426* | (2017.01) |
| *H04L 27/26* | (2006.01) |
| *H04W 74/00* | (2009.01) |

(52) U.S. Cl.
CPC ......... *H04B 7/2603* (2013.01); *H04L 5/0023* (2013.01); *H04W 72/046* (2013.01); *H04B 7/043* (2013.01); *H04L 5/0053* (2013.01); *H04L 27/2607* (2013.01); *H04W 16/28* (2013.01); *H04W 72/042* (2013.01); *H04W 72/0413* (2013.01); *H04W 74/008* (2013.01)

(58) Field of Classification Search
CPC ... H04W 74/008; H04B 7/2603; H04B 7/043; H04B 7/088; H04L 5/0053; H04L 27/2607
See application file for complete search history.

(56) References Cited

OTHER PUBLICATIONS

3rd Generation Partnership Project; (3GPP) TSG RAN WG2 Meeting #93bis, R2-162571, Apr. 2016, 3 pages.
3rd Generation Partnership Project; (3GPP) TSG RAN WG1 #85, R1-164013, May 2016, 4 pages.
3rd Generation Partnership Project; (3GPP) TSG RAN Meeting #72, RP-161214, Jun. 2016, 8 pages.
3rd Generation Partnership Project; (3GPP) TS 36.331 V13-0-0, Technical Specification Group Radio Access Network; Evolved Universal Terrestrial Radio Access (E-UTRA); Radio Resource Control (RRC); Protocol Specification (Release 13), Dec. 2015, 507 pages.
3rd Generation Partnership Project; (3GPP) TS 36.321 V13.0.0, Technical Specification Group Radio Access Network; Evolved Universal Terrestrial Radio Access (E-UTRA); Medium Access Control (MAC) Protocol Specification (Release 13), Dec. 2015, 82 pages.
3rd Generation Partnership Project; (3GPP) TS 36.300 V13-3-0, Technical Specification Group Radio Access Network; Evolved Universal Terrestrial Radio Access (E-UTRA) and Evolved Universal Terrestrial Radio Access Network (E-UTAN); Overall Description; Stage 2 (Release 13), Mar. 2016, 295 pages.
3rd Generation Partnership Project; (3GPP) TS 36.213 V13.0.0, Technical Specification Group Radio Access Network; Evolved Universal Terrestrial Radio Access (E-UTRA); Physical Layer Procedures (Release 13), Dec. 2015, 6 pages.
3rd Generation Partnership Project; (3GPP) TS 36.211 V13.0.0, Technical Specification Group Radio Access Network; Evolved Universal Terrestrial Radio Access (E-UTRA); Physical Channels and Modulation (Release 13), Dec. 2015, 141 pages.
3rd Generation Partnership Project; (3GPP) TR 38.913 V0.3.0, Technical Specification Group Radio Access Network; Study on Scenarios and Requirements for Next Generation Access Technologies; (Release 14), Mar. 2016, 30 pages.
3rd Generation Partnership Project; (3GPP) TR 38.804 V0.2.0, Technical Specification Group Radio Access Network; Study on New Radio Access Technology; Radio Interface Protocol Aspects (Release 14), Aug. 2016, 22 pages.
3rd Generation Partnership Project; (3GPP) TR 36.912 V13.0.0, Technical Specification Group Radio Access Network; Feasibility Study for Further Advancements for E-UTRA (LTE-Advanced) (Release 13), Dec. 2015, 62 pages.
3rd Generation Partnership Project; (3GPP) TR 22.891 V1.3.2, Technical Specification Group Services and System Aspects; Feasibility Study on New Services and Markets Technology Enablers; Stage 1 (Release 14), Feb. 2016, 95 pages.
3rd Generation Partnership Project; (3GPP) TS 36.133 V13.2.0, Technical Specification Group Radio Access Network; Evolved Universal Terrestrial Radio Access (E-UTRA); Requirements for support of radio resource management (Release 13), Jan. 2016, 45 pages.
3rd Generation Partnership Project (3GPP), TSG-RAN WG1 Meeting #85, R1-165377, Random Access Principles for New Radio, Nokia, Alcatel-Lucent Shanghai Bell, Nanjing, P.R. China, Apr. 23-27, 2016, 4 pages.
3GPP TSG-RAN WG2 Meeting #94 Nanjing, China, 23-27, Agenda Item 9.4.3.2.4, Samsung, Random Access Procedure in NR, May 2016.

\* cited by examiner

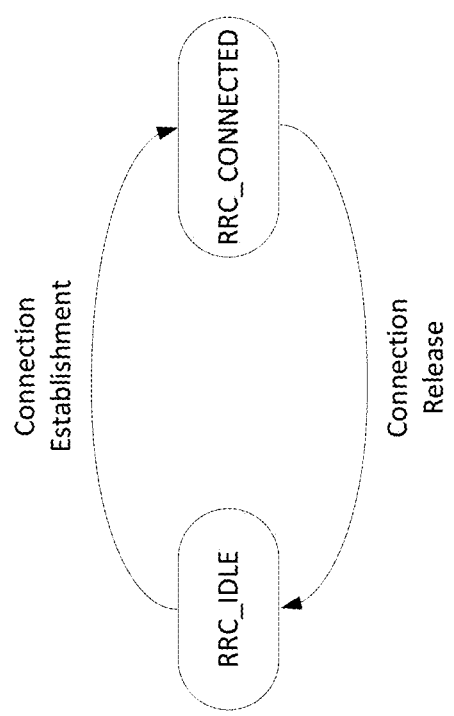

```
-- ASN1START

SweepingSubframe-Config ::=    SEQUENCE {
    subframe
    numSweepingSlots                               INTEGER (0..9),
    numSymbolsPerSlot                              Integer (1..28),
    ulSweepingSubframeOffset    INTEGER (0..9),    Integer (1..28),
    period
    reciprocityIndicator        BOOLEAN            Enumerated (n5, n10, n20, n40, n80),
    ...
}

-- ASN1STOP
```

FIG. 33

```
-- ASN1START

SweepingSubframe-Config ::=     SEQUENCE {
    dlSweepingSubframe              GenericSweepingSubframe-Config,
    ulSweepingSubframe              GenericSweepingSubframe-Config,
    reciprocityIndicator            BOOLEAN
}

GenericSweepingSubframe-Config ::= SEQUENCE {
    subframe                        INTEGER (0..9),
    numSweepingSlots                Integer (1..14),
    numSymbolsPerSlot               Integer (1..14),
    period                          Enumerated (n5, n10, n20, n40, n80)
}

-- ASN1STOP
```

FIG. 34

```
-- ASN1START

MasterInformationBlock ::=     SEQUENCE {
    dl-Bandwidth              ENUMERATED {
                                  n6, n15, n25, n50, n75, n100},
    phich-Config              PHICH-Config,
    systemFrameNumber         BIT STRING (SIZE (8)),
    sweepingSubframe-Config   SweepingSubframe-Config,
    spare                     BIT STRING (SIZE (10))
}

-- ASN1STOP
```

FIG. 35

RANDOM ACCESS PROCEDURES IN NEXT GEN NETWORKS

CROSS-REFERENCE TO RELATED APPLICATIONS

This application is a continuation of U.S. application Ser. No. 15/624,124 filed Jun. 15, 2017, which claims the benefit of priority of U.S. Provisional Application No. 62/350,379 filed Jun. 15, 2016, entitled "Random Access Procedures in Next Gen Networks," and U.S. Provisional Application No. 62/400,813 filed Sep. 28, 2016, entitled "NR Random Access," all of which are incorporated by reference in their entireties herein.

FIELD

The present application is directed to random access procedures on apparatuses.

BACKGROUND

NextGen networks are expected to support a diverse set of use cases including but not limited to mMTC, eMBB UR/LL. Network/RAN slicing is a concept that has been proposed to allow operators to meet the diverse and sometimes conflicting requirements of these use cases. However, legacy procedures such as random access are not designed to support network/RAN slicing architectures. A need exists to develop a new random access procedure optimized for NextGen networks configured for network/RAN slicing.

New Radio (NR) Access Technology is currently being studied to identify and develop technology components for systems operating at frequencies up to 100 GHz. Beamforming is expected to be employed to compensate for the increased path loss in these High Frequency NR (HF-NR) systems. However, the existing random access procedures based on omni-directional or sector-based transmission do not support the functions required for beamforming-based access such as beam sweeping, beam pairing, beam training, etc. A need exists for enhanced random access procedures that support beamforming for NR networks.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to random access procedures in nextgen networks.

In one aspect, an apparatus is described including a non-transitory memory including instructions to perform random access in a beam sweeping network having a cell. The network includes a downlink sweeping subframe, an uplink sweeping subframe and a regular sweeping subframe. The apparatus also includes a processor operably coupled to the non-transitory memory. The processor is configured to execute the instructions of selecting an optimal downlink transmission beam transmitted by the cell during the downlink sweeping subframe. The processor is also configured to execute the instructions of determining an optimal downlink reception beam from the optimal downlink transmission beam. The processor is further configured to execute the instructions of determining a random access preamble and a physical random access channel (PRACH) resource via resource selection from the optimal downlink transmission beam.

In another aspect, an apparatus is described including a non-transitory memory including instructions to perform random access in a network. The apparatus also includes a processor operably coupled to the non-transitory memory and configured to execute the instructions of obtaining configuration parameters for a common physical random access channel (PRACH) resource on the network. The processor is also configured to execute the instructions selecting a preamble from a cell based upon a device type and a service type. The processor is also configured to execute the instructions transmitting, to a node, the selected preamble via the common PRACH resource. The processor is further configured to execute the instructions of monitoring a downlink control channel for random access responses (RAR).

In another aspect, an apparatus is described including a non-transitory memory including instructions to perform random access in a network. The apparatus also includes a processor operably coupled to the non-transitory memory and configured to execute the instructions of obtaining configuration parameters for a slice-specific physical random access channel (PRACH) resource on the network. The processor is also configured to execute the instructions of randomly selecting a preamble from a slice of the network based upon a device type and a service type. The processor is further configured to execute the instructions of transmitting, to a node, the randomly selected preamble via the slice-specific PRACH resource. The processor is even further configured to execute the instructions of monitoring a downlink control channel for a random access response (RAR).

In another aspect, an apparatus is described including a non-transitory memory including instructions to perform random access in a network. The apparatus also includes a processor operably coupled to the non-transitory memory and configured to execute the instructions of selecting a preamble from a cell based upon a device type and a service type. The processor is also configured to execute the instructions of transmitting the selected preamble and an accompanying grantless message. The processor is further configured to execute the instructions of monitoring a downlink control channel for a random access response (RAR). The processor is even further configured to execute the instructions of receiving, from a node, a connection setup message and an uplink grant. The processor is yet even further configured to execute the instructions of transmitting, via the received uplink grant, a status message on a connection.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 2A is a diagram that illustrates an RRC Protocol State Machine.

FIG. 33 is a diagram of a sweeping subframe information element.

FIG. 34 is a diagram of an alternate sweeping subframe information element.

FIG. 35 is a diagram of a NR master information block.

DETAILED DESCRIPTION

Figure 1A:
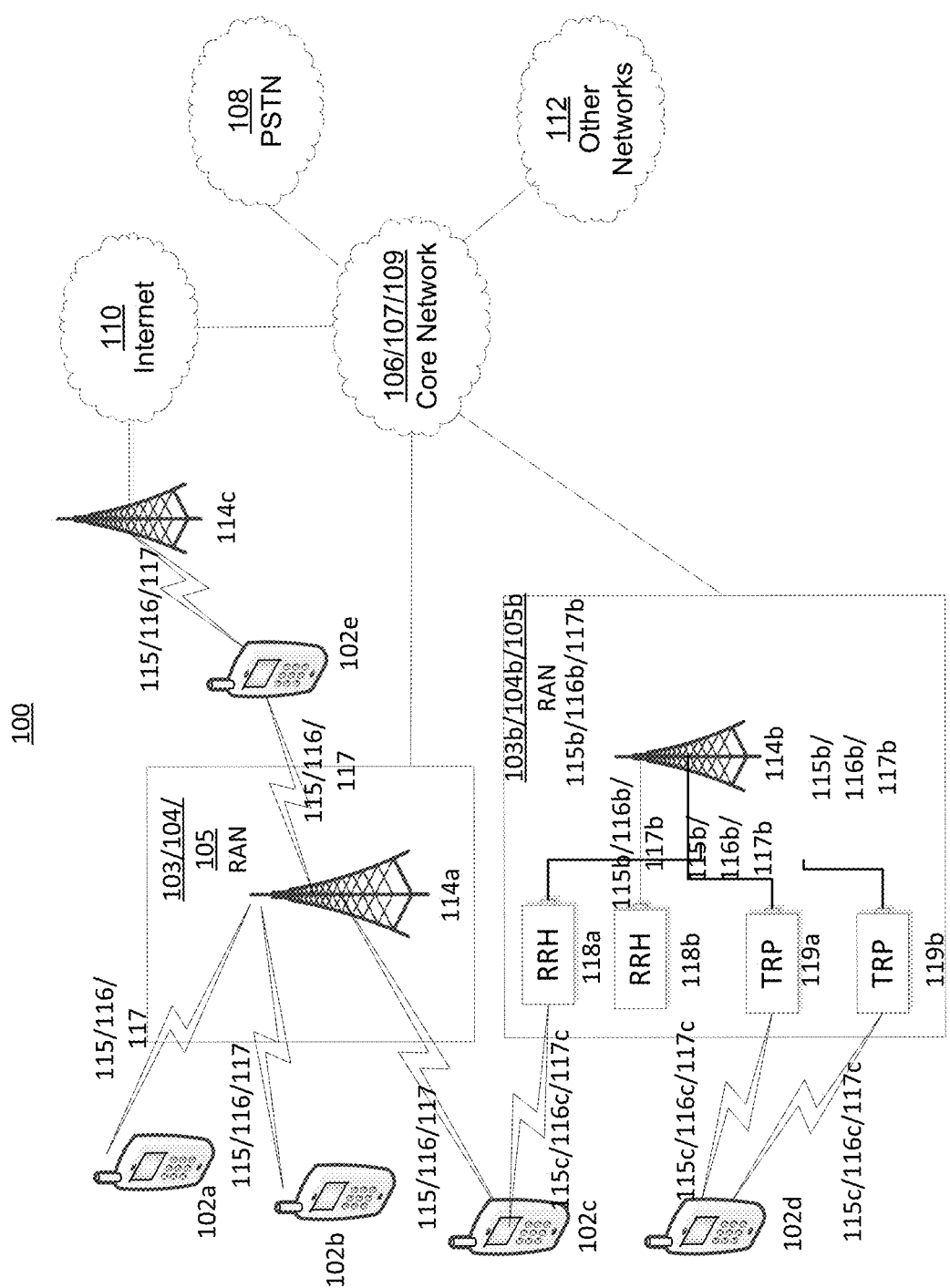
FIG. 1A illustrates an exemplary communications system according to an embodiment of the application.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Abbreviations

Provided below are acronyms for terms and phrases commonly used in this application.
AS=Access Stratum
CDMA=Code Division Multiple Access
CN=Core Network
CMAS=Commercial Mobile Alert System
C-RNTI=Cell Radio-Network Temporary Identifier DL=Downlink
DL-SCH=Downlink Shared Channel
DRX=Discontinuous Reception
EAB=Extended Access Barring
eMBB=enhanced Mobile Broadband
eNB=Evolved Node B
ETWS=Earthquake and Tsunami Warning System
E-UTRA=Evolved Universal Terrestrial Radio Access
E-UTRAN=Evolved Universal Terrestrial Radio Access Network
FFS=For Further Study
GERAN=GSM EDGE Radio Access Network
GSM G=Global System for Mobile communications
IE=Information element
IMT=International Mobile Telecommunications
KPI=Key Performance Indicators
LTE=Long term Evolution
MACM=Medium Access Control
MAC CE=MAC Control Element
MBB=Mobile Broadband
MBMS=Multimedia Broadcast Multicast Service
MCL=Maximum Coupling Loss
MIB=Master Information Block
MME=Mobile Management Entity
MTC=Machine-Type Communications
mMTC=Massive Machine Type Communication
NAS=Non-access Stratum
NR=New RAT
PDCCH=Physical Downlink Control Channel
PHY=Physical Layer
PRACH=Physical Random Access Channel
PUCCH=Physical Uplink Control Channel
QoS=Quality of Service
RACH=Random Access Channel
RAN=Radio Access Network (3GPP)
RAR=Random Access Response
RA-RNTI=Random Access Radio Network Temporary Identifier
RAT=Radio Access Technology
RE=Resource Element
RNTI=Radio Network Temporary Identifier
RRC=Radio Resource Control
SC-PTM=Single Cell Point to Multipoint
SI=System Information
SIB=System Information Block
SMARTER Feasibility Study on New Services and Markets Technology
SR=Scheduling Request
sTAG=Secondary Timing Advance Group
TA=Timing Advance
TDD=Time Division Duplex
TRP=Transmission and Reception Point
TTI=Transmission Time Interval
UE=User Equipment
UpPTS=Uplink Pilot Timeslot
UL=Uplink
UL-SCH=Uplink Shared Channel
UTRAN=Universal Terrestrial Radio Access Network
UR/LL=Ultra Reliable—Low Latency
URLLC=Ultra-Reliable and Low Latency Communications The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

General Architecture

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet an embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
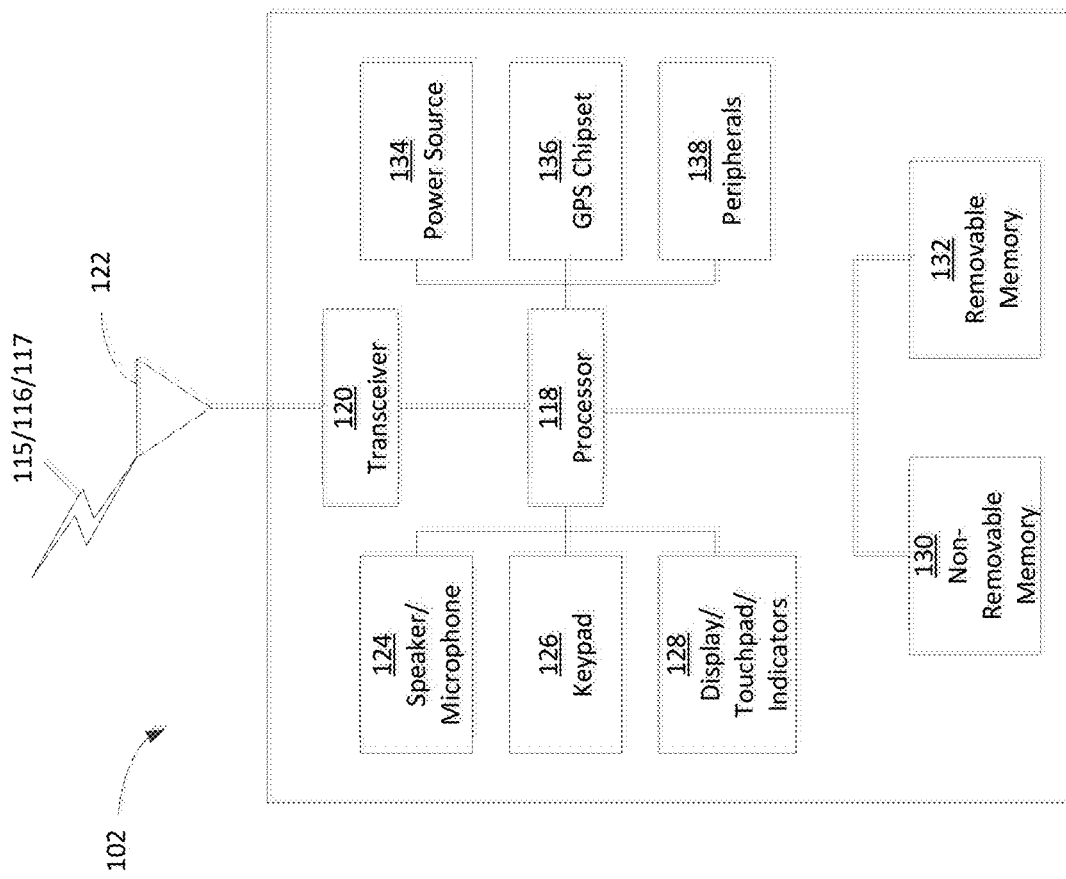
FIG. 1B illustrates an exemplary apparatus configured for wireless communication according to an embodiment of the application.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
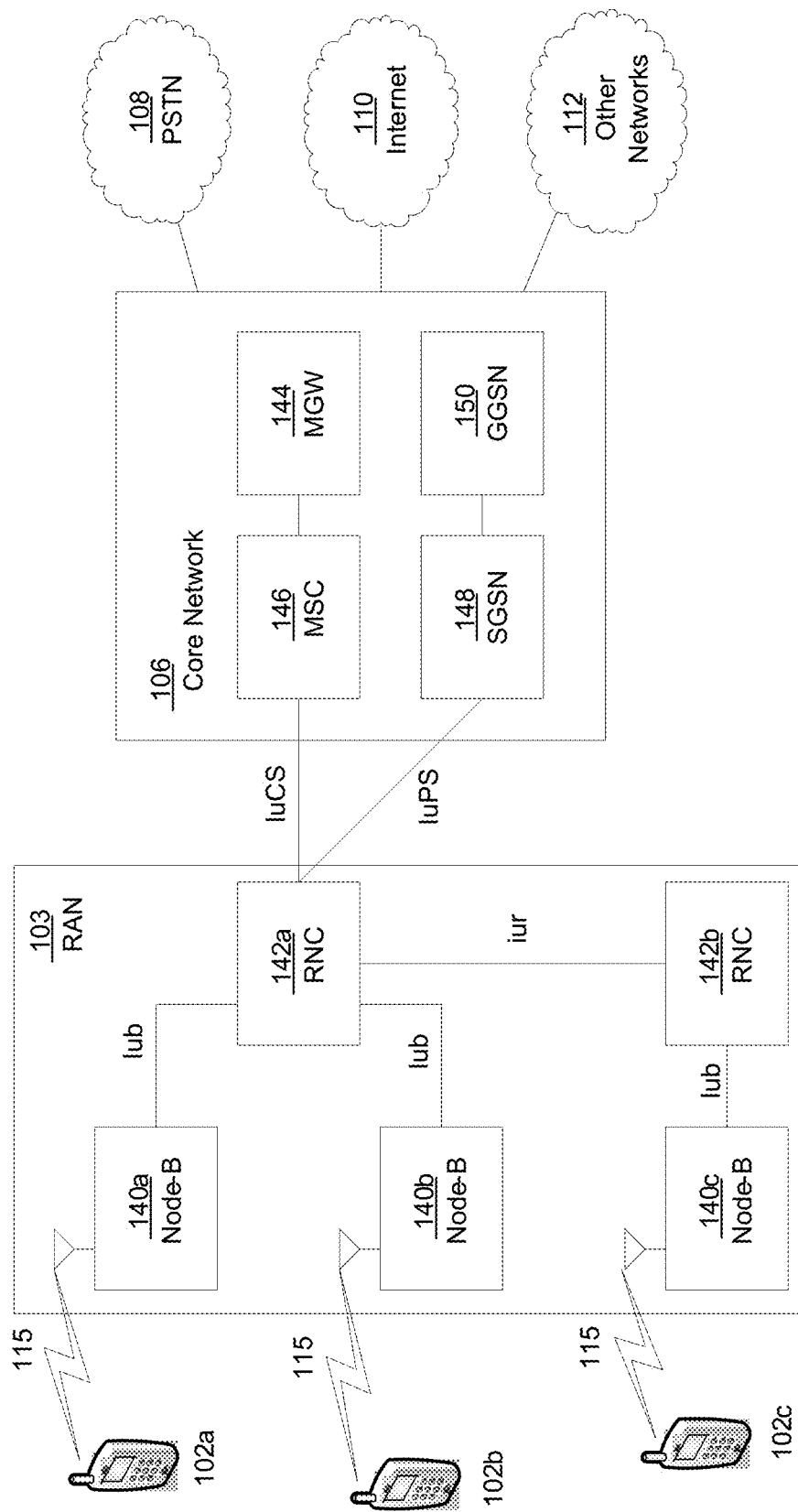
FIG. 1C illustrates a system diagram of a radio access network and a core network according to an embodiment of the application.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 1C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 1D:
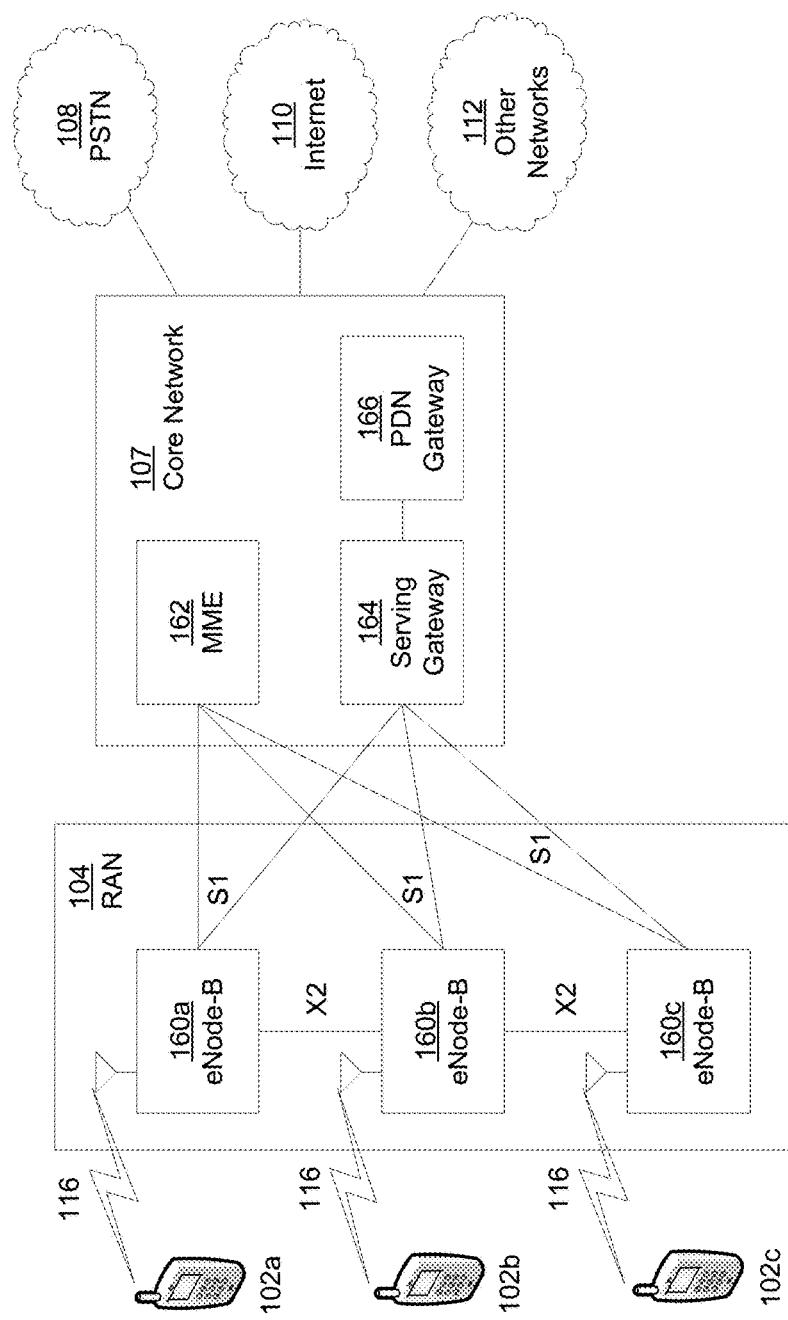
FIG. 1D illustrates a system diagram of a radio access network and a core network according to another embodiment of the application.

FIG. 1D is a system diagram of the RAN 104 and the core network 107 according to an embodiment. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
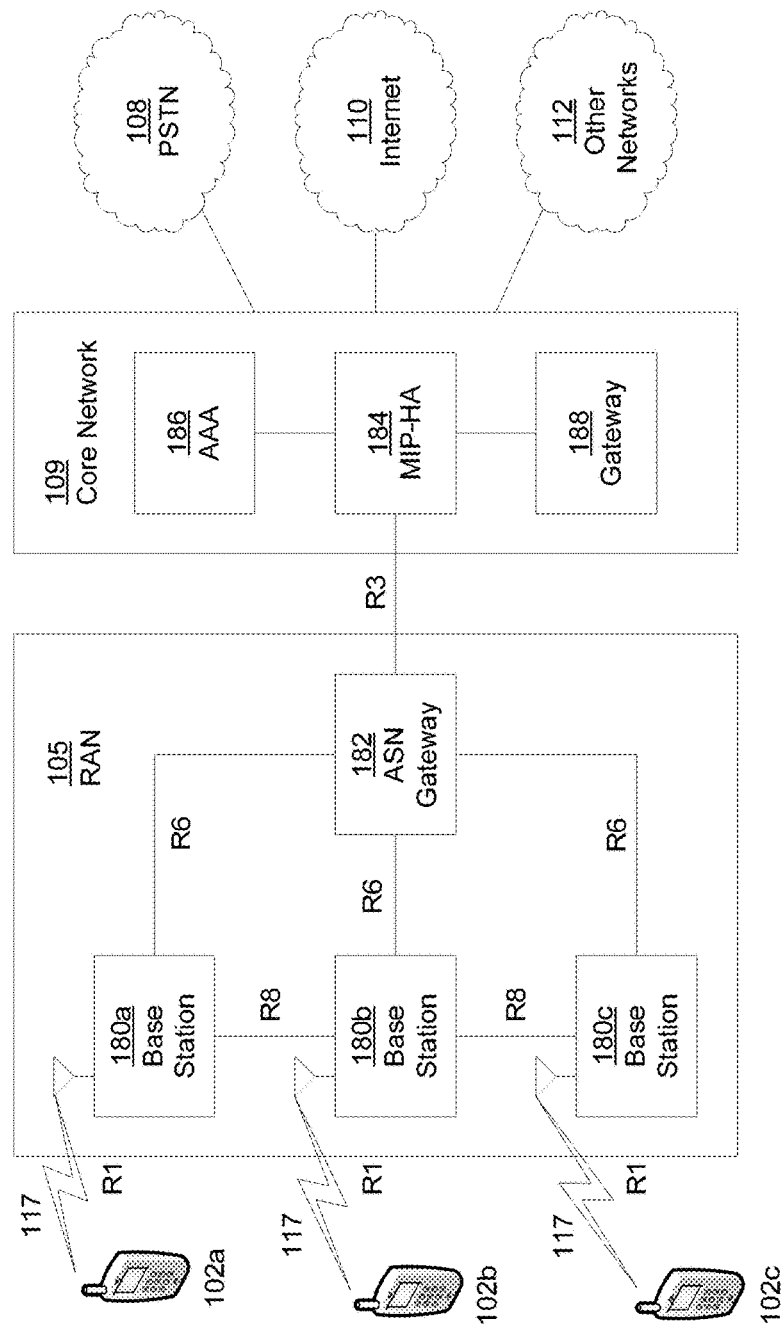
FIG. 1E illustrates a system diagram of a radio access network and a core network according to yet another embodiment of the application.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 3A, 3B, 3C, 3D, and 3E are provided by way of example only, and it is understood that the subject matter disclosed and claimed herein may be embodied or implemented in any similar communication system, whether presently defined or defined in the future.

Figure 1F:
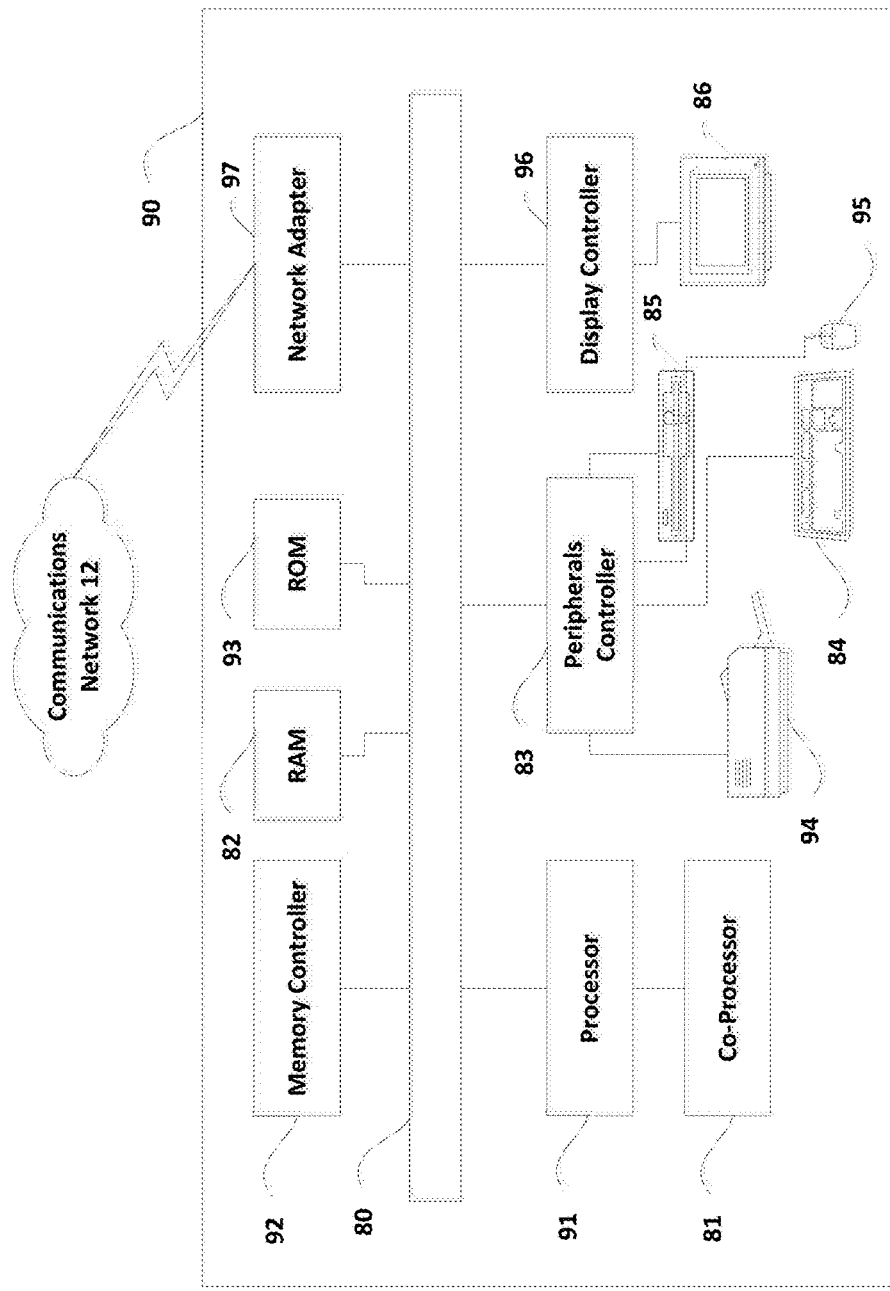
FIG. 1F illustrates a block diagram of an exemplary computing system in communication with one or more networks previously shown in FIGS. 1A, 1C, 1D and 1E according to an embodiment of the application.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

As shown in FIG. 2A, In LTE, a terminal can be in two different states in LTE-RRC_CONNECTED and RRC_IDLE. In RRC_CONNECTED, there is a Radio Resource Control (RRC) context. The cell to which the User Equipment (UE) belongs is known and an identity of the UE, the Cell Radio-Network Temporary Identifier (C-RNTI), used for signaling purposes between the UE and the network, has been configured. RRC_CONNECTED is intended for data transfer to/from the UE.

Moreover, in RRC_IDLE, there is no RRC context in the Radio Access Network (RAN) and the UE does not belong to a specific cell. No data transfer may take place in RRC_IDLE. A UE in RRC_IDLE monitors a Paging channel to detect incoming calls and changes to the system information. Discontinuous Reception (DRX) is used in to conserve UE power. When moving to RRC_CONNECTED the RRC context needs to be established in both the RAN and the UE.

System Information (SI) is the information broadcast by the Evolved Universal Terrestrial Radio Access Network (E-UTRAN) that needs to be acquired by the UE to be able to access and operate within the network. SI is divided into the MasterInformationBlock (MIB) and a number of SystemInformationBlocks (SIBs). A high level description of the MIB and SIBs is provided in 3GPP TS 36.300. Detailed descriptions are available in 3GPP TS 36.331. Table 1 provides some MIB and SIBs information.

TABLE 1

| Information Block | Description |
|---|---|
| MIB | Defines the most essential physical layer information of the cell required to receive further system information |
| SIB1 | Contains information relevant when evaluating if a UE is allowed to access a cell and defines the scheduling of other system information |
| SIB2 | Radio resource configuration information that is common for all UEs |
| SIB3 | Cell re-selection information common for intra-frequency, inter-frequency and/or inter-RAT cell re-selection (i.e. applicable for more than one type of cell re-selection but not necessarily all) as well as intra-frequency cell re-selection information other than neighboring cell related |
| SIB4 | Neighboring cell related information relevant only for intra-frequency cell re-selection |
| SIB5 | Information relevant only for inter-frequency cell re-selection i.e. information about other E UTRA frequencies and inter-frequency neighboring cells relevant for cell re-selection |
| SIB6 | Information relevant only for inter-RAT cell re-selection i.e. information about UTRA frequencies and UTRA neighboring cells relevant for cell re-selection |
| SIB7 | Information relevant only for inter-RAT cell re-selection i.e. information about GERAN frequencies relevant for cell re-selection |
| SIB8 | Information relevant only for inter-RAT cell re-selection i.e. information about CDMA2000 frequencies and CDMA2000 neighboring cells relevant for cell re-selection |

TABLE 1-continued

| Information Block | Description |
|---|---|
| SIB9 | Home eNB name (HNB Name) |
| SIB10 | Earthquake and Tsunami Warning System (ETWS) primary notification |
| SIB11 | ETWS secondary notification |
| SIB12 | Commercial Mobile Alert System (CMAS) notification |
| SIB13 | Information required to acquire the MBMS control information associated with one or more MBSFN areas |
| SIB14 | Extended Access Barring (EAB) parameters |
| SIB15 | MBMS Service Area Identities (SAI) of the current and/or neighboring carrier frequencies |
| SIB16 | Information related to GPS time and Coordinated Universal Time (UTC) |
| SIB17 | Information relevant for traffic steering between E-UTRAN and WLAN |
| SIB18 | Indicates E-UTRAN supports the Sidelink UE information procedure and may contain sidelink communication related resource configuration information |
| SIB19 | Indicates E-UTRAN supports the sidelink UE information procedure and may contain sidelink discovery related resource configuration information |
| SIB20 | Contains the information required to acquire the control information associated transmission of MBMS using Single Cell-Point to Multi-point (SC-PTM) |

The Physical Random Access Channel (PRACH) configuration in the system and the generic random access parameters are specified in the PRACH-Config and RACH-ConfigCommon IEs of SIB2 shown below.

RACH-ConfigCommon IE

```
-- ASN1START
RACH-ConfigCommon ::=   SEQUENCE {
    preambleInfo                        SEQUENCE {
        numberOfRA-Preambles                ENUMERATED {
                                                n4, n8, n12, n16 ,n20, n24, n28,
                                                n32, n36, n40, n44, n48, n52, n56,
                                                n60, n64},
        preamblesGroupAConfig               SEQUENCE {
            sizeOfRA-PreamblesGroupA            ENUMERATED {
                                                    n4, n8, n12, n16 ,n20, n24, n28,
                                                    n32, n36, n40, n44, n48, n52, n56,
                                                    n60},
            messageSizeGroupA                   ENUMERATED {b56, b144, b208, b256},
            messagePowerOffsetGroupB            ENUMERATED {
                                                    minusinfinity, dB0, dB5, dB8, dB10, dB12,
                                                    dB15, dB18},
            ...
        } OPTIONAL                                                                          -- Need OP
    },
    powerRampingParameters              PowerRampingParameters,
    ra-SupervisionInfo                  SEQUENCE {
        preambleTransMax                    PreambleTransMax,
        ra-ResponseWindowSize               ENUMERATED {
                                                sf2, sf3, sf4, sf5, sf6, sf7,
                                                sf8, sf10},
        mac-ContentionResolutionTimer       ENUMERATED {
                                                sf8, sf16, sf24, sf32, sf40, sf48,
                                                sf56, sf64}
    },
    maxHARQ-Msg3Tx                      INTEGER (1..8),
    ...
}
RACH-ConfigCommon-v1250 ::=   SEQUENCE {
    txFailParams-r12                    SEQUENCE {
        connEstFailCount-r12                ENUMERATED {n1, n2, n3, n4},
        connEstFailOffsetValidity-r12       ENUMERATED {s30, s60, s120, s240,
                                                s300, s420, s600, s900},
        connEstFailOffset-r12               INTEGER (0..15)   OPTIONAL        -- Need OP
    }
}
RACH-ConfigCommonSCell-r11 ::=   SEQUENCE {
    powerRampingParameters-r11          PowerRampingParameters,
    ra-SupervisionInfo-r11              SEQUENCE {
        preambleTransMax-r11                PreambleTransMax
    },
    ...
}
```

-continued

```
PowerRampingParameters ::=        SEQUENCE {
    powerRampingStep                  ENUMERATED {dB0, dB2,dB4, dB6},
    preambleInitialReceivedTargetPower ENUMERATED {
                                          dBm-120, dBm-118, dBm-116, dBm-114, dBm-112,
                                          dBm-110, dBm-108, dBm-106, dBm-104, dBm-102,
                                          dBm-100, dBm-98, dBm-96, dBm-94,
                                          dBm-92, dBm-90}
}
PreambleTransMax ::=              ENUMERATED {
                                      n3, n4, n5, n6, n7, n8, n10, n20, n50,
                                      n100, n200}
-- ASN1STOP
```

PRACH-Config Information Elements

```
-- ASN1START
PRACH-ConfigSIB ::=           SEQUENCE {
    rootSequenceIndex             INTEGER (0..837),
    prach-ConfigInfo              PRACH-ConfigInfo
}
PRACH-Config ::=              SEQUENCE {
    rootSequenceIndex             INTEGER (0..837),
    prach-ConfigInfo              PRACH-ConfigInfo  OPTIONAL  -- Need ON
}
PRACH-ConfigSCell-r10 ::=     SEQUENCE {
    prach-ConfigIndex-r10         INTEGER (0..63)
}
PRACH-ConfigInfo ::=          SEQUENCE {
    prach-ConfigIndex             INTEGER (0..63),
    highSpeedFlag                 BOOLEAN,
    zeroCorrelationZoneConfig     INTEGER (0..15),
    prach-FreqOffset              INTEGER (0..94)
}
-- ASN1STOP
```

Figure 2B:
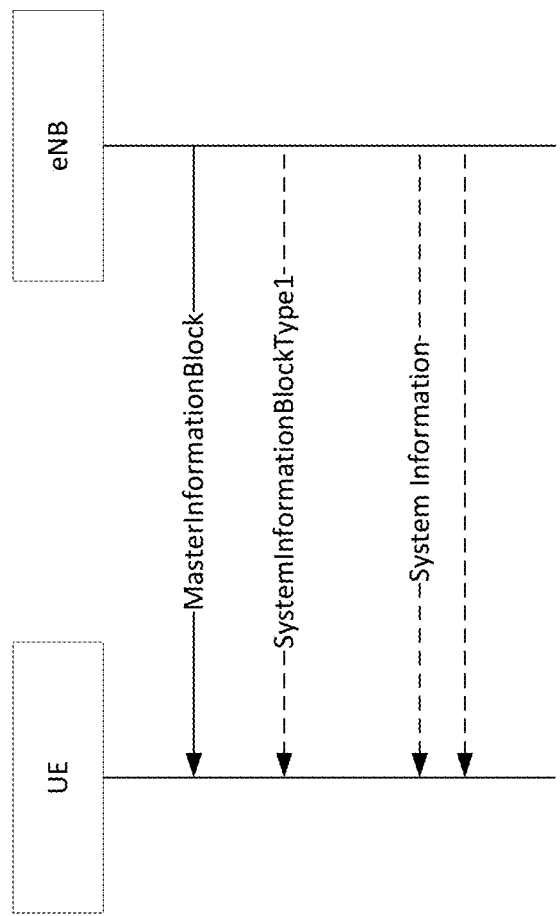
FIG. 2B is a diagram that illustrates a System Information Acquisition Procedure.

FIG. 2B illustrates a System Information Acquisition Procedure. Here, the UE applies the system information acquisition procedure described 3GPP TS 36.331 to acquire the Access Stratum (AS) and Non-access Stratum (NAS) related system information that is broadcasted by the E-UTRAN. The procedure applies to UEs in RRC_IDLE and UEs in RRC_CONNECTED.

The UE applies the system information acquisition procedure for the following instances:

(i) upon selecting (e.g., upon power on) and upon re-selecting a cell;

(ii) after handover completion;

(iii) after entering E-UTRA from another Radio Access Technology (RAT);

(iv) upon return from out of coverage;

(v) upon receiving a notification that the System Information has changed;

(vi) upon receiving an indication about the presence of an ETWS notification, a CMAS notification and/or a notification that EAB parameters have changed;

(vii) upon receiving a request from CDMA2000 upper layers;

(viii) upon exceeding the maximum validity duration.

Figure 3:
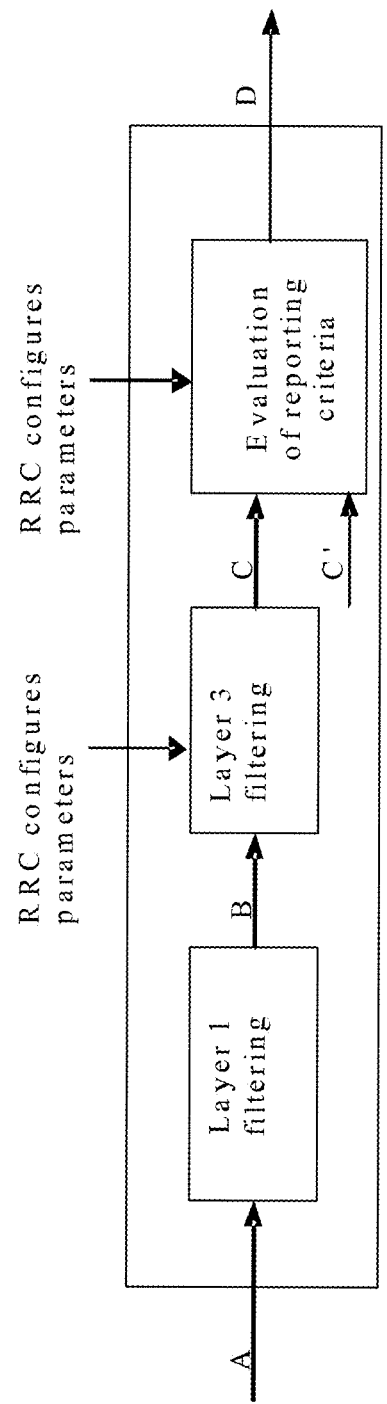
FIG. 3 is a diagram of a measurement model adopted in LTE.

Section 10.6 in 3GPP 36.300 defines the measurement model currently used in LTE. The model is shown in FIG. 3.

A: measurements (samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) in not constrained by the standard. The following measurements A-D will be discussed in turn below.

B: A measurement reported by layer 1 to layer 3 after layer 1 filtering.

Layer 3 filtering: Filtering performed on the measurements provided at point B. The behavior of the Layer 3 filters is standardized and the configuration of the layer 3 filters is provided by RRC signaling. Filtering reporting period at C equals one measurement period at B.

C: A measurement after processing in the layer 3 filter. The reporting rate is identical to the reporting rate at point B. This measurement is used as input for one or more evaluation of reporting criteria.

Evaluation of reporting criteria: This checks whether actual measurement reporting is necessary at point D. The evaluation can be based on more than one flow of measurements at reference point C e.g. to compare between different measurements. This is illustrated by input C and C'. The UE shall evaluate the reporting criteria at least every time a new measurement result is reported at point C, C'. The reporting criteria are standardized and the configuration is provided by RRC signaling (UE measurements).

D: Measurement report information (message) sent on the radio interface.

Layer 1 filtering will introduce a certain level of measurement averaging. How and when the UE exactly performs the required measurements will be implementation specific to the point that the output at B fulfils the performance requirements set in 3GPP TS 36.133, Requirements for support of radio resource management (Release 13), V13.2.0. Layer 3 filtering and parameters used are specified in 3GPP TS 36.331 and does not introduce any delay in the sample availability between B and C. Measurement at point C, C' is the input used in the event evaluation.

Figure 4:
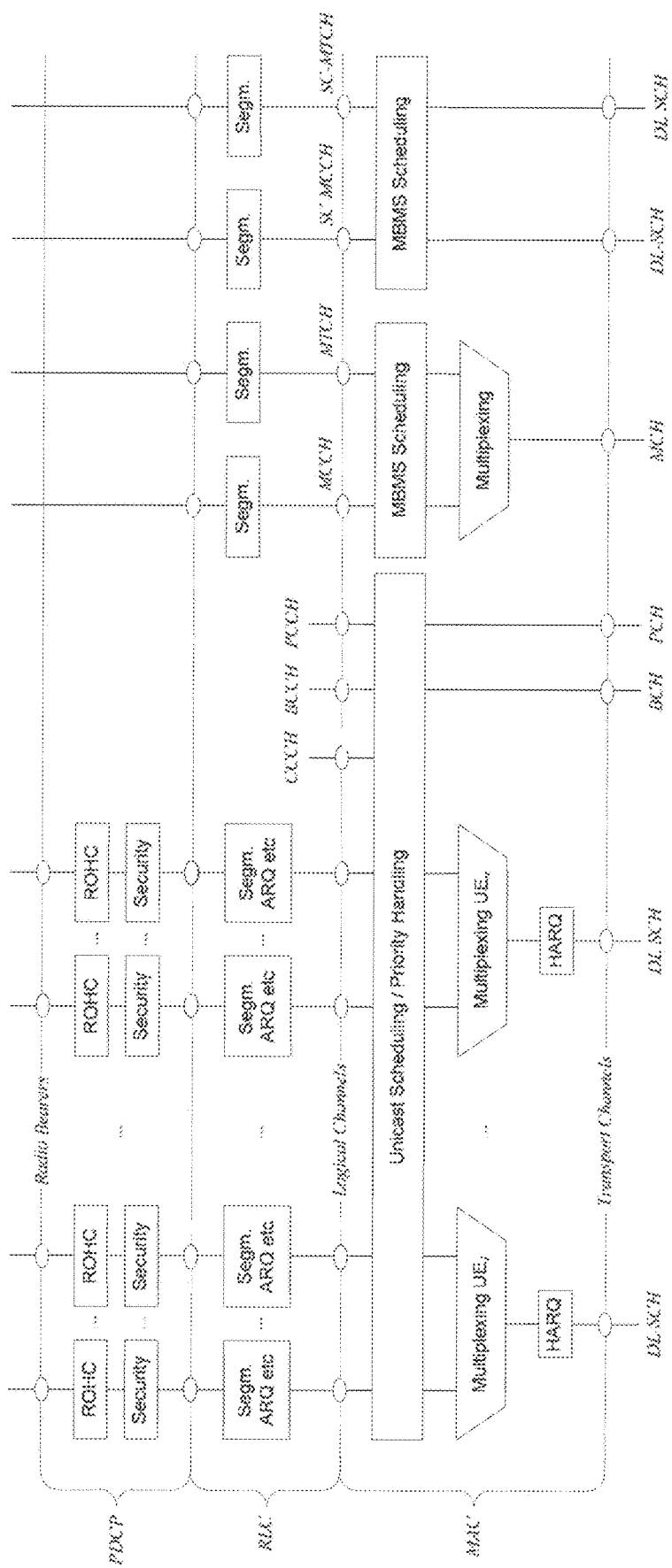
FIG. 4 is a diagram of a Layer 2 structure for DL.
Figure 5:
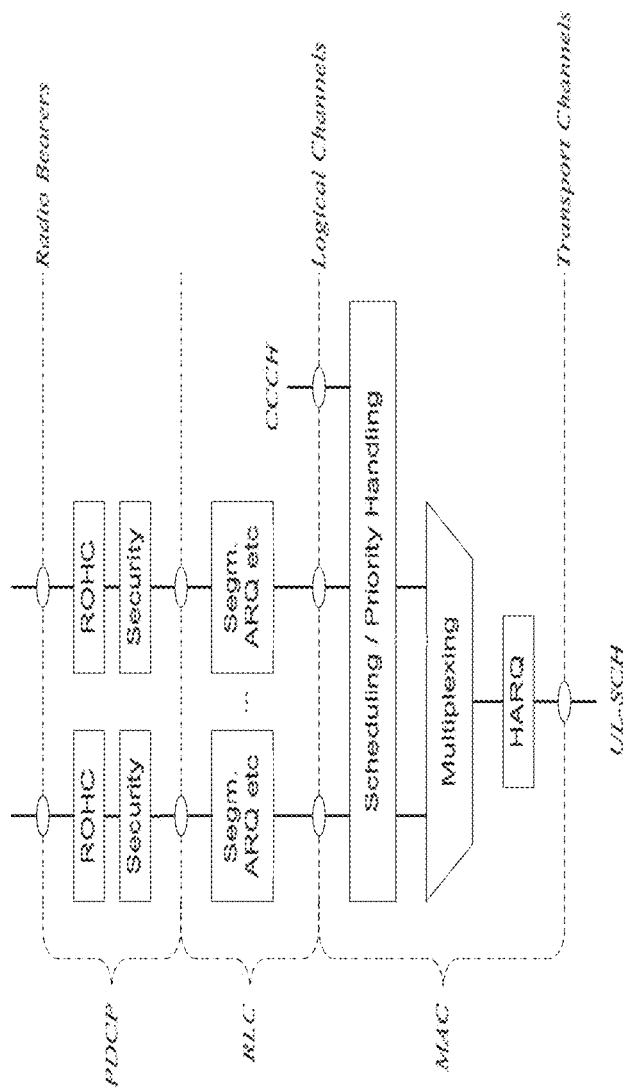
FIG. 5 is a diagram of a Layer 2 structure for UL.

Layer 2 is split into the following sublayers: Medium Access Control (MAC), Radio Link Control (RLC) and Packet Data Convergence Protocol (PDCP) as described in 3GPP 36.300 [3GPP TS 36.300, Overall description; Stage 2 (Release 13), V13.3.0]. The PDCP/RLC/MAC architecture for the downlink and uplink are shown in FIG. 4 and FIG. 5 respectively.

Figure 6:
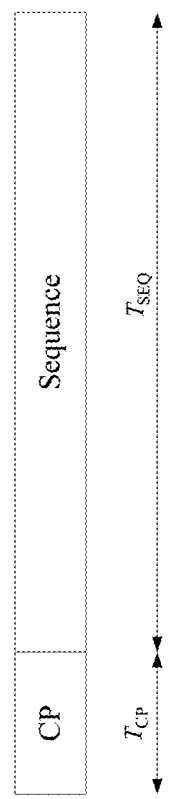
FIG. 6 is a diagram that illustrates a Random Access Preamble Format.
Figure 7:
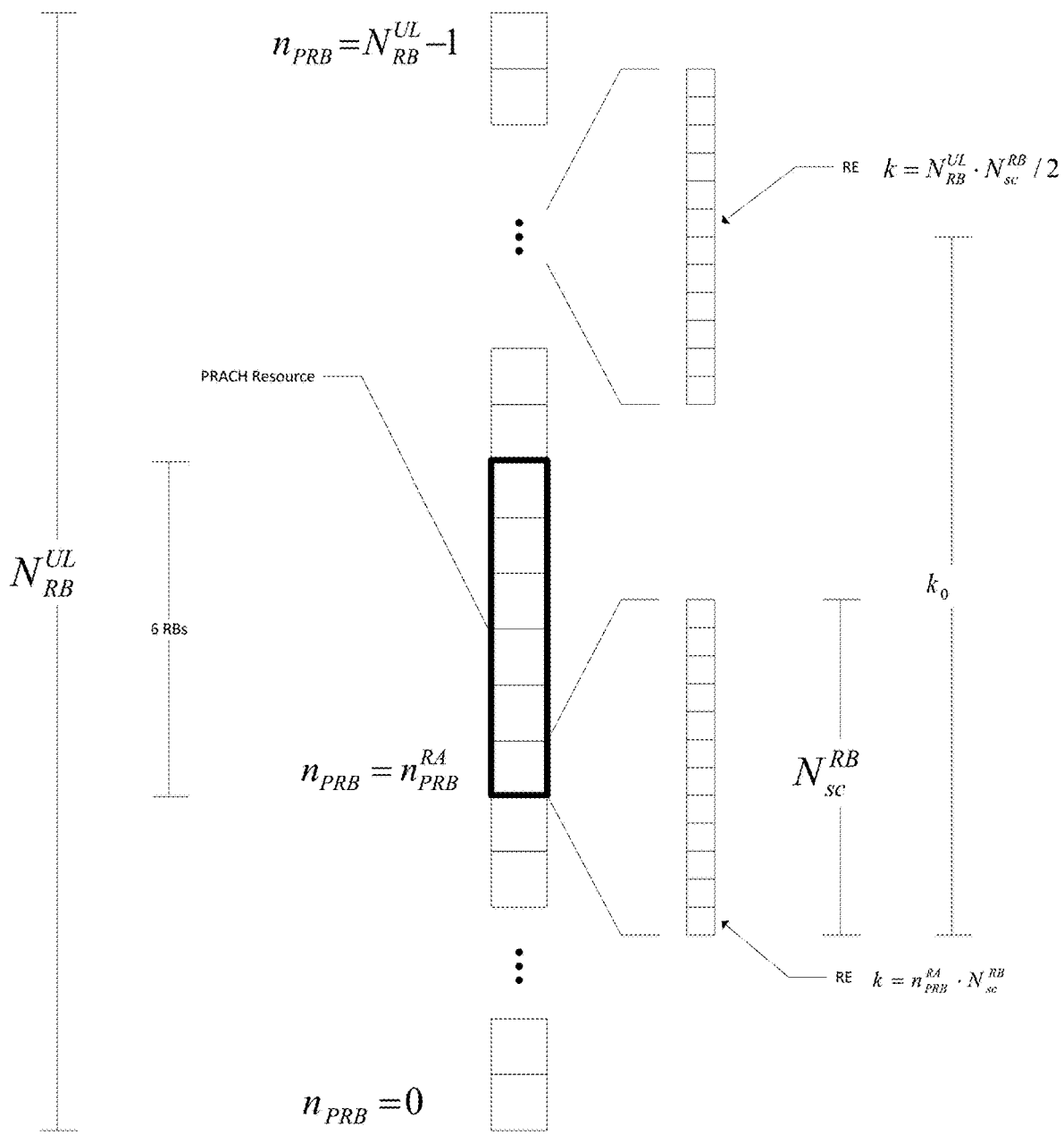
FIG. 7 is a diagram that illustrates a PRACH Resource Definition.

The physical layer random access preamble, illustrated in FIG. 6 consists of a cyclic prefix of length TCP and a sequence part of length TSEQ. The parameter values are listed in Table 2 below and depend on the frame structure and the random access configuration. Higher layers control the preamble format.

TABLE 2

| Preamble Format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (see Note) | $448 \cdot T_s$ | $4096 \cdot T_s$ |

NOTE:
Frame structure type 2 and special subframe configurations with UpPTS lengths $4384 \cdot T_s$ and $5120 \cdot T_s$ only.

FIG. 6 illustrates the PRACH Resource Definition.

$n_{PRB}^{RA}$ is used to control location of PRACH resource in frequency domain $$0 \le n_{PRB}^{RA} \le N_{RB}^{UL} - 6$$

Offset in PRBs relative to 0th PRB k0 corresponds to first Resource Element (RE) of the PRACH resource $$k_0 = n_{PRB}^{RA} N_{sc}^{RB} - N_{RB}^{UL} N_{sc}^{RB}/2$$

Offset in REs relative to RE k, where $k = N_{RB}^{UL} N_{sc}^{RB}/2$

In the uplink, the carrier frequency f0 is centered between two UL subcarriers.

The random access preambles are generated from one or several root Zadoff-Chu sequences, as described in 3GPP TS 36.211. The network configures the set of preamble sequences the UE is allowed to use. Starting from the configured Root Sequence Index, there are 64 preambles available in each cell. The UE identifies this set of preambles by assigning the maximum number of cyclic shifts allowed for each root sequence and then proceeding to the next logical root sequence until all 64 preambles have been identified.

The $u^{th}$ root Zadoff-Chu sequence is defined by $$x_u(n) = e^{-j\frac{\pi u n(n+1)}{N_{ZC}}},$$

$$0 \le n \le N_{ZC} - 1$$

where the length NZC of the Zadoff-Chu sequence is given in Table 3.

TABLE 3

| Preamble Format | $N_{ZC}$ |
|---|---|
| 0-3 | 839 |
| 4 | 139 |

From the uth root Zadoff-Chu sequence, random access preambles with zero correlation zones of length NCS−1 are defined by cyclic shifts according to $$x_{u,v}(n) = x_u((n + C_v) \bmod N_{ZC})$$

When using restricted sets, Cv is determined as follows:

$$C_v = d_{start} \lfloor v/n_{shift}^{RA} \rfloor + (v \bmod n_{shift}^{RA}) N_{CS} \quad v = 0, 1, \ldots, n_{shift}^{RA} n_{group}^{RA} + \bar{n}_{shift}^{RA} - 1$$

The parameters for restricted sets of cyclic shifts depend on the variable du, the cyclic shift corresponding to a Doppler shift of magnitude 1/TSEQ. The variable $d_u$ is defined as follows:

$$d_u = \begin{cases} p & 0 \le p < N_{ZC}/2 \\ N_{ZC} - p & \text{otherwise} \end{cases}$$

where p is the modular multiplicative inverse of u; i.e. the smallest non-negative integer that fulfils (pu)mod NZC=1.

For NCS≤du≤NZC/3, the parameters are given by:

$$n_{shift}^{RA} = \lfloor d_u/N_{CS} \rfloor$$

$$d_{start} = 2d_u + n_{shift}^{RA} N_{CS}$$

$$\bar{n}_{shift}^{RA} = \max(\lfloor (N_{ZC} - 2d_u - n_{group}^{RA} d_{start})/N_{CS} \rfloor, 0)$$

For NZC/3≤du≤(NZC−NCS)/2, the parameters are given by:

$$n_{shift}^{RA} = \lfloor (N_{ZC} - 2d_u)/N_{CS} \rfloor$$

$$d_{start} = N_{ZC} - 2d_u + n_{shift}^{RA} N_{CS}$$

$$\bar{n}_{shift}^{RA} = \min(\max(\lfloor (d_u - n_{group}^{RA} d_{start})/N_{CS} \rfloor, 0), n_{shift}^{RA})$$

For all other values of du, there are no cyclic shifts in the restricted set.

The baseband PRACH signal is defined in 3GPP TS 36.211 as the following time-continuous signal:

$$s(t) = \beta_{PRACH} \sum_{k=0}^{N_{ZC}-1} \sum_{n=0}^{N_{ZC}-1} x_{u,v}(n) e^{-j\frac{2\pi nk}{N_{ZC}}} e^{j2\pi[k+\phi+K(k_0+\frac{1}{2})]\Delta f_{RA}(t-T_{CP})}$$

where:

$$0 \le t \le (TSEQ + TCP);$$

βPRACH is an amplitude scaling factor used for power control;
NZC is the length of the Zadoff-Chu sequence;
xu,v(n) is the length-NZC Zadoff-Chu sequence with root u and cyclic shift v;
□ is a fixed offset determining the frequency location of the preamble within its assigned PRBs;
K=Δf/ΔfRA accounts for the difference in subcarrier spacing between the RACH preamble and the uplink data transmission;

$$k_0 = n_{PRB}^{RA} N_{sc}^{PB} - N_{RB}^{UL} N_{sc}^{RB}/2;$$

ΔfRA is the subcarrier spacing for the RACH preamble;
The random access baseband parameters ΔfRA and □ are defined in Table 4.

TABLE 4

| Preamble Format | $\Delta f_{RA}$ | □ |
|---|---|---|
| 0-3 | 1250 Hz | 7 |
| 4 | 7500 Hz | 2 |

In LTE, the random access procedure is performed for the following events:
  Initial access from RRC_IDLE;
  RRC Connection Re-establishment procedure;
  Handover;
  DL data arrival during RRC_CONNECTED requiring random access procedure:
    E.g. when UL synchronization status is "non-synchronized".
  UL data arrival during RRC_CONNECTED requiring random access procedure:
    E.g., when UL synchronization status is "non-synchronized" or there are no PUCCH resources for SR available.
  For positioning purpose during RRC_CONNECTED requiring random access procedure;
    E.g., when timing advance is needed for UE positioning.
The random access procedure takes two distinct forms:
  Contention based (applicable to first five events);
  Non-contention based (applicable to only handover, DL data arrival, positioning and obtaining timing advance alignment for a Secondary Timing Advance Group (sTAG)).

Figure 8:
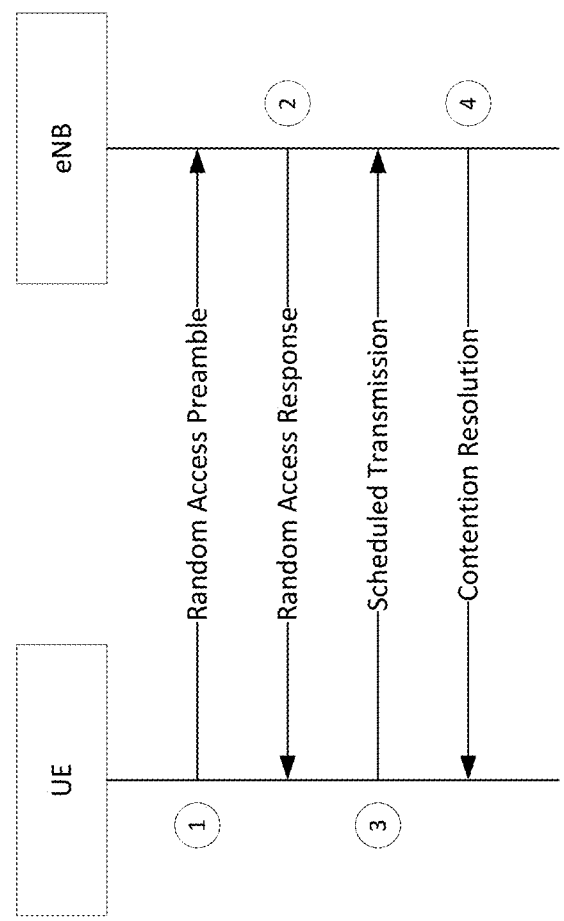
FIG. 8 is a diagram that illustrates a Contention Based Random Access Procedure.

Contention based random access employs the procedure shown in FIG. 8.

Step 1 of FIG. 8 describes a Random Access Preamble on RACH in uplink. Here, transmission of the RACH preamble allows the eNB to estimate transmission timing of the UE.

Step 2 of FIG. 8 describes a Random Access Response generated by MAC on DL-SCH. Here, the network transmits a timing advance command to adjust the UE transmit timing. The network also assigns UL resources to the UE to be used in Step 3 below.

Step 3 of FIG. 8 describes a first scheduled UL transmission on the UL-SCH. Transmission of the mobile-terminal identity to the network employs the UL-SCH.

Step 4 of FIG. 8 describes a contention Resolution on the DL. Transmission of a contention-resolution message occurs from the network to the UE on the DL-SCH.

Contention-free random access is only used for re-establishing uplink synchronization upon downlink data arrival, handover and positioning. In this case, only the first two steps of the procedure above are applicable. This is because there is no need for contention resolution when performing the contention-free random access procedure. A more detailed description of the random access procedure from the PHY and MAC layer perspectives is available in 3GPP TS 36.213 and 3GPP TS 36.321 respectively.

The Random Access Response includes a 20-bit UL Grant referred to as the Random Access Response Grant [3GPP TS 36.213]. The content of these 20 bits starting with the MSB and ending with the LSB are as follows:
  Hopping flag—1 bit
  Fixed size resource block assignment—10 bits
  Truncated modulation and coding scheme—4 bits
  TPC command for scheduled PUSCH—3 bits Physical layer measurements are defined in 3GPP TS 36.300 as shown below.

The physical layer measurements to support mobility are classified as:
  within E-UTRAN (intra-frequency, inter-frequency);
  between E-UTRAN and GERAN/UTRAN (inter-RAT);
  between E-UTRAN and non-3GPP RAT (Inter 3GPP access system mobility).

For measurements within E-UTRAN two basic UE measurement quantities shall be supported:
  Reference signal received power (RSRP);
  Reference signal received quality (RSRQ).

In addition, the following UE measurement quantity may be supported:
  Received signal strength indicator (RSSI);
  Reference signal to noise and interference ratio (RS-SINR).

RSRP measurement is based on the following signals:
  Cell-specific reference signals; or
  CSI reference signals in configured discovery signals.

Figure 9:
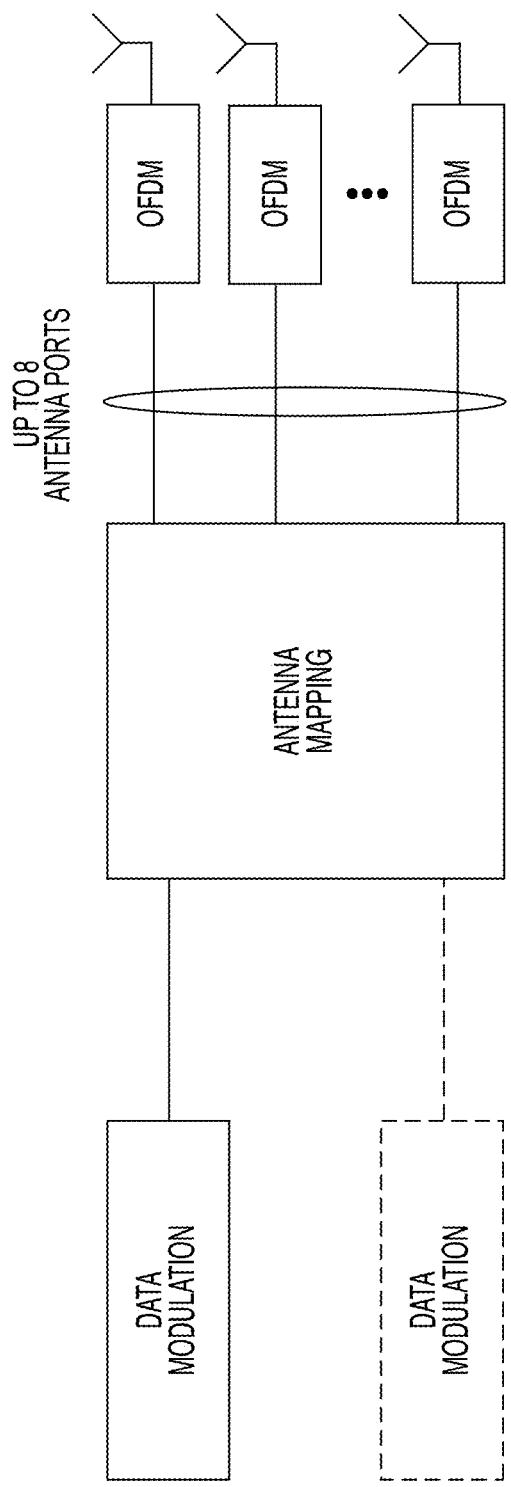
FIG. 9 is a diagram of a Structure for LTE DL Multi-Antenna Transmission.

Multi-antenna transmission in LTE can be described as a mapping from the output of the data modulation to the different antenna ports as shown in FIG. 9 [4G LTE/LTE-Advanced for Mobile Broadband, Erik Dahlman, Stefan Parkvall, and Johan Skold, Academic Press, ISBN: 978-0-12-385489-6]. The input to the antenna mapping includes the modulation symbols (QPSK, 16QAM, 64QAM) corresponding to one or two transport blocks. The output of the antenna mapping is a set of symbols for each antenna port. The symbols of each antenna port are subsequently applied to the OFDM modulator. Accordingly, it is mapped to the basic OFDM time frequency grid corresponding to that antenna port.

The different multi-antenna transmission schemes correspond to different so-called transmission modes. There are ten different transmission modes defined for LTE. They differ in terms of the specific structure of the antenna mapping, but also in terms of what reference signals are assumed to be used for demodulation (cell-specific reference signals or demodulation reference signals respectively) and the type of CSI feedback they rely on.

The list below summarizes the transmission modes defined for LTE and the associated multi-antenna transmission schemes.
  Transmission mode 1: Single-antenna transmission.
  Transmission mode 2: Transmit diversity.
  Transmission mode 3: Open-loop codebook-based precoding in the case of more than one layer, transmit diversity in the case of rank-one transmission.
  Transmission mode 4: Closed-loop codebook-based precoding.
  Transmission mode 5: Multi-user-MIMO version of transmission mode 4.
  Transmission mode 6: Special case of closed-loop codebook-based precoding limited to single layer transmission.
  Transmission mode 7: Release-8 non-codebook-based precoding supporting only single-layer transmission.
  Transmission mode 8: Release-9 non-codebook-based precoding supporting up to two layers.
  Transmission mode 9: Release-10 non-codebook-based precoding supporting up to eight layers.
  Transmission mode 10: Release 11 Extension of transmission mode 9 for enhanced support of different means of downlink multi-point coordination and transmission, also referred to as CoMP.

NR Beamformed Access

Currently, 3GPP standardization's efforts are underway to design the framework for beamformed access. The characteristics of the wireless channel at higher frequencies are significantly different from the sub-6 GHz channel that LTE is currently deployed on. The key challenge of designing the new Radio Access Technology (RAT) for higher frequencies will be in overcoming the larger path-loss at higher frequency bands. In addition to this larger path-loss, the higher frequencies are subject to an unfavorable scattering environment due to blockage caused by poor diffraction. Therefore, MIMO/beamforming is essential in guaranteeing sufficient signal level at the receiver end.

Relying solely on MIMO digital precoding used by digital BF to compensate for the additional path-loss in higher frequencies seems not enough to provide similar coverage as below 6 GHz. Thus, the use of analog beamforming for achieving additional gain can be an alternative in conjunction with digital beamforming. A sufficiently narrow beam should be formed with lots of antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in a 3-sector configuration. The limiting factors of the number of concurrent high gain beams include the cost and complexity of the transceiver architecture.

Figure 10:
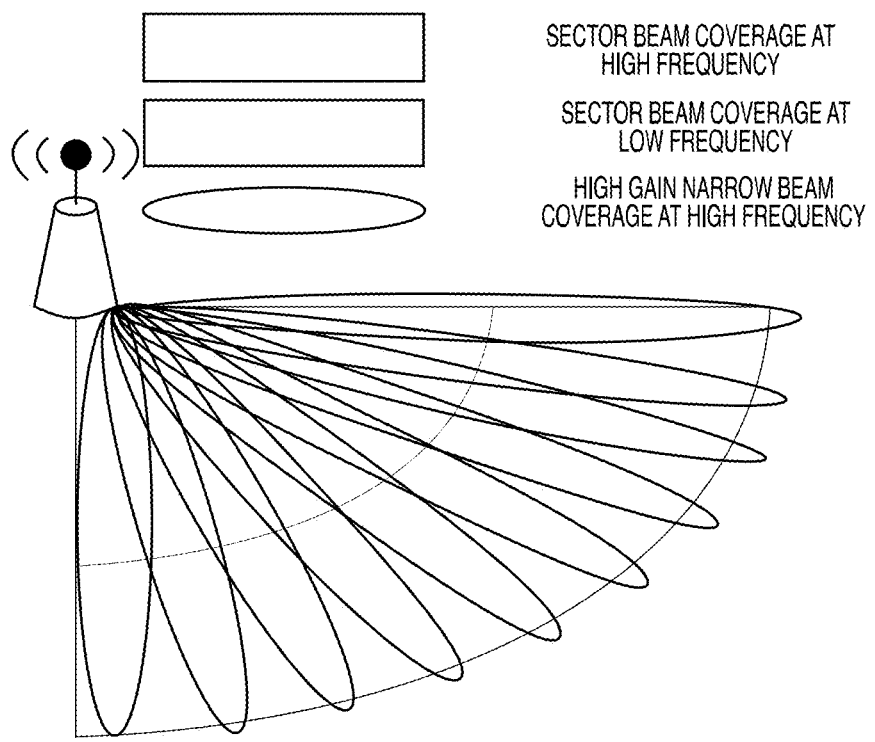
FIG. 10 is a diagram of cell coverage with sector beams and multiple high gain narrow beams.
Figure 11:
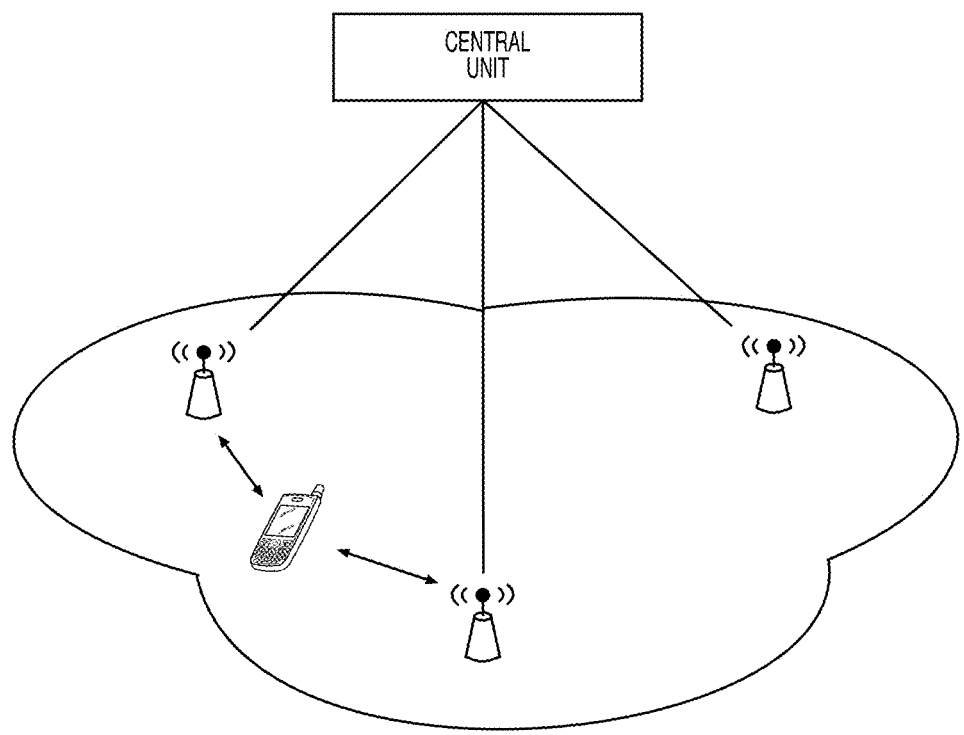
FIG. 11 is a diagram of a virtual cell.

From these observations above, multiple transmissions in the time domain with narrow coverage beams steered to cover different serving areas are necessary. Inherently, the analog beam of a subarray can be steered toward a single direction at the time resolution of an OFDM symbol or any appropriate time interval unit defined for the purpose of beam steering across different serving areas within the cell, and hence the number of subarrays determines the number of beam directions and the corresponding coverage on each OFDM symbol or time interval unit defined for the purpose of beam steering. In some literature, the provision of multiple narrow coverage beams for this purpose has been called "beam sweeping". For analog and hybrid beamforming, the beam sweeping seems to be essential to provide the basic coverage in NR. This concept is illustrated in FIG. 10 where the coverage of a sector level cell is achieved with sectors beams and multiple high gain narrow beams. Also, for analog and hybrid beamforming with massive MIMO, multiple transmissions in time domain with narrow coverage beams steered to cover different serving areas is essential to cover the whole coverage areas within a serving cell in NR.

One concept closely related to beam sweeping is the concept of beam pairing. Beam pairing is used to select the best beam pair between a UE and its serving cell which can be used for control signaling or data transmission. For the downlink transmission, a beam pair will consist of UE RX beam and NR-Node TX beam while for uplink transmission, a beam pair will consist of UE TX beam and NR-Node RX beam.

Another related concept is the concept of beam training which is used for beam refinement. For example as illustrated in FIG. 10, a coarser sector beamforming may be applied during the beam sweeping and sector beam pairing procedure. A beam training may then follow where for example the antenna weights vector are refined, followed by the pairing of high gain narrow beams between the UE and NR-Node.

Figure 12:
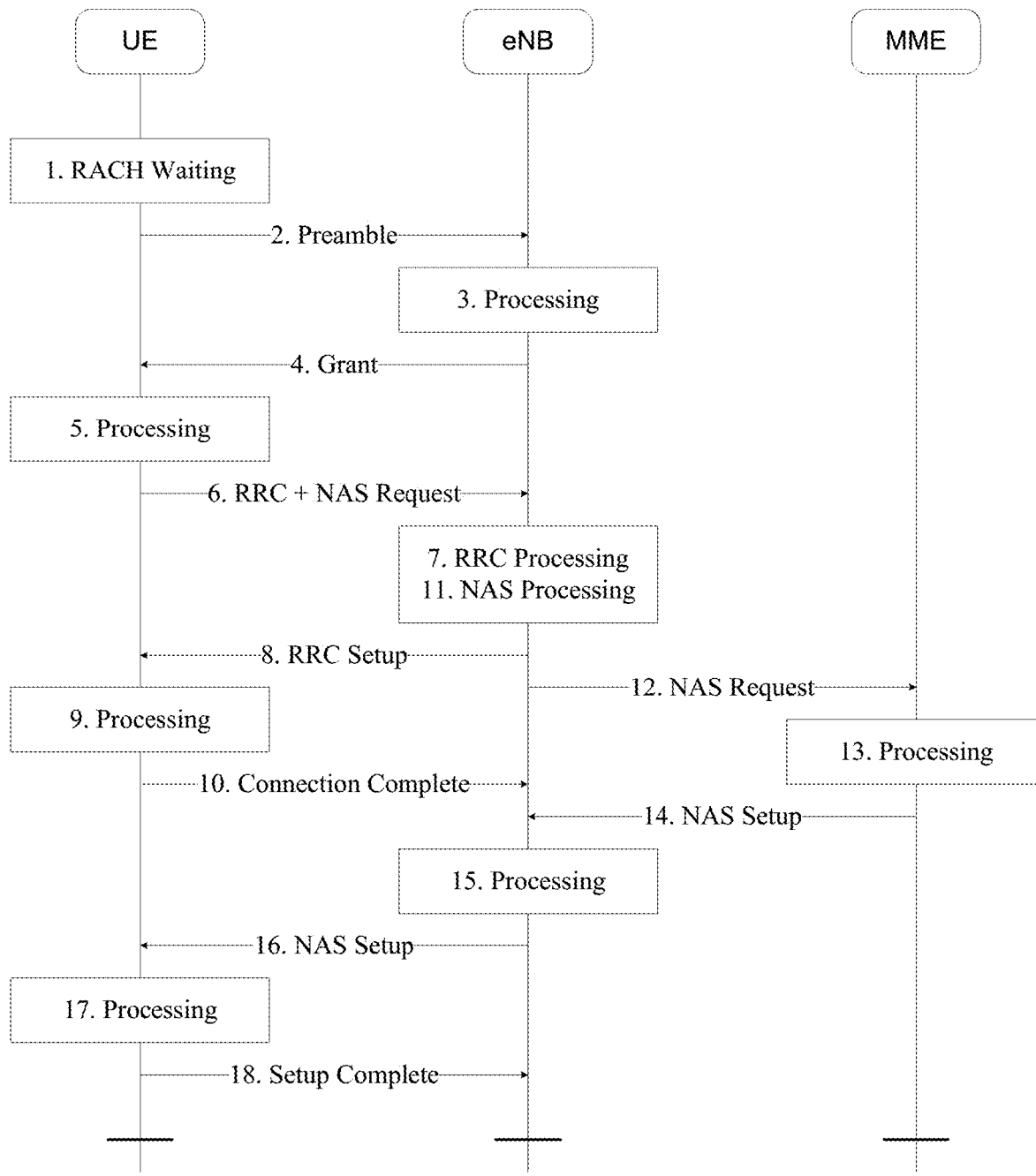
FIG. 12 is a diagram that illustrates transition from RRC_IDLE to RRC_CONNECTED.

The C-plane latency in LTE-Advanced is documented in 3GPP TR 36.912. FIG. 12 illustrates the transition from RRC_IDLE to RRC_CONNECTED.

TABLE 5

| Component | Description | Time (ms) |
| --- | --- | --- |
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |
| 9 | Processing delay in the UE (L2 and RRC) | 12 |
| 10 | Transmission of RRC Connection Set-up complete | 1 |
| 11 | Processing delay in eNB (Uu → S1-C) | |
| 12 | S1-C Transfer delay | |
| 13 | MME Processing Delay (including UE context retrieval of 10 ms) | |
| 14 | S1-C Transfer delay | |
| 15 | Processing delay in eNB (S1-C → Uu) | 4 |
| 16 | Transmission of RRC Security Mode Command and Connection Reconfiguration (+TTI alignment) | 1.5 |
| 17 | Processing delay in UE (L2 and RRC) | 16 |
| | Total delay | 50 |

The NAS setup is executed in parallel to the RRC setup. Therefore, the NAS delay does not appear in the total (assuming that that the total delay of steps 11-14 is shorter than or equal to the total delay of steps 7-10).

IMT for 2020 and beyond is envisaged to expand and support diverse families of usage scenarios and applications that will continue beyond the current IMT. Furthermore, a broad variety of capabilities would be tightly coupled with these intended different usage scenarios and applications for IMT for 2020 and beyond.

The families of usage scenarios for IMT for 2020 and beyond include:

eMBB (enhanced Mobile Broadband)

Macro and small cells 1 ms Latency (air interface)

Spectrum allocated at WRC-15 may lead up to 8 Gbps of additional throughput

Support for high mobility

URLLC (Ultra-Reliable and Low Latency Communications)

Low to medium data rates (50 kbps-10 Mbps)

<1 ms air interface latency 99.999% reliability and availability

Low connection establishment latency 0-500 km/h mobility mMTC (massive Machine Type Communications)

Low data rate (1~100 kbps)

High density of devices (up to 200,000/km2)

Latency: seconds to hours

Low power: up to 15 years battery autonomy

Asynchronous access

Network Operation

Network Operation addresses the subjects such as Network Slicing, Routing, Migration and Interworking, Energy Saving, etc.

3GPP TR 38.913 [3GPP TR 38.913, Study on Scenarios and Requirements for Next Generation Access Technologies; (Release 14), V0.3.0 defines scenarios and requirements for next generation access technologies. The Key Performance Indicators (KPIs) for eMBB, URLLC and mMTC devices are summarized in Table 6.

TABLE 6

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes [1] within 1 ms, which is the time it takes to deliver a small data packet from the radio protocol layer 2/3 SDU ingress point to the radio protocol layer 2/3 SDU point of the radio interface, at a certain channel quality (e.g., coverage-edge). NOTE1: Specific value for X is FFS. | $1-10^{-5}$ within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of dB, assuming a stored energy capacity of [5 Wh]. | 15 years |
| | Connection Density | Connection density refers to total number of devices fulfilling specific Quality of Service (QoS) per unit area (per km²). QoS definition should take into account the amount of data or access request generated within a time t_gen that can be sent or received within a given time, t_sendrx, with x % probability. | $10^6$ devices/km² |

Network Slicing

Figure 13:
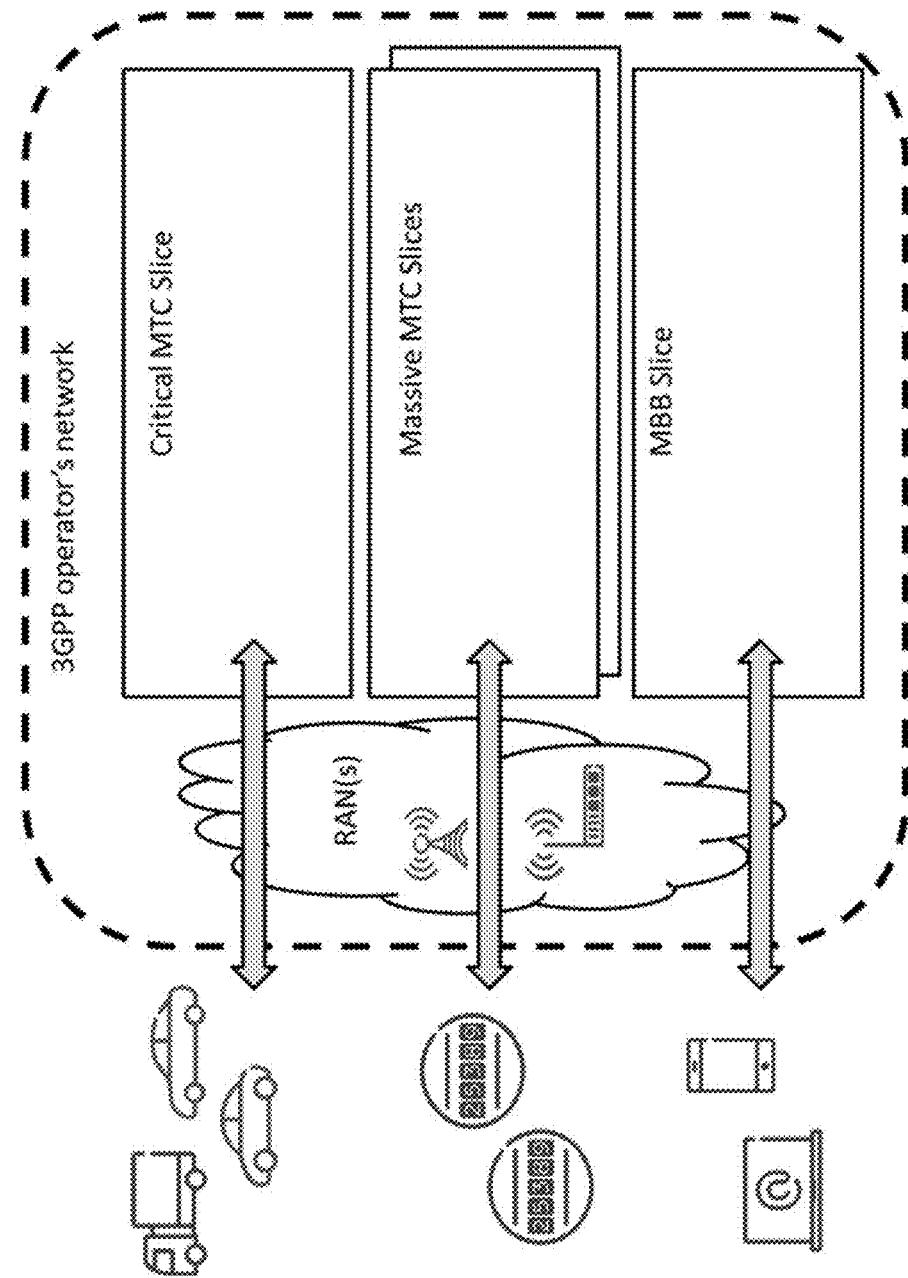
FIG. 13 is a diagram that illustrates a Network Slicing Concept.

FIG. 13 below provides a high level illustration of the network slicing concept. A network slice is composed of a collection of logical network functions that supports the communication service requirements of particular use case(s). It shall be possible to direct terminals to selected slices in a way that fulfil operator or user needs, e.g., based on subscription or terminal type. The network slicing primarily targets a partition of the core network, but it is not excluded that Radio Access Network (RAN) may need specific functionality to support multiple slices or even partitioning of resources for different network slices.

A beam sweeping frame structure can include a beam sweeping subframe consisting of multiple sweeping slots, where each sweeping slot may consist of 1 or more OFDM symbols.

A method can be used for associating uplink (UL) and downlink (DL) sweeping slots in the beam sweeping subframe. Sweeping subframe Information Elements (IEs) may be used to signal the sweeping subframe configuration.

A procedure is described for performing cell selection in beam sweeping NR networks.

A mechanism is described for triggering the transmission of Other SI based on the detection of random access preambles The other SI may be broadcast on all DL beams/DL sweeping slots or on a subset of the DL beams/DL sweeping slots.

Figure 14:
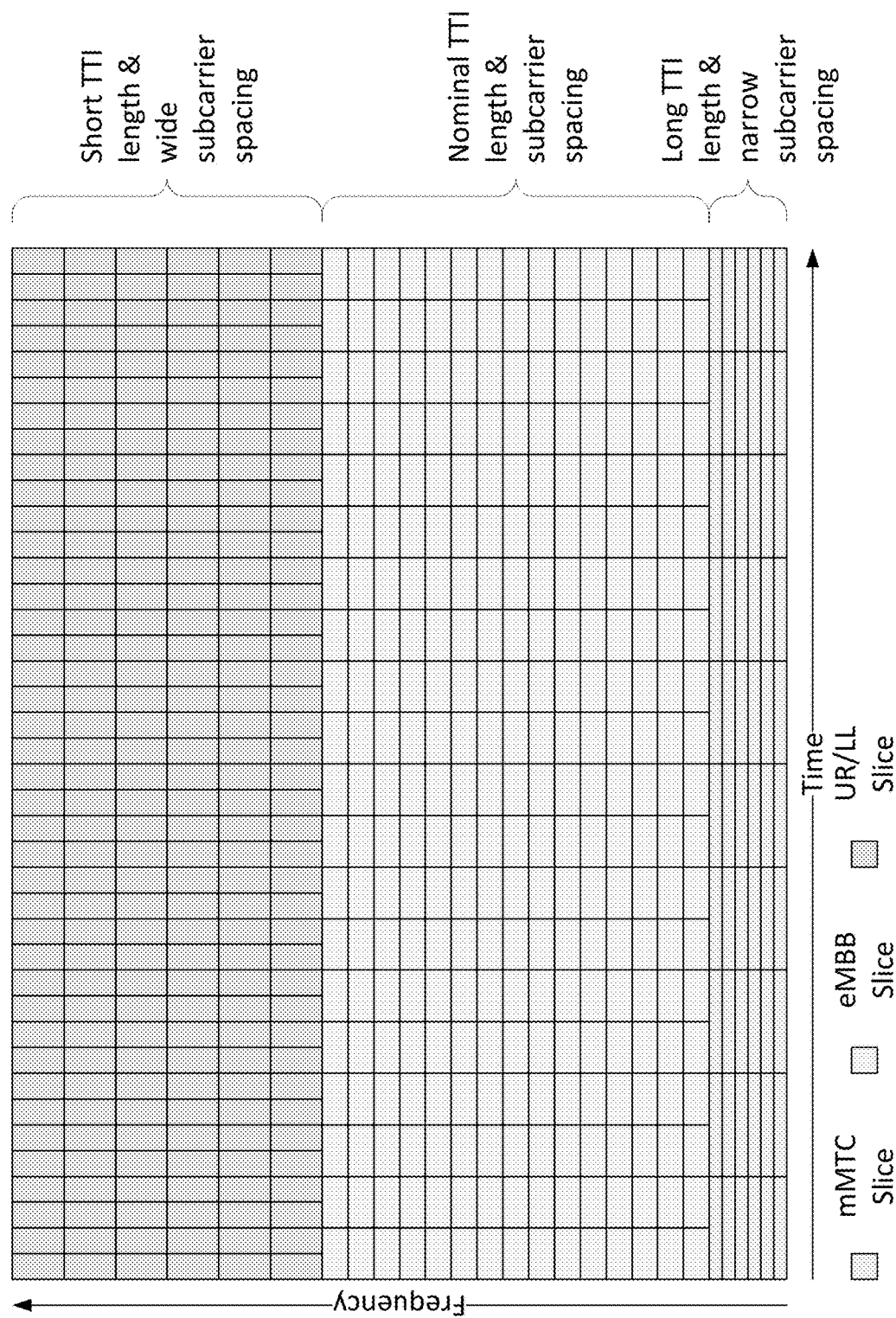
FIG. 14 is a diagram that illustrates an Exemplary Configuration to Support RAN Slicing.

It is also now a common belief that the New RAT (NR) will use beamforming for control information such as initial access information. Therefore, in this disclosure, a random access procedure assuming control information beamforming is also disclosed Radio Access Network (RAN) slicing has been proposed to support the diverse set of NextGen use cases and requirements being considered. A RAN configured for RAN slicing may support multiple numerologies, as shown in FIG. 14, where each numerology is optimized for the service provided by the slice.

For illustrative purposes, an eMBB numerology that is mainly based on LTE can be assumed; i.e. 15 kHz subcarrier spacing and 1 ms subframe. The numerologies for the mMTC and UR/LL slices shown in FIG. 14 would then be defined as shown in Table 7. However, the application does not require any of the numerologies to be based on the LTE numerology. The application also is not constrained to only be used for network configurations where the subcarrier spacing and subframe duration are integer multiples of each other.

TABLE 7

| Slice | Δf (kHz) | Subframe Duration (ms) |
|---|---|---|
| mMTC | 7.5 | 2 |
| eMBB | 15 | 1 |
| UR/LL | 30 | 0.5 |

New configurations for the PRACH resource can be used for transmission of the preamble during step 1 of the random access procedure. Extensions to the PRACH-Config and RACH-ConfigCommon IEs may be signaled as part of the System Information using broadcast or dedicated signaling; e.g. via SIB2, and used to specify the PRACH configuration and control the behavior of the UE when performing the random access procedure in a RAN configured to support RAN slicing and/or multiple use cases/services with different requirements. New methods to perform random access using the new PRACH resources can be used.

Common PRACH Resource

Figure 15:
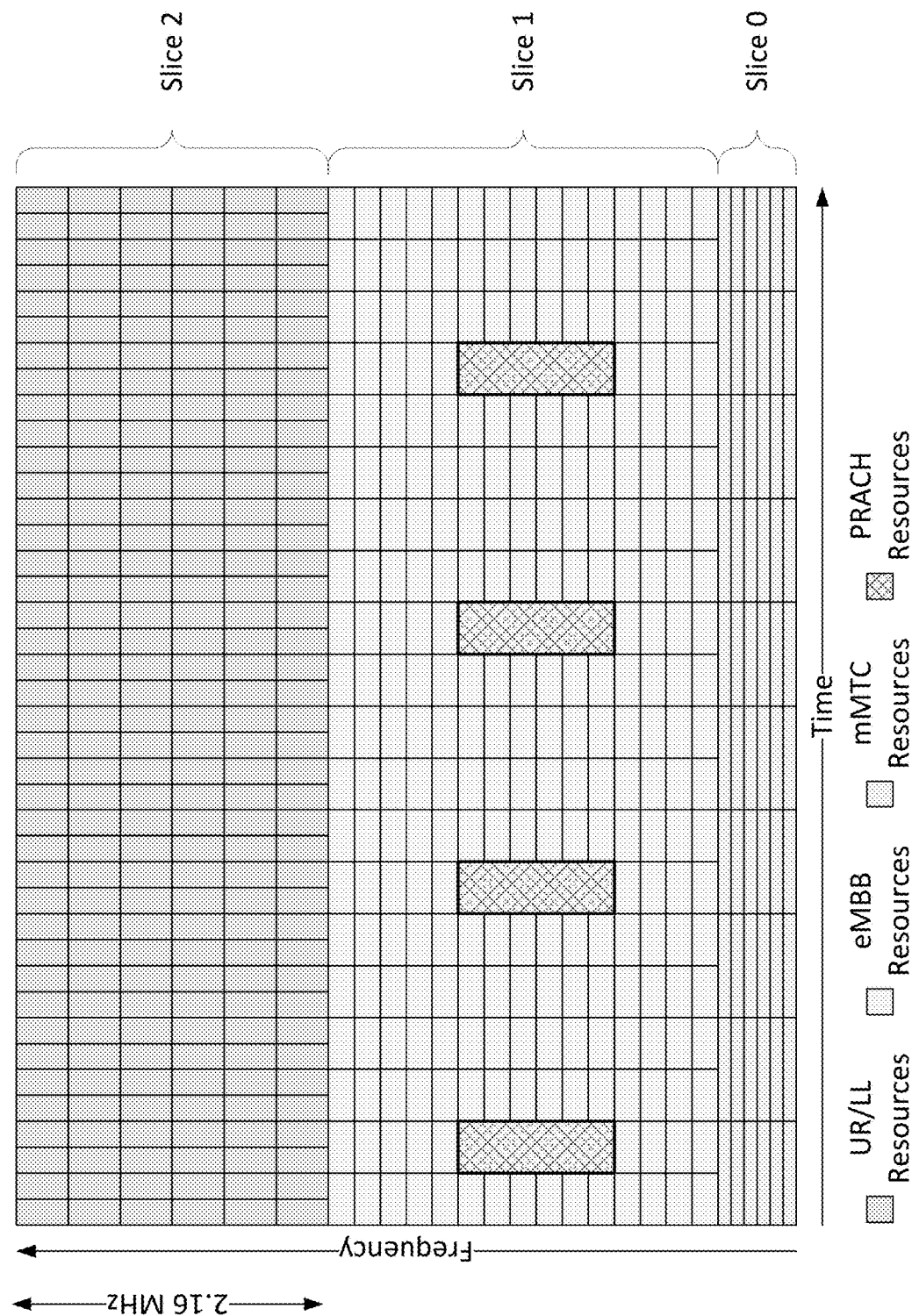
FIG. 15 is a diagram that illustrates a Common PRACH Resources.
Figure 16:
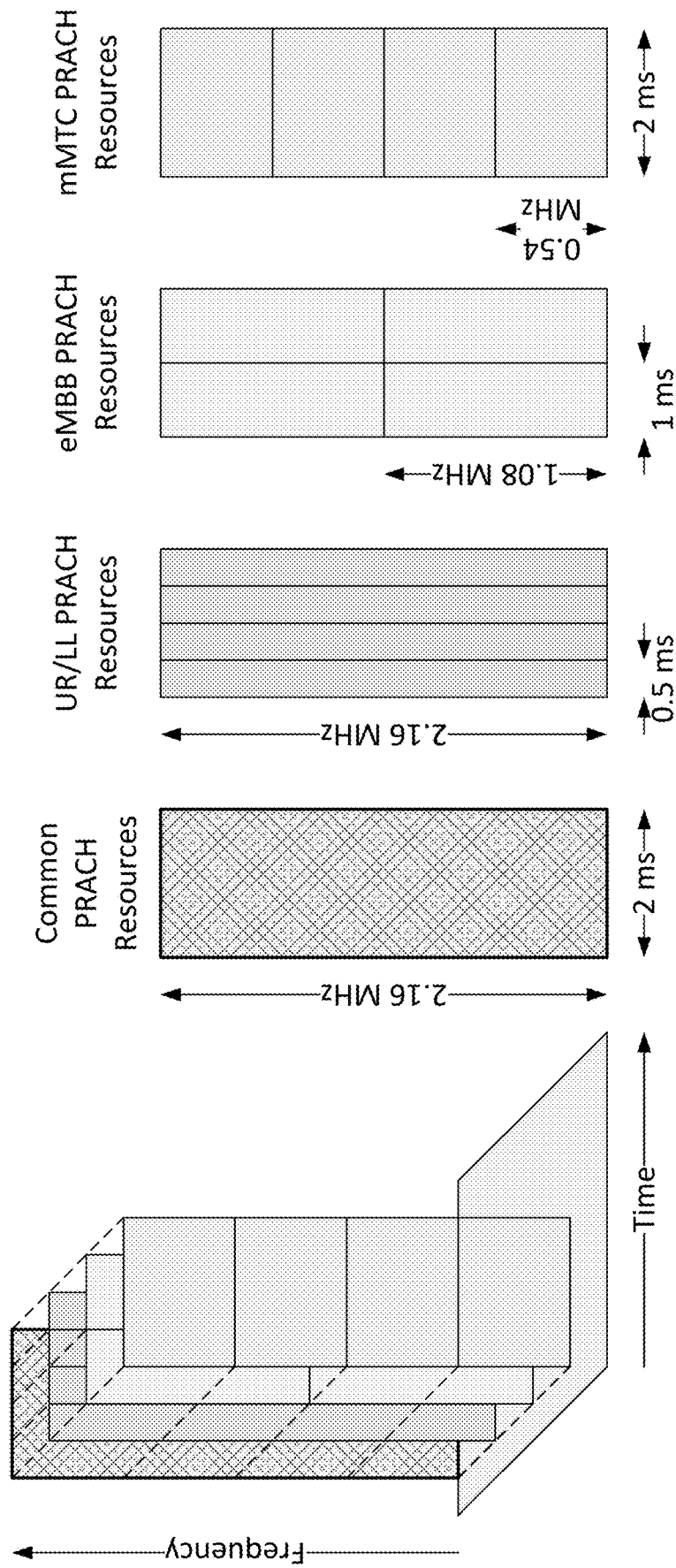
FIG. 16 is a diagram that illustrates a Common PRACH Resource Supporting Multiple Numerologies.

In this section, a common PRACH resource is defined. When initiating the random access procedure, the UE uses the common PRACH resource to transmit the random access preamble regardless of the device type and/or service(s) supported by the UE. The resources used to execute the remaining steps of the random access procedure can be selected based on the device type and/or the requested service(s). An exemplary embodiment of the common PRACH resource being used for a RAN supporting mMTC, eMBB and UR/LL slices is shown in FIG. 15.

In this embodiment of the invention, the common PRACH resource (which can be one or several PRACH resource sub-bands) is configured in the eMBB slice and each PRACH resource sub-band occupies K eMBB PRBs in the frequency domain and L eMBB (OFDM) symbols (where L symbols may be equal to or greater than 1 subframe) in the time domain. However, the invention supports configuration of the common PRACH resource in any of the available slices.

Alternatively, the numerology of the common PRACH resources (subcarrier spacing, symbol length, etc.) may be scaled with respect to numerology of the slice in which the common PRACH resource is configured or may use a numerology that is different; i.e. not based on the numerology of the slice in which the common PRACH resource is configured.

The common PRACH resources may be multiplexed with the rest of resources in the slices using TDM and FDM. The numerology (subcarrier spacing, symbol length, etc.) used by common PRACH resources sub-bands may be different than numerologies used by all Use Cases (such as, eMBB, mMTC, UR/LL) and their corresponding resource slices.

Which slice to use for the common PRACH resource can be determined by the network operator and may be dependent on the deployment scenarios, the supported services, the numerologies of the different slices, etc. For example, in some scenarios, it may be advantageous to configure the common PRACH resource in a slice using the legacy LTE numerology; i.e., Δf=15 kHz, Tsubframe=1 ms. Alternatively, the common PRACH resource could be configured in a slice using a narrower sub-carrier spacing/longer subframe, which may be advantageous for supporting low complexity IoT devices; or a slice using a wider subcarrier spacing/shorter subframe, which may be advantageous for supporting low latency devices.

The first physical resource block $n_{PRB}^{RA}$ allocated to a common PRACH resource sub-band can defined as $n_{PRB}^{RA} = n_{PRBoffset}^{RA}$, where $n_{PRBoffset}^{RA}$ is expressed as a physical resource block number and is signaled to the UE as part of the System Information; e.g. via the PRACH-FreqOffset IE. In a network supporting multiple numerologies, the definition of a PRB may be slice specific, and $n_{PRB\ offset}^{RA}$ offset can be defined assuming a default or reference PRB definition. The default/reference PRB definition may be based on the LTE definition, as defined in section 5.2.3 of 3GPP TS 36.211, or a New RAT (NR) PRB definition. The parameters used to define the default/reference PRB may be preconfigured at the UE or signaled as part of the System Information.

Alternatively, $n_{PRB\ offset}^{RA}$ can be defined as an offset in slice-specific PRBs relative to the first PRB of the slice in which the common PRACH resource is configured. The slice in which the common PRACH resource is configured may be signaled as part of the System Information. In one embodiment, a new IE called PRACH-Slice could be used to signal the slice in which the common PRACH resource is configured, where the slices are numbered as shown in FIG. 15; i.e. the value 0 maps to the slice in the lowest subband, the value 1 maps to the slice in the next higher subband, etc.

The bandwidth of the common PRACH resource, which can be expressed in numerology dependent PRBs, could also be signaled in the System Information. In one embodiment, a new IE called PRACH-BW could be used to signal the bandwidth of the common PRACH resource. An exemplary PRACH-Config IE that has been extended to include the PRACH-Slice and PRACH-BW IEs as shown below. According to this embodiment, maxSLICES is defined as 3. However, the application can be used with any number of slices.

Extended PRACH-ConfigInfo IE

```
-- ASN1START
PRACH-ConfigInfo ::=        SEQUENCE {
    prach-ConfigIndex           INTEGER (0..63),
    highSpeedFlag               BOOLEAN,
    zeroCorrelationZoneConfig   INTEGER (0..15),
    prach-FreqOffset            INTEGER (0..94),
    prach-Slice                 INTEGER {0..maxSLICES},
```

-continued

```
    prach-BW            ENUMERATED {n1, n2, n3, n4, n5, n6,
}                        n7, n8, n9, n10, n11, n12}
maxSLICES   INTEGER ::= 3    -- Maximum number of network slices
-- ASN1STOP
```

For LTE, the subcarrier spacing of the random access preamble, $\Delta f_{RA}$, is defined as 1.25 kHz for preamble formats 0-3 and 7.5 kHz for preamble format 4. For slices using a numerology that is different than the legacy LTE numerology, one option for defining $\Delta f_{RA}$ is to scale the LTE value by a factor equal to the ratio ($\Delta f/\Delta f0$) where $\Delta f$ is the subcarrier spacing of a given slice and $\Delta f0$=15 kHz is the subcarrier spacing for LTE. For small cell deployment scenarios, where a small cyclic prefix is used, the duration of the PRACH resource could be scaled by the inverse of this factor. Table 8 shows the exemplary common PRACH resource configurations for the described NR numerologies, where preamble formats A-E are based on the LTE preamble formats 0-4 respectively. In Table 8, the numerology of the eMBB slice corresponds to the LTE numerology. Also, the BW, when expressed in MHz, is dependent on the numerology specific PRB definition and subcarrier spacing.

preamble transmission is allowed. A similar mechanism can be used to signal this information for the common PRACH resource configuration. This index can be used to determine the parameters for a reference configuration, which may require numerology-dependent scaling by the UE depending on the numerology of the slice in which the common PRACH resources are configured.

For illustrative purposes, the parameters of the reference configuration can correspond to those that have been defined for LTE. And if it is assumed that the numerology of the eMBB slice is the same numerology of the reference configuration; i.e. based on LTE, then the parameters of the reference configuration can be used directly. The configuration of the common PRACH resource shown in FIG. 15-19 could then be signaled using Configuration Index 6 as described in Table 5.7.1-2 of 3GPP TS 36.211; i.e. preamble format 0, occurring in subframes 1 and 6 of every frame.

TABLE 8

| Preamble Format | $\Delta f$ = 7.5 kHz (mMTC) | | | $\Delta f$ = 15 kHz (eMBB) | | | $\Delta f$ = 30 kHz (UR/LL) | | |
|---|---|---|---|---|---|---|---|---|---|
| | $\Delta f_{RA}$ (kHz) | BW (MHz) | Duration (ms) | $\Delta f_{RA}$ (kHz) | BW (MHz) | Duration (ms) | $\Delta f_{RA}$ (kHz) | BW (MHz) | Duration (ms) |
| A | 0.625 | 0.54 | 2 | 1.25 | 1.08 | 1 | 2.5 | 2.16 | 0.5 |
| B | 0.625 | 0.54 | 4 | 1.25 | 1.08 | 2 | 2.5 | 2.16 | 1 |
| C | 0.625 | 0.54 | 4 | 1.25 | 1.08 | 2 | 2.5 | 2.16 | 1 |
| D | 0.625 | 0.54 | 6 | 1.25 | 1.08 | 3 | 2.5 | 2.16 | 1.5 |
| E | 3.75 | 0.54 | 0.28 & 0.33 | 7.5 | 1.08 | 0.14 & 0.17 | 15 | 2.16 | 0.07 & 0.08 |

The physical random access preamble is composed of a cyclic prefix and a preamble sequence part. For LTE, the length of the cyclic prefix (TCP) and the preamble sequences (TSEQ) are defined in terms of the basic time unit, Ts=1/(15000×2048) seconds. The value of TCP used for the different formats is dependent on the deployment scenario; e.g. macro cell, small cell, and does not need to be changed when using a different numerology. The value of TSEQ however is dependent on the numerology and therefore should be sized appropriately for the slice in which the common PRACH resource is allocated.

The preamble sequence length (TSEQ) should be defined such that the combined duration of the cyclic prefix, the preamble and the guard period are less than or equal to the duration of the PRACH resource in the time domain. It is also optimal if the duration of guard period is approximately equal to the duration of the cyclic prefix. Therefore, for some deployments, TSEQ for different numerologies may not simply be able to be scaled by the same factor that was used to scale the duration of the common PRACH resource. Furthermore, in scenarios where a large cyclic prefix is used, the common PRACH resource may need to extend into an additional symbol to accommodate the large cyclic prefix. Alternatively, the definition of the common PRACH resource could be extended in the frequency domain thereby allowing the same amount of information to be signaled using a shorter sequence length.

In LTE, the prach-ConfigIndex IE is used to signal the preamble format and the subframes in which random access If the common PRACH resource was instead configured for the mMTC slice, Configuration Index 6 would still be signaled to the UE. However, the mMTC parameters for Preamble Format A shown in Table 9 would be applied.

The occurrence of the common PRACH resource for the examples discussed in the previous paragraphs is the same; i.e. occurring in subframes 1 and 6 of every frame. However, since the duration of a subframe is dependent on the numerology of the slice, the periodicity of the PRACH resource in each slice is not the same. Table 9 shows the periodicity of the common PRACH resource corresponding to Configuration Index 6 for the exemplary NR numerologies.

TABLE 9

| $\Delta f$ (kHz) | $T_{Common\_PRACH\_Resource}$ | |
|---|---|---|
| | (subframes) | (ms) |
| 7.5 (mMTC) | 5 | 10 |
| 15 (eMBB) | 5 | 5 |
| 30 (UR/LL) | 5 | 2.5 |

In the above example, the prach-ConfigIndex IE is used to signal an index that corresponds to a reference configuration. How this configuration is interpreted by the UE is dependent on the numerology of the slice in which the common PRACH resource is configured; i.e. the UE performs any numerology-dependent scaling of the corresponding parameters that may be required.

Alternatively, the preamble formats could be defined such that the numerology is also implied by the preamble format. For example, the legacy preamble formats 0-4 could be used for slices based on the LTE numerology. Additional preamble formats could be defined for other supported numerologies; e.g., preamble formats 5-9 could be defined for slices based on the exemplary mMTC numerology and preamble formats 10-14 could be defined for slices based on the exemplary UR/LL numerology. Exemplary NR preamble formats are shown in Table 10. The definition of the PRACH Configuration Index could then be extended to include configurations 64-191 as shown in Table 10 to provide support for signaling numerology dependent random access configurations.

TABLE 10

| Preamble Format | $\Delta f_{RA}$ (kHz) | BW (MHz) | Duration (ms) |
|---|---|---|---|
| 0 | 1.25 | 1.08 | 1 |
| 1 | 1.25 | 1.08 | 2 |
| 2 | 1.25 | 1.08 | 2 |
| 3 | 1.25 | 1.08 | 3 |
| 4 | 7.5 | 1.08 | 0.14 & 0.17 |
| 5 | 0.625 | 0.54 | 2 |
| 6 | 0.625 | 0.54 | 4 |
| 7 | 0.625 | 0.54 | 4 |
| 8 | 0.625 | 0.54 | 6 |
| 9 | 3.75 | 0.54 | 0.28 & 0.33 |
| 10 | 2.5 | 2.16 | 0.5 |
| 11 | 2.5 | 2.16 | 1 |
| 12 | 2.5 | 2.16 | 1 |
| 13 | 2.5 | 2.16 | 1.5 |
| 14 | 15 | 2.16 | 0.07 & 0.08 |

The preamble formats defined in this table assume the PRACH resource occupies 6 PRBs. However the invention also supports defining new preamble formats where the PRACH is configured to occupy any number of PRBs.

TABLE 11

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |
| 64 | 5 | Even | 1 |
| 65 | 5 | Even | 4 |
| 66 | 5 | Even | 7 |
| 67 | 5 | Any | 1 |
| 68 | 5 | Any | 4 |
| 69 | 5 | Any | 7 |
| 70 | 5 | Any | 1, 6 |
| 71 | 5 | Any | 2, 7 |
| 72 | 5 | Any | 3, 8 |
| 73 | 5 | Any | 1, 4, 7 |
| 74 | 5 | Any | 2, 5, 8 |
| 75 | 5 | Any | 3, 6, 9 |
| 76 | 5 | Any | 0, 2, 4, 6, 8 |
| 77 | 5 | Any | 1, 3, 5, 7, 9 |
| 78 | 5 | Any | 0, 1, 2, 3, 4, 5, 6, 7, 8, 9 |
| 79 | 5 | Even | 9 |
| 80 | 6 | Even | 1 |
| 81 | 6 | Even | 4 |
| 82 | 6 | Even | 7 |
| 83 | 6 | Any | 1 |
| 84 | 6 | Any | 4 |
| 85 | 6 | Any | 7 |
| 86 | 6 | Any | 1, 6 |
| 87 | 6 | Any | 2, 7 |
| 88 | 6 | Any | 3, 8 |
| 89 | 6 | Any | 1, 4, 7 |
| 90 | 6 | Any | 2, 5, 8 |
| 91 | 6 | Any | 3, 6, 9 |
| 92 | 6 | Any | 0, 2, 4, 6, 8 |
| 93 | 6 | Any | 1, 3, 5, 7, 9 |
| 94 | N/A | N/A | N/A |
| 95 | 6 | Even | 9 |
| 96 | 7 | Even | 1 |
| 97 | 7 | Even | 4 |
| 98 | 7 | Even | 7 |
| 99 | 7 | Any | 1 |
| 100 | 7 | Any | 4 |
| 101 | 7 | Any | 7 |
| 102 | 7 | Any | 1, 6 |
| 103 | 7 | Any | 2, 7 |
| 104 | 7 | Any | 3, 8 |

TABLE 11-continued

| PRACH Configuration Index | Preamble Format | System frame number | Subframe number |
|---|---|---|---|
| 105 | 7 | Any | 1, 4, 7 |
| 106 | 7 | Any | 2, 5, 8 |
| 107 | 7 | Any | 3, 6, 9 |
| 108 | 7 | Any | 0, 2, 4, 6, 8 |
| 109 | 7 | Any | 1, 3, 5, 7, 9 |
| 110 | N/A | N/A | N/A |
| 111 | 7 | Even | 9 |
| 112 | 8 | Even | 1 |
| 113 | 8 | Even | 4 |
| 114 | 8 | Even | 7 |
| 115 | 8 | Any | 1 |
| 116 | 8 | Any | 4 |
| 117 | 8 | Any | 7 |
| 118 | 8 | Any | 1, 6 |
| 119 | 8 | Any | 2, 7 |
| 120 | 8 | Any | 3, 8 |
| 121 | 8 | Any | 1, 4, 7 |
| 122 | 8 | Any | 2, 5, 8 |
| 123 | 8 | Any | 3, 6, 9 |
| 124 | N/A | N/A | N/A |
| 125 | N/A | N/A | N/A |
| 126 | N/A | N/A | N/A |
| 127 | 8 | Even | 9 |
| 128 | 10 | Even | 1 |
| 129 | 10 | Even | 4 |
| 130 | 10 | Even | 7 |
| 131 | 10 | Any | 1 |
| 132 | 10 | Any | 4 |
| 133 | 10 | Any | 7 |
| 134 | 10 | Any | 1, 6 |
| 135 | 10 | Any | 2, 7 |
| 136 | 10 | Any | 3, 8 |
| 137 | 10 | Any | 1, 4, 7 |
| 138 | 10 | Any | 2, 5, 8 |
| 139 | 10 | Any | 3, 6, 9 |
| 140 | 10 | Any | 0, 2, 4, 6, 8 |
| 141 | 10 | Any | 1, 3, 5, 7, 9 |
| 142 | 10 | Any | 0, 1, 2, 3, 4, 5, 6, 7, 8, 9 |
| 143 | 10 | Even | 9 |
| 144 | 11 | Even | 1 |
| 145 | 11 | Even | 4 |
| 146 | 11 | Even | 7 |
| 147 | 11 | Any | 1 |
| 148 | 11 | Any | 4 |
| 149 | 11 | Any | 7 |
| 150 | 11 | Any | 1, 6 |
| 151 | 11 | Any | 2, 7 |
| 152 | 11 | Any | 3, 8 |
| 153 | 11 | Any | 1, 4, 7 |
| 154 | 11 | Any | 2, 5, 8 |
| 155 | 11 | Any | 3, 6, 9 |
| 156 | 11 | Any | 0, 2, 4, 6, 8 |
| 157 | 11 | Any | 1, 3, 5, 7, 9 |
| 158 | N/A | N/A | N/A |
| 159 | 11 | Even | 9 |
| 160 | 12 | Even | 1 |
| 161 | 12 | Even | 4 |
| 162 | 12 | Even | 7 |
| 163 | 12 | Any | 1 |
| 164 | 12 | Any | 4 |
| 165 | 12 | Any | 7 |
| 166 | 12 | Any | 1, 6 |
| 167 | 12 | Any | 2, 7 |
| 168 | 12 | Any | 3, 8 |
| 169 | 12 | Any | 1, 4, 7 |
| 170 | 12 | Any | 2, 5, 8 |
| 171 | 12 | Any | 3, 6, 9 |
| 172 | 12 | Any | 0, 2, 4, 6, 8 |
| 173 | 12 | Any | 1, 3, 5, 7, 9 |
| 174 | N/A | N/A | N/A |
| 175 | 12 | Even | 9 |
| 176 | 13 | Even | 1 |
| 177 | 13 | Even | 4 |
| 178 | 13 | Even | 7 |
| 179 | 13 | Any | 1 |
| 180 | 13 | Any | 4 |
| 181 | 13 | Any | 7 |
| 182 | 13 | Any | 1, 6 |
| 183 | 13 | Any | 2, 7 |
| 184 | 13 | Any | 3, 8 |
| 185 | 13 | Any | 1, 4, 7 |
| 186 | 13 | Any | 2, 5, 8 |
| 187 | 13 | Any | 3, 6, 9 |
| 188 | N/A | N/A | N/A |
| 189 | N/A | N/A | N/A |
| 190 | N/A | N/A | N/A |
| 191 | 13 | Even | 9 |

Common PRACH Resource Supporting Mixed Numerologies

In the above embodiments, it was assumed that the common PRACH resource was configured to use a single random access subcarrier spacing consistent with the numerology of the slice in which the common PRACH resource was configured. Alternatively, the common PRACH resource can be configured for simultaneous support of multiple random access subcarrier spacing's, e.g. mixed numerologies, thereby allowing the UE to use any of the supported random access subcarrier spacings for preamble transmission. The UE would then be capable of using a random access subcarrier spacing that is optimized for the device type and/or service request regardless of the numerology of the slice in which the common PRACH resource is configured. Furthermore, supporting this feature in the network can reduce the complexity of the UE since it could reduce the number of random access subcarrier spacings that would need to be supported by the UE; e.g. an mMTC device may only be required to support $\Delta fRA,mMTC=0.625$ kHz.

Figure 22:
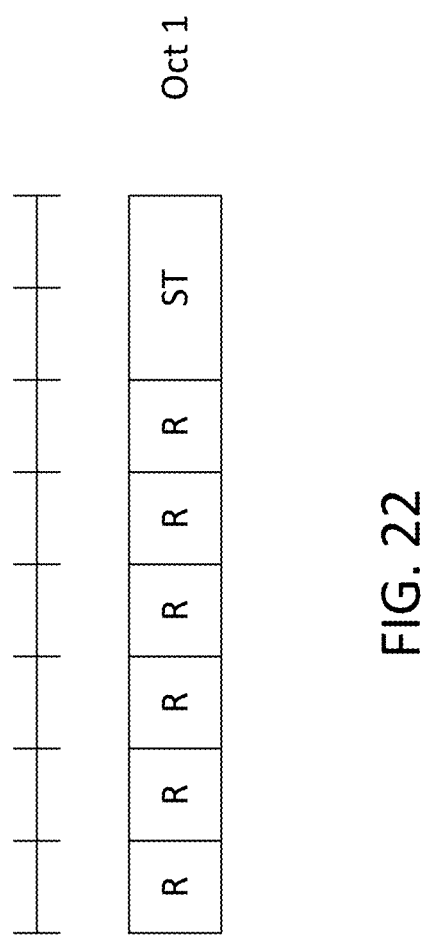
FIG. 22 is a diagram that illustrates Service Type MAC CE.

In one embodiment, the common PRACH resource would be configured with a BW wide enough to accommodate the numerology with the widest BW random access preamble and a duration long enough to accommodate the numerology with the longest duration random access preamble. Using the exemplary NR preamble numerologies described above, this would correspond to a BW of 6 UR/LL PRBs or 2.16 MHz in the frequency domain and a duration of 1 mMTC subframe or 2 ms in the time domain. A common PRACH resource configured in this way would be capable of simultaneously supporting 4 mMTC PRACH resources plus 4 eMBB PRACH resources plus 4 UR/LL PRACH resources as shown in FIG. 22.

Figure 23:
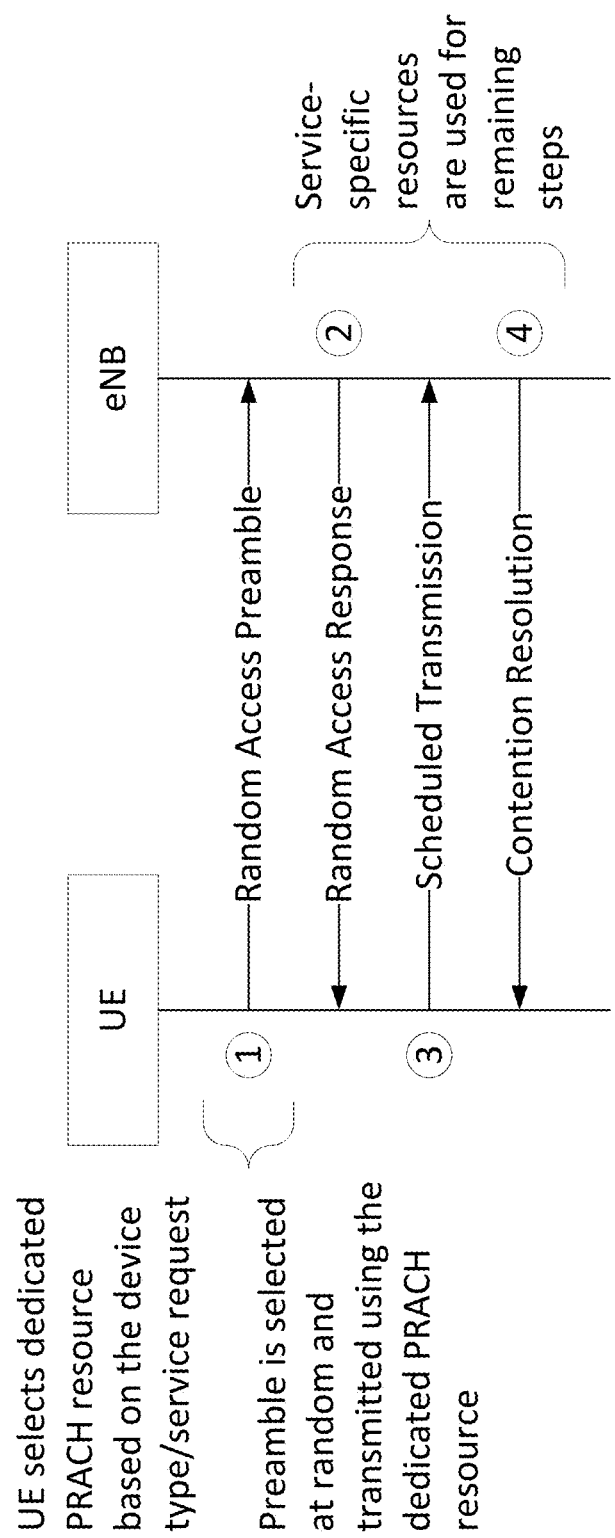
FIG. 23 is a diagram that illustrates a Random Access Procedure using Slice-Specific PRACH Resources.

The operator would be capable of configuring which PRACH resources were used based on the network requirements and the expected RACH intensity of a given service. For example, to ensure low latency the operator may configure 4 UR/LL PRACH resources. But if the density of mMTC devices is low, only 1 or 2 of the mMTC resources may be configured. A common PRACH resource configuration supporting 1 mMTC PRACH resource, 2 eMBB PRACH resources and 4 UR/LL PRACH resources is shown in FIG. 23.

Figure 24:
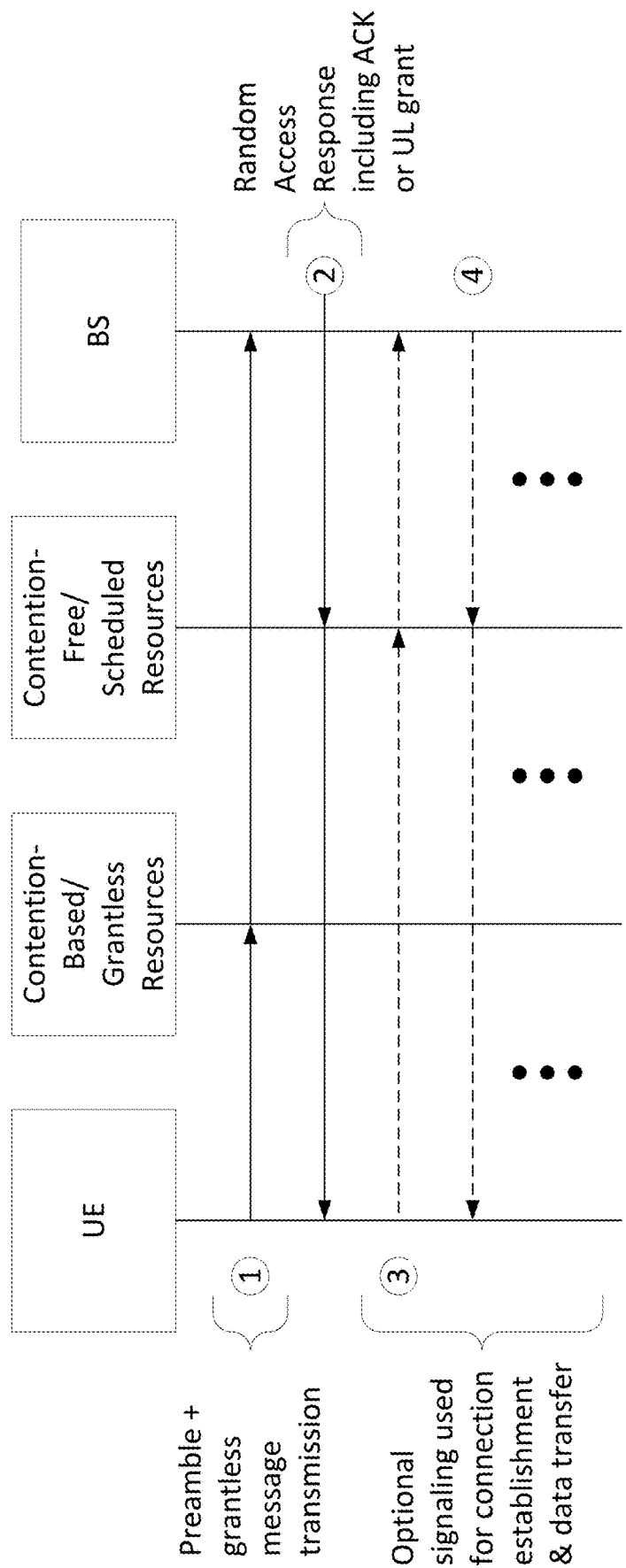
FIG. 24 is a diagram that illustrates a Random Access Procedure with Grant-less Transmission.

The PRACH resources could also be "stacked" in the frequency domain. FIG. 24 shows an exemplary common PRACH resource configuration supporting 2 "stacked" mMTC PRACH resource, 2 eMBB PRACH resources and 4 UR/LL PRACH resources.

In the above example, the additional PRACH resources can be configured to increase capacity. Alternatively, the additional PRACH resources could be used to increase reliability or coverage rather than adding capacity. For example, the additional UR/LL PRACH resources could be used for redundant transmissions of the random access preamble by UR/LL devices, thereby increasing the probability of preamble detection. The redundancy may be implemented using repetition of the same preamble sequence or a set of different preambles from a set of permissible groups of preambles may be used. The redundancy may be implemented in the in the time domain using PRACH resources in consecutive subframes or in the frequency domain using "stacked" PRACH resources. Alternatively, the UE may select a preamble at random for each PRACH opportunity, which would result in the UE performing multiple simultaneous random access procedures. The UE would then continue with execution of the procedure for which a Random Access Response (RAR) was received. If multiple RARs are received, the UE may optionally continue with multiple random access procedures.

Slice-Specific PRACH Resource

Figure 19:
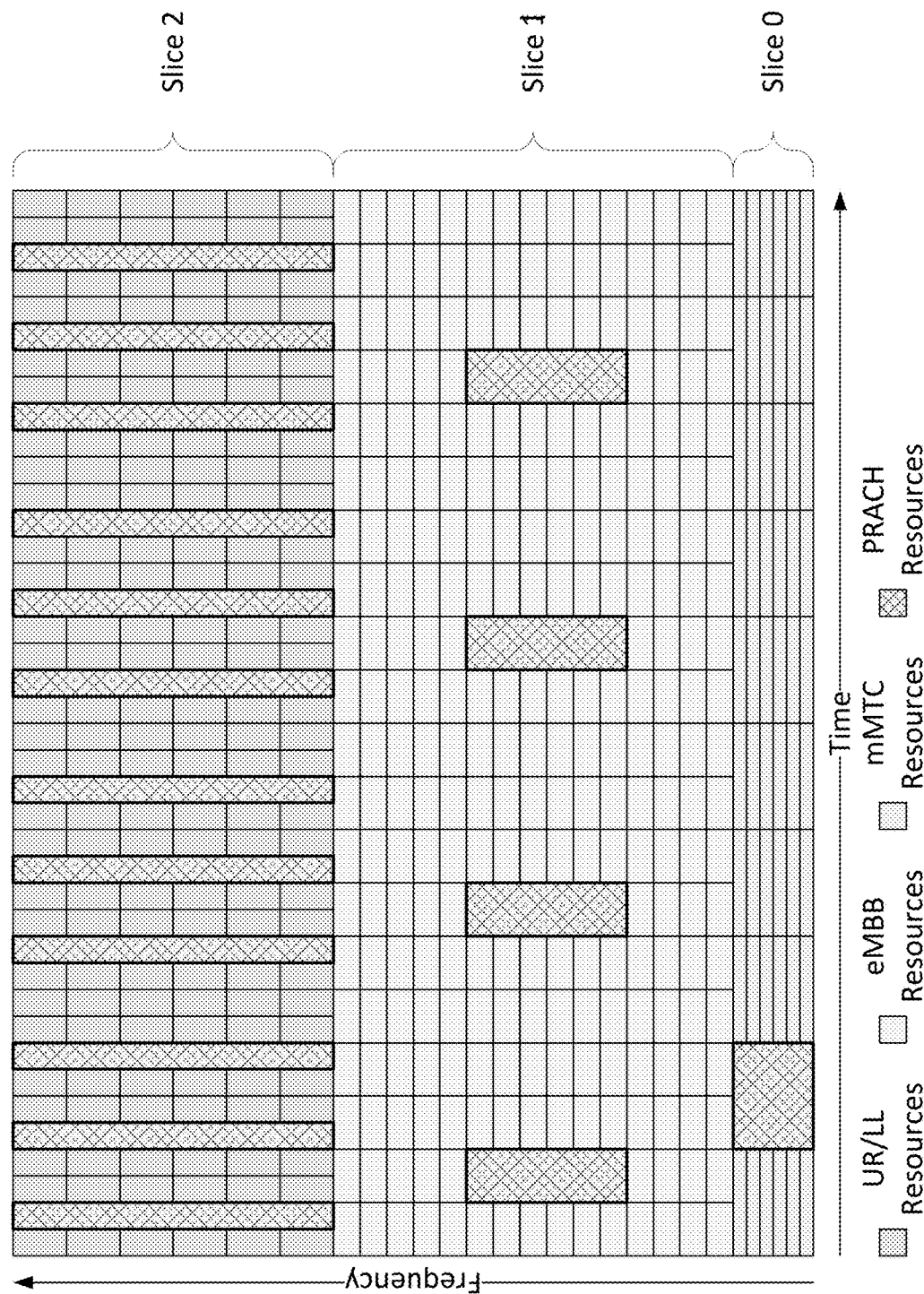
FIG. 19 is a diagram that illustrates a Slice-Specific PRACH Resources

In this section, the use of slice-specific PRACH resources for each slice is described. The UE selects the PRACH resource from the appropriate slice based on device type and/or service request. Resources from the selected slice may then be used for completion of the random access procedure; i.e., steps 1-4 of FIGS. 20, 23, and 24. An exemplary embodiment of slice-specific PRACH resources for a network supporting mMTC, eMBB and UR/LL slices is shown in FIG. 19.

In this embodiment of the invention, each slice-specific PRACH resource (which can be one or several PRACH resource sub-bands) is shown as occupying $K_i=6$ PRBs in the frequency domain and $L_i=1$ (OFDM) symbols (where $L_i$ symbols may be equal to or greater than 1 subframe) in the time domain of the corresponding slice. The subscript i on the terms K and L correspond to the slice number. However, the slice-specific PRACH resource is not constrained to occupy the same number of PRBs and subframes in each slice; nor is the invention constrained to only be used for network configurations where the numerologies for the different slices are integer multiples of each other. Alternatively, the slice-specific PRACH resources sub-bands may use a numerology (subcarrier spacing, symbol length, etc.) that is different than the slices of resources where the PRACH sub-bands are located (in frequency domain). The slice-specific PRACH resources may be multiplexed with the rest of the resources in the slices using TDM and FDM. The numerology (subcarrier spacing, symbol length, etc.) used by slice-specific PRACH resources sub-bands may be different than numerologies used by all Use Cases (such as, eMBB, mMTC, UR/LL) and their corresponding resource slices.

The configuration of slice-specific PRACH resources can be signaled to the UE as part of the System Information. In one embodiment, a reference configuration could be signaled to the UE. The parameters of the configuration would then be interpreted/scaled based on the numerology of the different slices before the UE applied the configuration.

Alternatively, the slice-specific random access configuration for each slice could be signaled to the UE explicitly. In one embodiment, slice-specific PRACH-Config IEs could be signaled as part of the System Information, thereby allowing the slice-specific PRACH resource to be configured independently for each slice. The System Information could also include slice-specific RACH-ConfigCommon IEs that could be used to signal the remaining parameters that are used to control the behavior of the random access procedure. An exemplary RadioResourceConfigCommon IE that has been extended to support slice-specific configuration of the slice-specific PRACH resources and generic random access parameters is shown below.

Extended RadioResourceConfigCommon IE

```
-- ASN1START
RadioResourceConfigCommonSIB ::=      SEQUENCE {
    rach-ConfigCommon                     SEQUENCE (SIZE (1..maxSLICES)) OF RACH-ConfigCommon,
    bcch-Config                           BCCH-Config,
    pcch-Config                           PCCH-Config,
    prach-Config                          SEQUENCE (SIZE (1..maxSLICES)) OF PRACH-ConfigSIB,
    pdsch-ConfigCommon                    PDSCH-ConfigCommon,
    pusch-ConfigCommon                    PUSCH-ConfigCommon,
    pucch-ConfigCommon                    PUCCH-ConfigCommon,
    soundingRS-UL-ConfigCommon            SoundingRS-UL-ConfigCommon,
    uplinkPowerControlCommon              UplinkPowerControlCommon,
    ul-CyclicPrefixLength                 UL-CyclicPrefixLength,
    ...,
    [[ uplinkPowerControlCommon-v1020     UplinkPowerControlCommon-v1020    OPTIONAL    -- Need OR
    ]],
    [[ rach-ConfigCommon-v1250            RACH-ConfigCommon-v1250           OPTIONAL    -- Need OR
    ]],
    [[ pusch-ConfigCommon-v1270           PUSCH-ConfigCommon-v1270          OPTIONAL    -- Need OR
    ]]
}
RadioResourceConfigCommon ::=         SEQUENCE {
    rach-ConfigCommon                     SEQUENCE (SIZE (1..maxSLICES)) OF RACH-ConfigCommon
                                                                            OPTIONAL,   -- Need ON
    prach-Config                          SEQUENCE (SIZE (1..maxSLICES)) OF PRACH-Config,
    pdsch-ConfigCommon                    PDSCH-ConfigCommon                OPTIONAL,   -- Need ON
    pusch-ConfigCommon                    PUSCH-ConfigCommon,
    phich-Config                          PHICH-Config                      OPTIONAL,   -- Need ON
    pucch-ConfigCommon                    PUCCH-ConfigCommon                OPTIONAL,   -- Need ON
    soundingRS-UL-ConfigCommon            SoundingRS-UL-ConfigCommon        OPTIONAL,   -- Need ON
    uplinkPowerControlCommon              UplinkPowerControlCommon          OPTIONAL,   -- Need ON
    antennaInfoCommon                     AntennaInfoCommon                 OPTIONAL,   -- Need ON
    p-Max                                 P-Max                             OPTIONAL,   -- Need OP
    tdd-Config                            TDD-Config                        OPTIONAL,   -- Cond TDD
    ul-CyclicPrefixLength                 UL-CyclicPrefixLength,
```

-continued

```
    ...,
    [[ uplinkPowerControlCommon-v1020    UplinkPowerControlCommon-v1020    OPTIONAL   -- Need ON
    ]],
    [[ tdd-Config-v1130                   TDD-Config-v1130                  OPTIONAL   - Cond TDD3
    ]],
    [[ pusch-ConfigCommon-v1270           PUSCH-ConfigCommon-v1270          OPTIONAL   -- Need OR
    ]],
    [[ uplinkPowerControlCommon-v13xy    UplinkPowerControlCommon-v13xy    OPTIONAL   -- Need ON
    ]]
}
RadioResourceConfigCommonPSCell-r12 ::= SEQUENCE {
    basicFields-r12                       RadioResourceConfigCommonSCell-r10,
    pucch-ConfigCommon-r12                PUCCH-ConfigCommon,
    rach-ConfigCommon-r12                 RACH-ConfigCommon,
    uplinkPowerControlCommonPSCell-r12    UplinkPowerControlCommonPSCell-r12
    ...,
    [[ uplinkPowerControlCommon-v13xy    UplinkPowerControlCommon-v13xy    OPTIONAL        -- Need
ON
    ]]
}
maxSLICES   INTEGER ::= 3   -- Maximum number of network slices
-- ASN1STOP
```

In this embodiment, maxSLICES is defined as 3. However, the application can be used with any number of slices.

To configure the slice-specific PRACH resources as shown in FIG. 13, the network could use the Extended RadioResourceConfigCommon IE to explicitly signal the PRACH-Config-Common and PRACH-Config IEs that applied for each slice. The network would signal Values of 3, 6 and 9 for the prach-ConfigIndex IEs and values of 0, 4 and 0 for the prach-FreqOffset IEs for the mMTC, eMBB and UR/LL slices respectively. The exemplary values signaled for the prach-ConfigIndex IEs assume $n_{PRB\ offset}^{RA}$ is defined as an offset in slice-specific PRBs relative to the first PRB of the slice in which the slice-specific PRACH resource is configured.

When initiating the random access procedure, the UE selects the PRACH resource based on the service being requested. Resources from the corresponding slice may then be used for completion of the random access procedure. Mechanisms for PRACH resource selection and execution of the random access procedure are further described below.

Random Access Procedure

According to a further embodiment, the steps of the LTE contention-based random access procedure are shown in FIG. 19. A similar procedure can be used to perform contention based random access in a NextGen network, however the steps of the procedure will be enhanced as discussed below. For illustrative purposes, the contention based random access procedure can be initiated by the RRC sublayer to establish an RRC connection with the network.

Before initiating the random access procedure, the UE obtains the required configuration parameters. The System Information may be acquired using a System Information Acquisition procedure such as the one described in 3GPP TS 36.331 or any other mechanism that has be designed for acquisition of system information in the NextGen network.

In one embodiment, the configuration parameters needed to perform the random access procedure are included in the PRACH-Config and RACH-ConfigCommon IEs that are signaled as part of the System Information. Below, extensions are described to these IEs to configure the PRACH resources and control the behavior of the UE when performing the random access procedure in a network configured to use the common PRACH resource or the slice-specific PRACH resource.

Higher layers are aware of the device type and/or service request. This information can be provided to MAC sublayer when higher layers request initiation of the random access procedure, and that the MAC sublayer uses this information when initializing and executing the random access procedure. Alternatively, the device type/service request may be configured in a non-volatile or semi-static parameter that is read by the MAC entity when performing initialization of the random access procedure.

Random Access Procedure Using Common PRACH Resources

In this embodiment, the scenario where the network is configured to use common PRACH resources is described. The first step uses the common PRACH resource. Some or all of the remaining steps of the random access procedure optionally use resources from a service-specific slice. A signaling diagram for the random access procedure using common PRACH resources is shown in FIG. 20.

Figure 20:
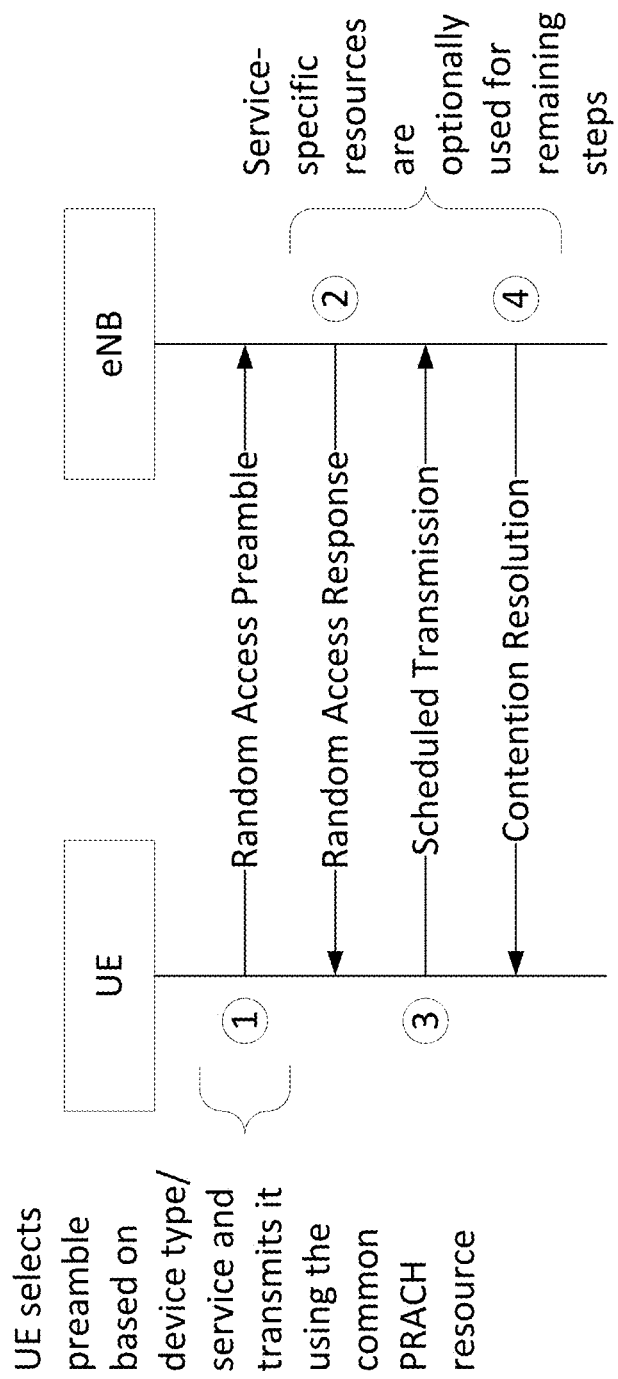
FIG. 20 is a diagram that illustrates a Random Access Procedure using Common PRACH Resources.

Step 0 in FIG. 20 is related to Initialization. Here, the UE obtains the required configuration parameters. The configuration parameters for the common PRACH resource may be signaled to the UE using the extensions to the PRACH-Config IE.

When higher layers request the initiation of the random access procedure, the MAC entity performs random access resource selection, which may be in accordance with the procedures described in section 5.1.2 of 3GPP TS 36.331 or any other procedure designed for random access resource selection. When selecting the preamble, the MAC entity first selects the group based on the amount of data the terminal needs to transmit in Step 3. If the groups are partitioned into service-specific subsets, the MAC selects the preamble at random from a service-specific subset of the selected group, where the service-specific subset is selected based on the device type/service requested. Otherwise, the MAC entity selects a preamble at random from the selected group.

For the beam-centric architecture, the eNB may transmit the beamformed initial access information such as system information, synchronization, and broadcasting information, via multiple OFDM symbols. The antenna beam may be steered toward a single direction on each OFDM symbol to enhance the cell coverage. Another option is that mini-subframe (e.g., with 12 or less than 14 OFDM symbols) may be defined and used to transmit the initial access information; so that the initial access overhead time can be reduced via using the short mini-subframe. The initial access symbols can be configured or predefined and may be periodically or dynamically transmitted to the UE from the eNB. Alternatively, since beam sweeping might be used at least on DL direction, each Tx beam at the eNB may also systematically transmit beamformed initial access information, in order to increase the probability of UEs in the coverage of each NR eNB Tx beam, to received initial access information, to reliability identify the best UE's DL Rx beam, best NR eNB's Tx beam and reduced initial access latency.

As indicated above, the transmission of synchronization signals (for cell search i.e. acquisition of frequency and symbol synchronization to a cell, acquisition of frame timing of the cell and determination of the physical layer cell identify of the cell) and broadcast channels (e.g., PBCH carrying MIB and PDSCH carrying the various SIBs) and DL reference signals may be beamformed.

The UE uses these beamformed signals received from the eNB to identify the best or preferred UE's DL Rx beam and the best or preferred NR eNB's DL Tx beam. The UE may feedback the best or preferred NR eNB's DL Tx beam information to the NR eNB in Step 1 i.e., with the PRACH Preamble transmission.

A mapping between UE Tx beam and one or more of the PRACH preambles and RACH resources in frequency and time domains may be envisaged. The eNB may use this mapping to derive the UE best or preferred UE's UL Tx beam i.e., the UE's Tx beam from which the received preamble (among all potentially UL Tx beam) is from. The eNB may also identify/record the best NR eNB's UL Rx beam associated with the received preamble. The eNB may feedback to the UE, the best or preferred UE's UL Tx beam information for e.g., in Step 2.

Figure 21:
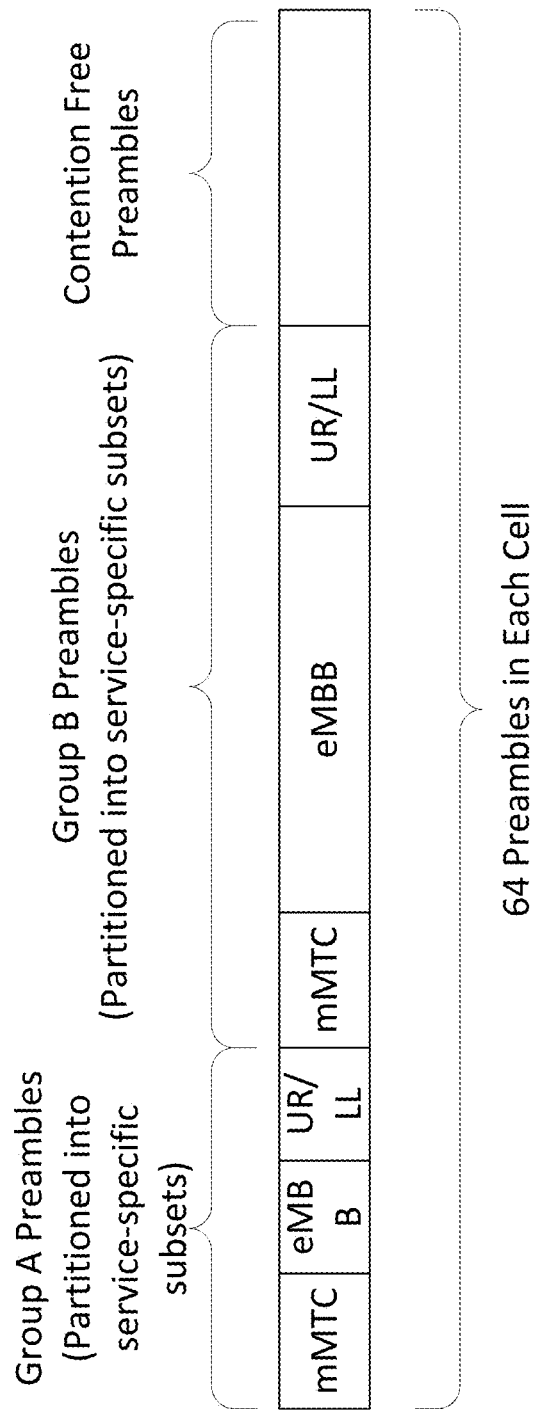
FIG. 21 is a diagram that illustrates a Service-Based Partitioning of Random Access Preambles.

To allow the UE to indicate the device type/service request to the network at the time of preamble transmission, the preamble groups can be partitioned into service-specific subsets based on the slice-specific services provided by the network as shown in FIG. 21. When initializing the random access procedure, the UE selects a preamble from the appropriate group and service-specific subset.

Alternatively, if the common PRACH resource is configured to support mixed numerologies, then the numerology used to transmit the preamble would indicate the device type/service request to the network. FIG. 21 illustrates service-based partitioning of random access preambles. Random Access Response (RAR) message Step 1 of FIG. 20 is directed to Preamble Transmission. In step 1 of the random access procedure, the UE transmits the selected random access preamble. The power level at which the preamble is transmitted can be dependent on the device type and/or service requested.

In one embodiment, the UE transmits the selected random access preamble in accordance with the procedure described in section 5.1.3 of 3GPP TS 36.331. The preamble is transmitted at a power level that is controlled by the parameter PREAMBLE_RECEIVED_TARGET_POWER, which is set to preambleInitialReceivedTargetPower+DELTA_PREAMBLE+(PREAMBLE_TRANSMISSION_COUNTER−1)*powerRampingStep. The DELTA_PREAMBLE can be configured such that the offset is also dependent on the device type and/or service requested. The DELTA_PREAMBLE_VALUE would then be selected based on the preamble format and the device type/service requested. A set of exemplary device/service dependent preamble offsets for mMTC, eMBB and UR/LL devices/services is shown in Table 12 below. In this example, the eMBB values are equal to the values used for LTE.

TABLE 12

| Preamble Format | DELTA_PREAMBLE_VALUE (dB) | | |
|---|---|---|---|
| | mMTC | eMBB | UR/LL |
| 0 | −3 | 0 | 3 |
| 1 | −3 | 0 | 3 |
| 2 | −6 | −3 | 0 |
| 3 | −6 | −3 | 0 |
| 4 | 5 | 8 | 11 |

For the beam-centric architecture, the UE may receive the required configuration parameters via multiple beams. The UE may select the best or preferred UE Rx beam and NR eNB Tx beam based on DL beamformed initial access signaling measurements and provide feedback with the best or preferred NR eNB's Tx beam index to the eNB. By utilizing beam reciprocity, the UE may transmit PRACH preamble using the resources selected based on the mechanisms in the previous sections and the eNB is receiving it using the selected beam with high RX antenna array gain towards the transmitting UE.

For TDD system, due to channel reciprocity, the UE (with MIMO capability) may apply the beamforming weights based on the DL initial access beamforming information, and then transmit the beamformed PRACH preamble to further enhance the PRACH Tx performance gain.

For FDD system, similar procedure may be applied at the UE site to transmit PRACH preamble via multiple symbols with beam steered toward a single direction on each OFDM symbol to enhance the coverage for random access procedure. Note that for the static or semi-static scenarios, this UL beam sweeping and beam selection procedure may not need to be conducted frequently, the UE can perform it, record the beam index and use it for a long time period. Then the same PRACH preamble may be reused by different UEs belonging to different spatially separated directional beams to enhance the PRACH capacity. The UE may feedback to the NR eNB, the best or preferred NR eNB's DL Tx beam information with the preamble transmission.

In step 2 of FIG. 20, the UE monitors the DL control channel, e.g., PDCCH, for Random Access Responses (RARs). The network can transmit the RAR using resources from the DL slice that corresponds to the device type/service requested. The network determines the device type/service requested based on the service-specific subset from which the preamble was chosen. This info is used by the network when determining which slice to use for transmission of the RAR.

Alternatively, the DL resources from the slice that correspond to the slice in which the common PRACH resource is configured could be used to signal the RAR. In this embodiment, the RAR can be extended to include an IE to indicate the slice that should be used for remainder of the random access procedure; i.e. transmission of Msg3 and reception of Msg4.

The RAR may include a Timing Advance (TA) command that indicates the change of the uplink timing relative to the current uplink timing.

In one embodiment, the TA command may be represented as a multiple of the basic unit of time as in LTE; i.e. multiples of 16·Ts. Alternatively, the timing advance command could be represented as a multiple of a slice-specific basic time unit. The slice specific basic time unit could be defined as follows for the exemplary numerologies considered:

$Ts,mMTC=(\Delta f/\Delta fmMTC) \times Ts = 2 \cdot Ts$ $Ts,eMBB=(\Delta f/\Delta feMBB) \times Ts = Ts$ $Ts,UR/LL=(\Delta f/\Delta fmMTC) \times Ts = \frac{1}{2} \cdot Ts$ Whether the TA command is represented as multiples of a reference value of Ts or as multiples of a slice-specific value of Ts could be standardized/pre-configured at the UE or signaled via the System Information; i.e. when requesting mMTC services, the TA could be expressed as a multiple of Ts,mMTC regardless of the slice in which the Common Preamble is configured or the TA command could be represented as multiples of a reference value of Ts regardless of the slice in which the common PRACH resource is configured or the service being requested.

The RAR may carry a backoff value for random access procedures. One example of backoff signaling is that a Backoff Indicator subheader is included in the RAR, the MAC entity sets the backoff parameter value as indicated by the BI field of the Backoff Indicator subheader. The definition of the Backoff Parameters can be extended such that the value is also dependent on the device type/service requested. The value of the Backoff Parameter would then be selected based on the BI field of the Backoff Indicator subheader and device type/service that was requested. A set of exemplary device/service dependent Backoff Parameter values for mMTC, eMBB and UR/LL devices/services is shown in Table 13 below.

Step 3 of FIG. 20 describes a Terminal Identification and Connection Request. Here, the UE transmits a message used to establish a connection. The message is transmitted using the UL resources assigned in the grant that was part of the RAR received in Step 2. The message may include one more IEs that can be used to assist the network with establishing the connection.

In one embodiment, the UE may transmit an RRCConnectionRequest message. This message includes an establishmentCause field that provides the establishment cause for the RRC connection request as provided by the upper layers. The definition of the EstablishmentCause IE can be extended to allow the UE to indicate the type of service being requested as shown below. The network may use the info to assist with slice (re-)selection in the RAN and/or CN.

When the random access preambles are partitioned as described in this example, the type of service request may not need to be explicitly signaled in the RRCConnectionRequest message. However, the invention does not preclude signaling of the requested service type using the Extended EstablishmentCause IE in this scenario.

Extended EstablishmentCause IE

```
-- ASN1START
EstablishmentCause ::=   ENUMERATED {
                           emergency, highPriorityAccess, mt-Access, mo-Signalling,
                           mo-Data, delayTolerantAccess-v1020, mo-VoiceCall-v1280,
                           mMTCAccess, eMBBAccess, URLLAccess}
-- ASN1STOP
```

Alternatively, the type of service request could be indicated using a Service Type MAC CE defined as shown below.

TABLE 13

Backoff Parameter Value (ms)

| Index | mMTC | eMBB | UR/LL |
|---|---|---|---|
| 0 | 0 | 0 | 0 |
| 1 | 10 | 10 | 2 |
| 2 | 20 | 20 | 5 |
| 3 | 30 | 30 | 10 |
| 4 | 40 | 40 | 15 |
| 5 | 60 | 60 | 20 |
| 6 | 80 | 80 | Reserved |
| 7 | 100 | 120 | Reserved |
| 8 | 500 | 160 | Reserved |
| 9 | 1000 | 240 | Reserved |
| 10 | 10000 | 320 | Reserved |
| 11 | 30000 | 480 | Reserved |
| 12 | 60000 | 960 | Reserved |
| 13 | Reserved | Reserved | Reserved |
| 14 | Reserved | Reserved | Reserved |
| 15 | Reserved | Reserved | Reserved |

The eNB may feedback to the UE, the UE's best or preferred UE's UL Tx beam information in the Random Access response (RAR) message. The UE may uses this information to select the Tx beam to use for Message 3 (Msg3) transmission in step 3 of FIG. 20.

The eNB may transmit the RAR message on NR eNB's best DL Tx beam identified from the PRACH Preamble transmission in Step 1.

The UE may also use the RAR message to identify the best or preferred NR eNB's DL Tx beam.

TABLE 14

| ST | Service Type |
|---|---|
| 0 | mMTC |
| 1 | eMBB |
| 2 | UR/LL |
| 3 | Reserved |

TABLE 15

| Index | LCID Values |
|---|---|
| 00000 | CCCH |
| 00001-01010 | Identity of the logical channel |
| 01011 | CCCH |
| 01100-10100 | Reserved |
| 10101 | Service Type |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

The UE may transmit Msg3 on the beam identified as best or preferred UE's UL Tx beam in RAR message ny the NR eNB.

The UE may provide feedback to the NR eNB. This may be the best or preferred NR eNB DL Tx beam identified in Step 0 of FIG. 20 or Step 2 of FIG. 20.

Step 4 of FIG. 20 describes Contention Resolution. HContention resolution may be performed as described in section 5.1.5 of 3GPP TS 36.321 or in accordance with any other mechanism designed for contention resolution in a NextGen network. The eNB may transmit Message 4 on NR eNB's best DL Tx beam communicated to the eNB by the UE in Step 1 of FIG. 20 or in Step 3 of FIG. 20.

It is understood that the entities performing the steps illustrated in FIG. 20 may be logical entities that may be implemented in the form of software (i.e., computer-executable instructions) stored in a memory of, and executing on a processor of, an apparatus configured for wireless and/or network communications or a computer system such as those illustrated in FIGS. 1B and F. That is, the method(s) illustrated in FIG. 20 may be implemented in the form of software (i.e., computer-executable instructions) stored in a memory of an apparatus, such as the apparatus or computer system illustrated in FIGS. 1B and F, which computer executable instructions, when executed by a processor of the apparatus, perform the steps illustrated in FIG. 20. It is also understood that any transmitting and receiving steps illustrated in FIG. 20 may be performed by communication circuitry of the apparatus under control of the processor of the apparatus and the computer-executable instructions (e.g., software) that it executes.

Random Access Procedure Using Slice-Specific PRACH Resources

In yet even a further embodiment, a scenario where the network is configured to use slice-specific PRACH resources is described. Step 1 of FIG. 23 of the procedure uses the slice-specific PRACH resource, which is selected by the UE based on the device type/service request. The remaining steps of the random access procedure use resources from the selected service-specific slice. A signaling diagram for the random access procedure using slice-specific PRACH resources is shown in FIG. 23.

Step 0 of FIG. 23 describes an Initialization procedure. The UE obtains the required configuration parameters. The configuration parameters for the slice-specific PRACH resources may be signaled to the UE using the Extended RadioResourceConfigCommon IE.

When higher layers request the initiation of the random access procedure, the MAC entity first selects a slice from which the PRACH preambles will be selected. The slice that is selected by the UE is determined based on device type/ service requested. Thereafter, the MAC entity performs random access resource selection in accordance with the procedure described in section 5.1.2 of 3GPP TS 36.331 or any other procedure designed for random access resource selection.

For the slice-specific procedure, different PRACH numerologies are needed to support different deployments scenarios; hence, need to support different sizes and correspondingly different numbers of symbols per initial access subframe or mini-subframe for each numerology in the NR.

Step 1 of FIG. 23 describes Preamble Transmission. Here, the UE transmits the selected random access preamble. The power level at which the preamble is transmitted can be dependent on the device type and/or service requested. In one embodiment, the power level at which the preamble is transmitted is dependent on slice-specific PowerRamping-Parameters signaled via the Extended RadioResourceConfigCommon IE and a device/service dependent DELTA_PREAMBLE_VALUE, such as those proposed in FIG. 23. Similar mechanism can be applied for the beam-centric model.

Again, for the slice-specific procedure, different PRACH numerologies are needed to support different deployments scenarios; hence, need to support different sizes and correspondingly different numbers of symbols per PRACH subframe or mini-subframe for each numerology in the NR.

Step 2 of FIG. 23 describes a Random Access Response Reception. Here, the UE monitors the DL control channel, e.g. PDCCH for RARs. The UE can use slice-specific configuration parameters to control the UE behavior. In one embodiment, the UE can use the slice-specific ra-SupervisionInfo when executing this step of the procedure. For example, when determining the size of the RAR window, the UE would use the slice-specific ra-ResponseWindowSize signaled via the Extended RadioResourceConfigCommon IE. The UE would also use the slice-specific preambleTransMax parameter when determining if another Random Access transmission should be made if the RAR reception is considered not successful.

The RAR may include a Timing Advance (TA) command. If the RAR includes a Backoff Indicator subheader, the UE can apply a slice-specific Backoff Parameter value, such as those proposed in Table 13 above.

The network can transmit the RAR using DL resources corresponding to the UL slice on which the preamble was detected. Therefore, the UE would only be required to monitor the DL control channel; e.g. PDCCH, for RARs on the corresponding DL slice. For example, if the UE uses the UR/LL slice to transmit the random access preamble, then the UE would monitor the DL control channel; e.g. PDCCH, for RARs on the corresponding UR/LL DL slice.

Step 3 describes a Terminal Identification and Connection Request. Here, the UE transmits a message that is used to establish a connection; e.g. an RRCConnectionRequest message. The message is transmitted using the UL resources assigned in the grant that was part of the RAR received in Step 2 of FIG. 23. The message may include one more IEs that can be used to assist the network with establishing the connection using the Extended EstablishmentCause IE or the Service Type MAC CE.

Figure 17:
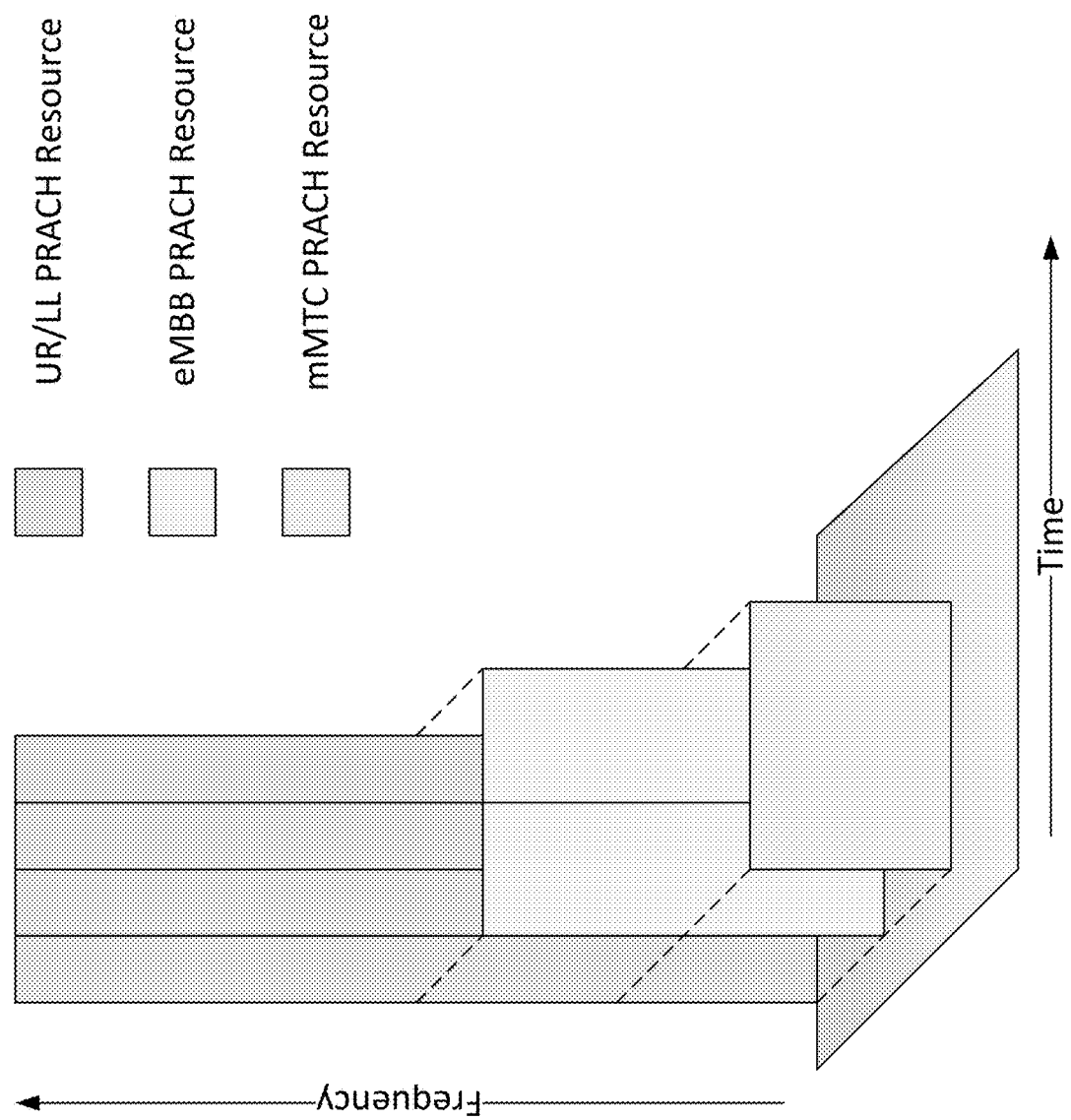
FIG. 17 is a diagram that illustrates an Exemplary Common PRACH Resource Configuration Supporting 1mMTC, 2 eMBB and 4 UR/LL PRACH Resources.

In step 4 of FIG. 17 of the random access procedure, contention resolution is performed. Contention resolution may be performed as described in section 5.1.5 of 3GPP TS 36.321 or in accordance with any other mechanism designed for contention resolution.

In one embodiment, after transmission of Msg3, the UE sets the mac-ContentionResolutionTimer and waits for a contention resolution message to be received, i.e., Msg4. The UE can set the mac-ContentionResolutionTimer to a slice-specifc value signaled via the Extended RadioResourceConfigCommon. If the Contention Resolution is considered not successful, the UE would also use the slice-specific preambleTransMax parameter when determining if another Random Access transmission should be made.

Random Access with Grantless Transmission

According to yet even a further embodiment, a method is described to perform grantless transmission as part of the random access procedure. The grantless transmission may be used to transmit Control Plane (CP) or User Plane (UP) data. The CP/UP data may include a connection request message; e.g. RRCConnectionRequest, IEs to assist the network with establishing or maintaining a connection, "keep alive" messages, periodic state/health indications, infrequent small data packets, etc. A signaling diagram for that random access procedure with grantless transmission is shown in FIG. 24.

Step 1 of FIG. 24 describes a Preamble+Grantless Message Transmission. Here, the UE transmits the selected random access preamble and the grantless message. The grantless message may be multiplexed with the preamble in a TDD or FDD fashion. In one embodiment, the grantless message would be transmitted in the OFDM symbol(s) following the preamble.

Figure 25C:
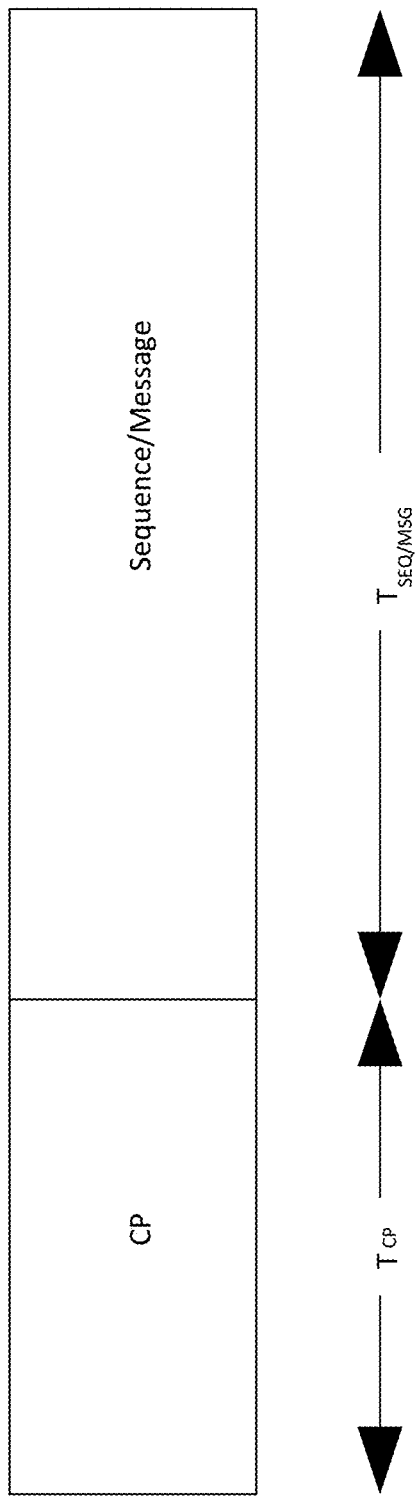
FIGS. 25A-C are diagrams illustrating a Random Access Preamble Format for Grant-less Transmission.
Figure 25A:
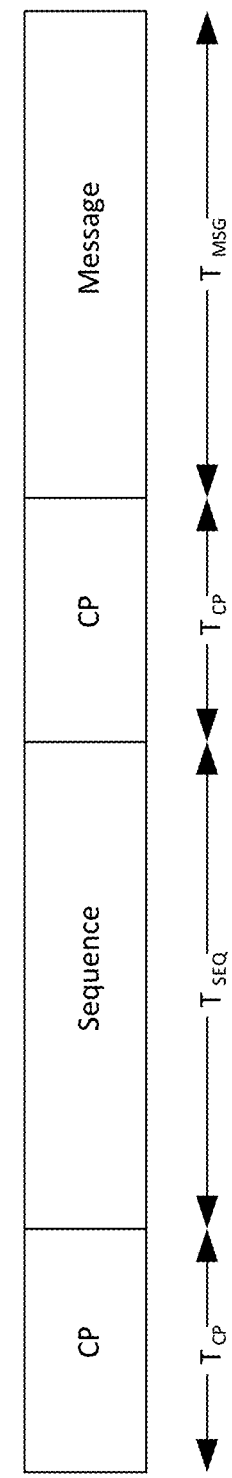
Figure 25B:
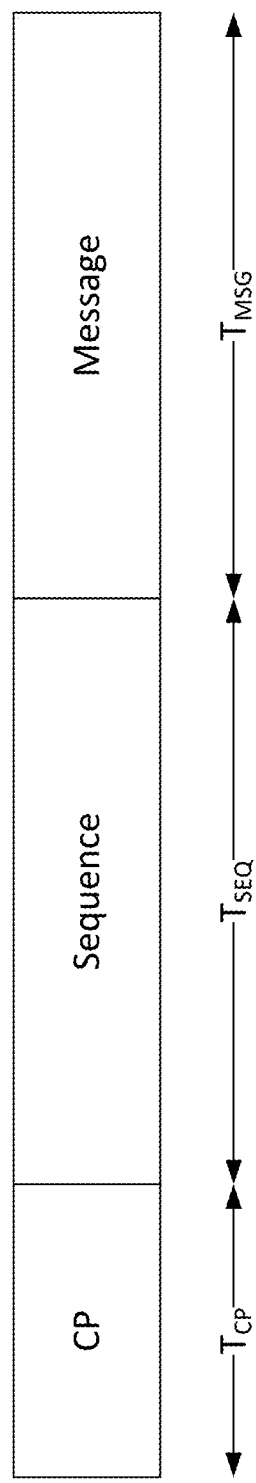
Figure 26:
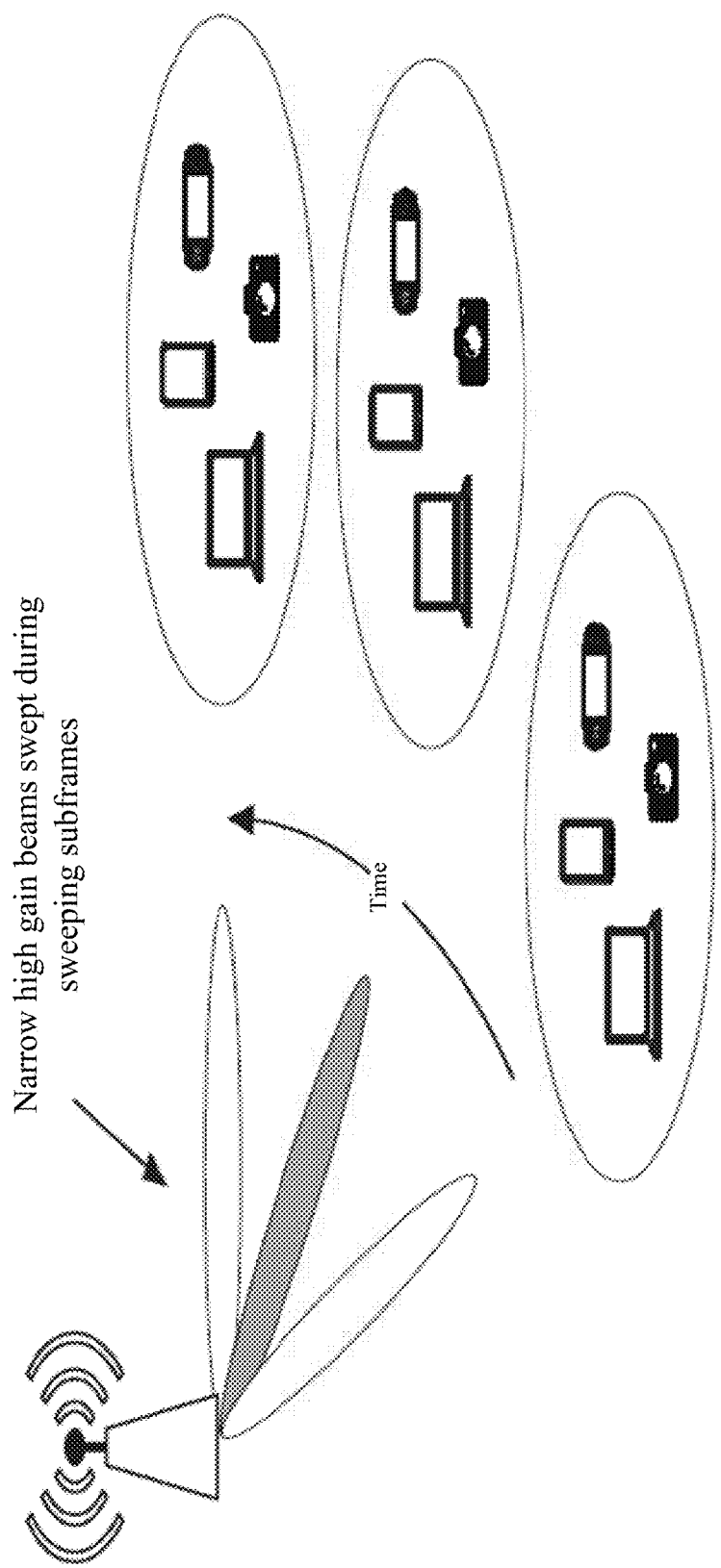
FIG. 26 is a diagram of a beamforming in HF-NR networks.

FIG. 25A is an exemplary random access preamble format that may be used to multiplex the transmission of the grant-less message in a TDD fashion. The same frequency resources used for the preamble transmission may be used for transmission of the message. Alternatively, a different set of frequency resources may be used for transmission of the message, e.g., the grant-less resources. The location of the grant-less resources may be signaled to the UE as part of the System Information or via dedicated signaling. The grantless transmission may use a non-orthogonal multiple access scheme such as MUSA, RSMA, SCMA, etc. FIG. 25B is a further alternative embodiment where there is no CP between the sequence and message.

Alternatively, the grantless message could be transmitted in the same OFDM symbol as the preamble using grantless resources that are different than the physical resources used for the preamble transmission; e.g. adjacent to the PRACH resources. FIG. 25C is an exemplary random access preamble format that may be used to multiplex the transmission of the grantless message in an FDD fashion. It is envisaged according to this application that one or more guard periods may be provided after the message, sequence or sequence/message shown in FIGS. 25A-C.

The set of parameters that can enable the transmitter/receiver to modulate/demodulate and encode/decode a grantless data transmission as the signature of that transmission. Amongst the non-orthogonal UEs with grantless UL transmissions multiplexed to share some or all of the resources, each UE must transmit with a unique signature so that the data can be distinctly decoded. Note that the true identity of the UE (such as the C-RNTI) itself does not necessarily need to be part of this signature. The selected PRACH resource and preamble can be transmitted by the UE implicitly indicates the signature associated with the grantless data.

In one embodiment, preamble sequences selected may be mapped to parameters defining the signature which may be one or more of the following depending on the non-orthogonal multiple access scheme:

Spreading sequence
Scrambling sequence (such as the initial state of the scrambler)
Interleaver pattern
Resource mapping pattern For example, the UEs can use RSMA signaling for grantless UL transmission. The initial state of the scrambling sequence used for the data serves as the signature for the UL grantless transmission. According to our solution, the preamble ID maps to a scrambling sequence and interleaving pattern that the UE should use for transmitting its data.

The message part of the transmission may be used to transmit CP or UP data. In one embodiment, the message part may be used to transmit a connection request message. The structure of this message may be similar to the RRC-ConnectionRequest message defined for LTE or a new message structure defined for the NR RAN. The message may optionally include IEs that may assist the network with establishing or maintaining the connection. An exemplary NR-ConnectionRequest message is defined below.

NR-ConnectionRequest Message

```
-- ASN1START
NR-ConnectionRequest ::=    SEQUENCE {
    ue-Identity                 UE-Identity,
    establishmentCause          EstablishmentCause,
    requestedSlice              INTEGER(1..N)    OPTIONAL
}
UE-Identity                 CHOICE {
    sTMSI                       S-TMSI,
    mTMSI                       M-TMSI,
    imsi                        IMSI
}
-- ASN1STOP
```

For scenarios where a small data packet needs to be sent from the UE to the network, the UE transmit an NR-GrantlessData message in the message part of the transmission. An exemplary NR-GrantlessData message is defined below.

NR-GrantlessData Message

```
-- ASN1START
NR-GrantlessData ::=        SEQUENCE {
    ue-Identity                 UE-Identity,
    requestedSlice              INTEGER(1..N)    OPTIONAL
    grantlessData               OCTET STRING
}
UE-Identity                 CHOICE {
    sTMSI                       S-TMSI,
    mTMSI                       M-TMSI,
    imsi                        IMSI
}
-- ASN1STOP
```

In Step 2 of FIG. 24, the UE monitors the DL control channel; e.g. PDCCH, for an RAR. If an NR-ConnectionRequest message was transmitted in Step 1 of FIG. 18, the network responds with a connection setup message; e.g. NR-ConnectionSetup, that includes the IEs needed to establish the connection. The RAR also includes an UL grant for transmission of Msg3. If an NR-GrantlessData message was transmitted in Step 1, the network responds with an ACK or NACK, depending on whether or not the data message was successfully received.

Step 3 of FIG. 24 describes a Transmission of UL Data and Control Signaling. This step is only applicable for the case when a connection request was transmitted in Step 1 of FIG. 18. Here, the UE uses resources provided in the UL grant to send a message to indicate the status of the connection, e.g., connection establishment success or connection establishment failure, along with any UL data or control signaling.

In Step 4 of FIG. 24, the Transmission of DL Data and Control Signaling is described. Here, DL data and control signaling is transmitted to the UE. Transfer of UL/DL data and control signaling may continue using the established connection.

An objective of the Study Item on random access (NR) Access Technology is to identify and develop technology components needed for systems operating at frequencies up to 100 GHz [3GPP TR 38.913] [RP-161214, Revision of SI: Study on New Radio Access Technology, NTT DOCOMO].

To compensate for the increased path loss in these High Frequency NR (HF-NR) systems, beamforming is expected to be widely used. However, the existing random access procedure, which is based on omnidirectional or sector-based transmission does not support the functions required for beamforming based access; e.g. beam sweeping, beam pairing, beam training, etc. Therefore, there is a need for enhanced random access procedure that supports beamforming for NR networks.

According to another aspect of the application, solutions to enable beam sweeping in NR networks will be discussed. The solutions are expected to be used for HF-NR systems, but their use in systems operating at lower frequencies is not excluded. The proposed mechanisms may be conducted at NR-Node, RRH, or TRP, even though NR-Node is used herein for exemplary illustrations or descriptions.

Beam Sweeping Frame Structure

According to an embodiment of this aspect a sweeping subframe is defined to enable beam sweeping in NR networks. The sweeping subframe consists of multiple sweeping slots, where each sweeping slot may consist of 1 or more OFDM symbols. DL beams enabled during a given sweeping slot may be used to transmit synchronization signals, Beam Training Reference Signals (BT-RS) and DL physical channels. UL beams enabled during a given sweeping slot may be used to transmit random access preambles, Sounding Reference Signals (SRS), BT-RSs and UL physical channels.

Figure 27:
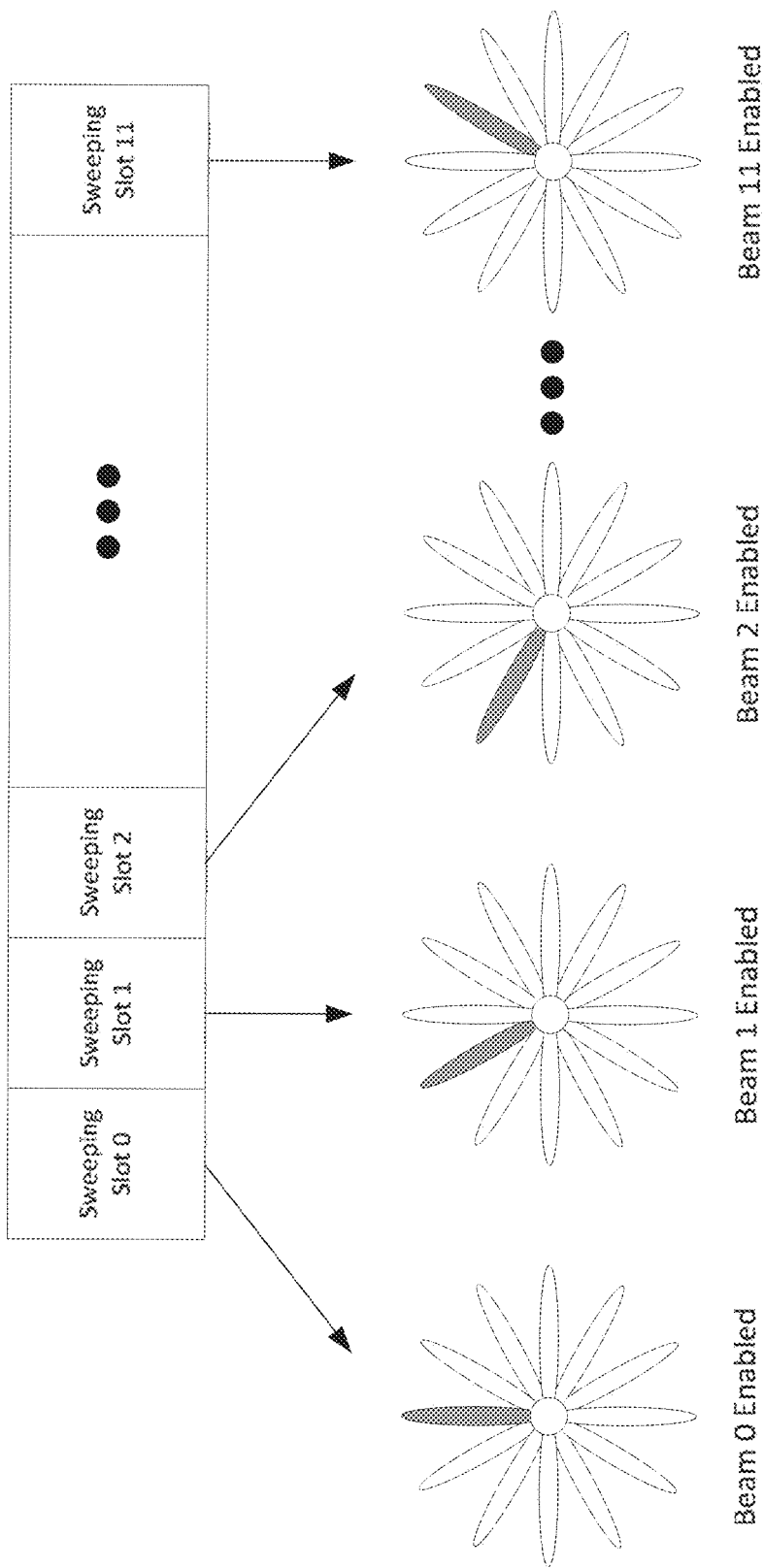
FIG. 27 is a diagram of a sweeping subframe with 1 beam enabled per sweeping slot.

To perform beam sweeping, the NR-Node enables a subset of the beams during each sweeping slot. In one embodiment, the NR-Node enables a single beam during each sweeping slot as shown in FIG. 27. In this embodiment, the NR-Node uses 12 separate beams to provide coverage, which requires 12 sweeping slots to sweep the full set of beams.

Figure 28A:
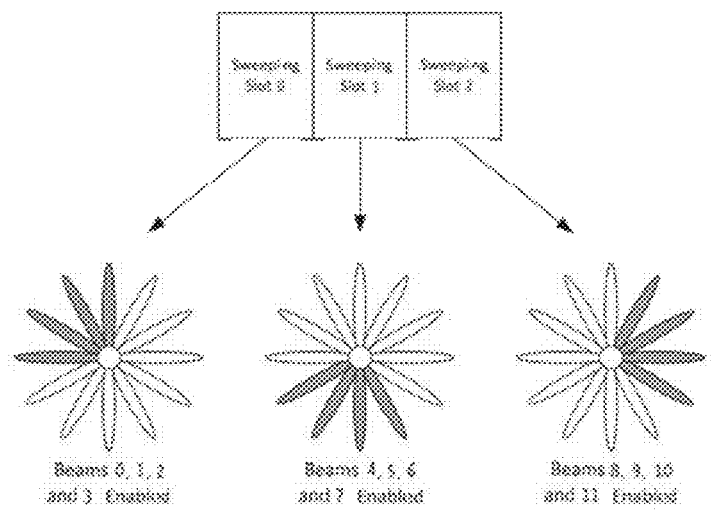
FIGS. 28A-B is a diagram of a sweeping subframe with multiple beams enabled per sweeping slot.
Figure 28B:
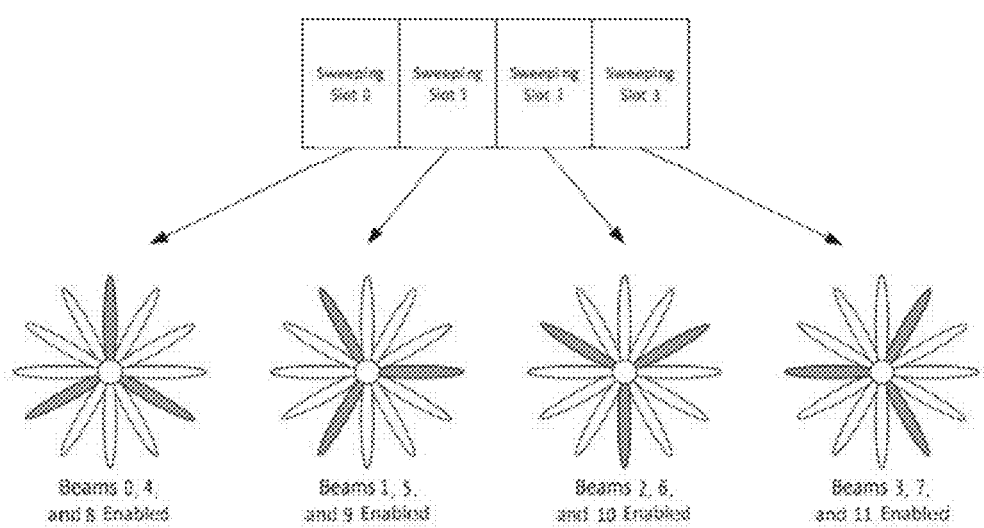

Alternatively, the NR-Node may enable multiple beams during each sweeping slot. FIG. 28A shows an embodiment where 1 sector consisting of 4 beams is enabled per sweeping slot. In this embodiment, the full set of 12 beams are swept in 3 sweeping slots. FIG. 28B shows an embodiment where 1 beam in each sector is enabled per sweeping slot. In this embodiment, the full set of 12 beams are swept in 4 sweeping slots. Some configurations, such as the one illustrated in FIG. 15A, may be more susceptible to inter-beam interference. To minimize the inter-beam interference for such cases, adjacent beams may be configured to use non-overlapping subbands; i.e. different frequency resources.

In FDD systems, the UL and DL beams may be swept simultaneously using a sweeping subframe such as the one shown in FIG. 27 or FIG. 28. For example, if we consider the scenario shown in FIG. 27, during sweeping slot n, the NR-Node is transmitting and receiving at the same time using beam n. And during sweeping slot n+1, beam n+1 is used for transmitting and receiving. This process continues until all the beams are swept.

Figure 29:
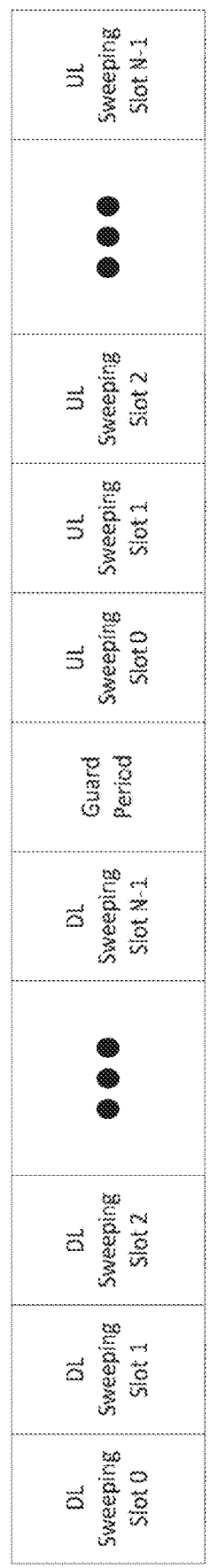
FIG. 29 is a diagram of a self-contained DL/UL sweeping subframe.

Alternatively, for TDD systems, the sweeping subframe may be defined with separate DL and UL sweeping slots. FIG. 29 shows an embodiment of a self-contained sweeping subframe with DL/UL sweeping slots, separated by a guard period to allow for Rx/Tx switching.

Figure 30:
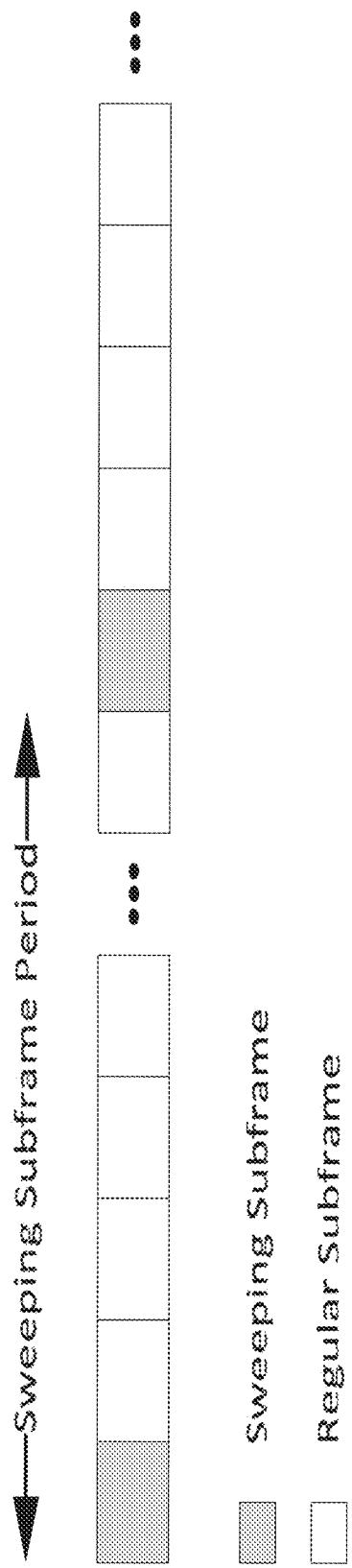
FIG. 30 is a diagram of a frame structure with self-contained DL/UL sweeping subframes.
Figure 31:
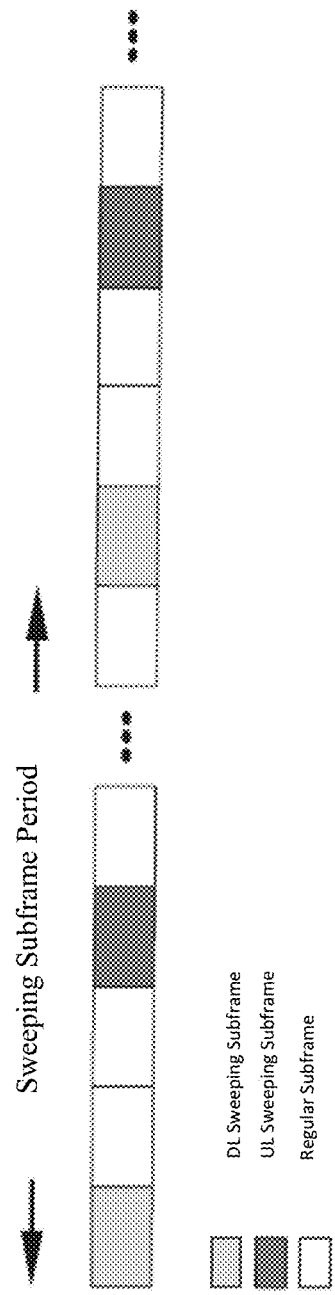
FIG. 31 is a diagram of a frame structure with separate DL/UL sweeping subframes.

The sweeping subframe may occur periodically, as shown in FIG. 30 or may be configured dynamically. Alternatively, separate DL/UL sweeping subframes may be configured. FIG. 31 shows an embodiment where DL and UL sweeping subframes occur periodically in subframes N and (N+3) respectively.

According to this application, it is envisaged to use the sweeping subframes to carry the signaling required to support initial access procedures; e.g., cell search, cell (re-)selection, random access, etc.; and to use the regular subframes for communicating with UEs that have established a connection. The sweeping subframes may also be used for the transmission of small data packets that do not require the establishment of a full connection and may also be used to support mobility; e.g., to facilitate the detection and measurement of additional beams that may be configured as serving beams.

Figure 32:
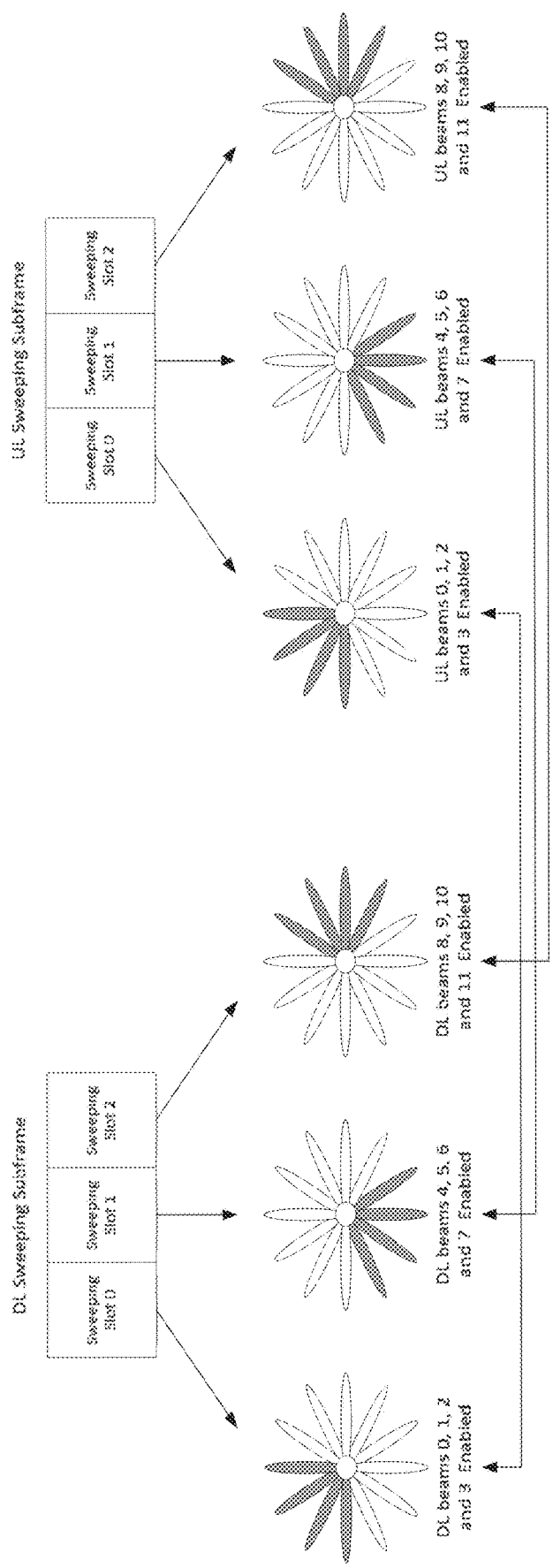
FIG. 32 is a diagram of an association between UL/DL beams.

When UL Rx beam sweeping is used at the NR-Node, the UE must transmit at a time when the NR-Node is receiving using UL Rx beam(s) in the direction of the transmitting UE. If beam reciprocity is supported at the NR-Node, this can be accomplished by defining an association between a DL Tx beam and the corresponding UL Rx beam. FIG. 32 shows an embodiment where an association is made between the DL Tx beam(s) enabled during a DL sweeping slot and the UL Rx beam(s) enabled during an UL sweeping slot. In this example, UEs that have synchronized to a DL beam transmitted during a given DL sweeping slot would perform UL transmissions during the corresponding UL sweeping slot. For example, a UE that has synchronized to DL beam 0 would perform UL transmissions during sweeping slot 0 of the UL sweeping subframe. To support scenarios where multiple DL beams are enabled during a given sweeping slot, the UE may signal the beam ID of the DL beam it has synchronized to when performing an UL transmission. The association between UL/DL beams may be specified in the standards or may be signaled as part of the SI broadcast by the NR-Node. If reciprocity is not supported at the NR-Node, then the UE may need to repeat its transmission in all of the sweeping slots of the UL sweeping subframe, since it would be unaware of when an UL Rx beam was pointing in its direction. Support for reciprocity by the NR-Node may be signaled as part of the SI broadcast by the NR-Node.

RAN2 has agreed that Minimum SI needs to be broadcasted periodically and should include the information needed to support cell selection, for acquiring the Other SI, which is defined as everything not broadcasted in the Minimum SI, and for accessing the cell [3GPP TR 38.804, Study on New Radio Access Technology; Radio Interface Protocol Aspects (Release 14),V0.2.0 1]. This information corresponds to the IEs signaled by the MIB, SIB1 and SIB2 for LTE. We propose that the sweeping subframe configuration is included in the Minimum SI that is broadcast periodically by the NR-Node. An exemplary IE that may be used to signal the sweeping subframe configuration is shown in FIG. 33. An alternate Sweeping-Subframe IE that explicitly specifies DL and UL sweeping subframe configurations is show FIG. 34. Alternatively, the sweeping subframe configuration may be defined in the standard specification.

TABLE 16

Sweeping Subframe Field Descriptions

| Subframe |
| --- |

Location of the sweeping subframe within the radio frame. A value of 0 corresponds to subframe 0, a value of 1 corresponds to subframe 1, etc. Note: This field corresponds to the

TABLE 16-continued

Sweeping Subframe Field Descriptions location of the self-contained sweeping subframe when a value of 0 is specified for the ulSweepingSubframeOffset field. For all other values of ulSweepingSubframeOffset, it corresponds to the location of the DL sweeping subframe.
numSweepingSlots The number of sweeping slots defined in a DL or UL sweeping subframe. Note: This field corresponds to the total number DL and UL sweeping slots defined in the self-contained sweeping subframe when a value of 0 is specified for the ulSweepingSubframeOffset field. For all other values of ulSweepingSubframeOffset, it corresponds to the number of sweeping slots a DL or UL sweeping subframe.
numSymbolsPerSlot The number of OFDM symbols per sweeping slot.
ulSweepingSubframeOffset The offset in subframes between the UL sweeping subframe and DL sweeping subframe. A value of 0 implies the self-contained sweeping subframe is configured. A non-zero value implies separate DL and UL sweeping subframes are configured. The location of the UL sweeping subframe within the radio frame is defined as: (subframe + ulSweepingSubframeOffset) mod 10.
period The period of the sweeping subframe(s). n5 corresponds to 5 subframes, n10 to 10 subframes, etc. Note: When UL and DL sweeping subframes are configured; i.e. ulSweepingSubframeOffset ≠ 0, the value specified by this field applies for both the UL and DL sweeping subframes.
reciprocityIndicator TRUE indicates the NR-Node supports beam reciprocity, FALSE indicates it does not.

TABLE 17

Alternate Sweeping Subframe Field Descriptions subframe

Location of the sweeping subframe within the radio frame. A value of 0 corresponds to subframe 0, a value of 1 corresponds to subframe 1, etc. Note: Configuring the DL and UL sweeping subframes with the same subframe value implies that the self-contained sweeping subframe is configured.
numSweepingSlots The number of sweeping slots defined in a DL or UL sweeping subframe. Note: When the self-contained sweeping subframe is configured, the value specified for the UL sweeping subframe is ignored. In that case, the value specified for the DL sweeping subframe is also used to configure the number of UL sweeping slots in the self-contained sweeping subframe.
numSymbolsPerSlot The number of OFDM symbols per sweeping slot. Note: When the self-contained sweeping subframe is configured, the value specified for the UL sweeping subframe is ignored. In that case, the value specified for the DL sweeping subframe is also used to configure the number of OFDM symbols per UL sweeping slot in the self-contained sweeping subframe.
period The period of the DL or UL sweeping subframe. n5 corresponds to 5 subframes, n10 to 10 subframes, etc. Note: When the self-contained sweeping subframe is configured, the value specified for the UL sweeping subframe is ignored.
reciprocityIndicator TRUE indicates the NR-Node supports beam reciprocity, FALSE indicates it doesn't.

It is envisaged that the Minimum SI is broadcast during DL sweeping slots using the NR-Physical Broadcast Channel (NR-PBCH) and the NR-Physical Downlink Shared Channel (NR-PDSCH). In one embodiment, the NR-PBCH would be used to transmit a subset of the Minimum SI; i.e., the NR-MIB, and the NR-PDSCH would be used to transmit the rest of the Minimum SI; i.e., the IEs that corresponded NR-SIB1 and NR-SIB2. We propose to include the sweeping subframe configuration in the NR-MIB as shown in FIG. 35. Alternatively, the sweeping subframe configuration may be included in NR-SIB1 or NR-SIB2. The Minimum SI may be acquired using a System Information Acquisition procedure such as the one described above or any other mechanism that has be designed for acquisition of SI in the NR network.

Cell Selection in Beam Sweeping NR Networks

The UE performs cell selection to find a suitable cell to camp on. During the cell selection procedure, the UE performs measurements on the DL beams transmitted by the NR Cell(s) during the DL sweeping subframes. As part of the cell selection procedure, the UE also determines/selects the "best" DL Tx beam, where the "best" DL Tx beam may be the beam with the largest RSRP measurement. The UE may perform beam pairing during the cell selection procedure; i.e. determine the "best" DL Rx beam to use when receiving the "best" DL Tx beam.

As part of the cell selection procedure, the UE may also obtain the Minimum SI broadcast by the NR-Cell(s), which may include the sweeping subframe configuration, the PRACH configuration and/or additional SI needed to access the cell. The UE may optionally acquire the Other SI if it is broadcast while the UE is performing the cell (re-)selection procedure.

After selecting a cell to camp on, the UE may continue to perform measurements on the DL beam(s) transmitted by the selected cell and/or DL beams transmitted from any other cell that the UE may detect; and may re-select another cell and/or DL Tx/Rx beam pair based on evaluation of the DL measurements and/or any other cell selection criterion. An exemplary NR Cell Selection procedure is shown in FIG. 36.

Figure 36:
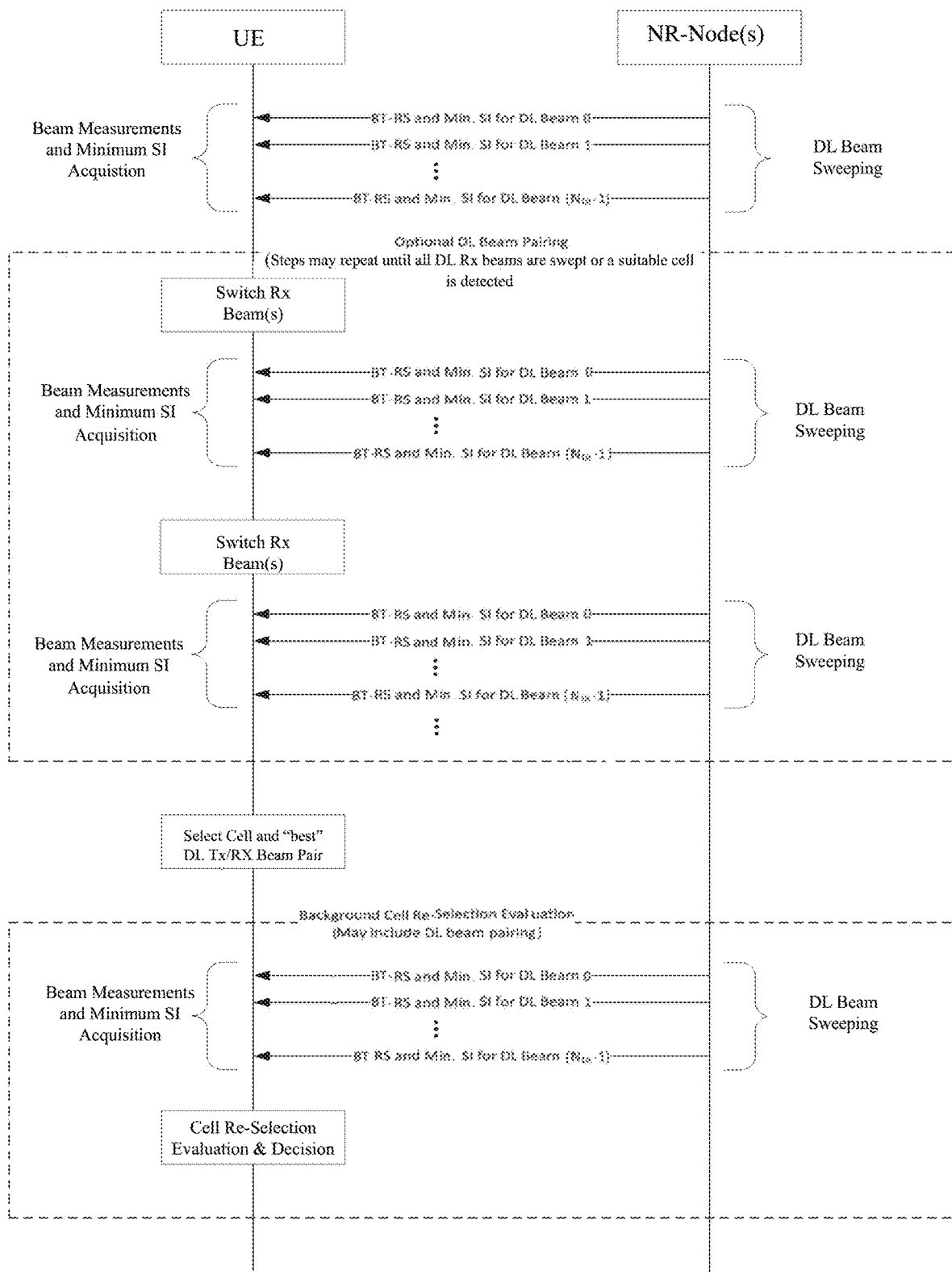
FIG. 36 is a diagram of a cell selection procedure for beam sweeping NR networks.

It is understood that the entities performing the steps illustrated in FIG. 36 may be logical entities implemented in the form of software (i.e., computer-executable instructions) stored in a memory of, and executing on a processor of, an apparatus configured for wireless and/or network communications or a computer system such as those illustrated in FIGS. 1B and F. That is, the method(s) illustrated in FIG. 36 may be implemented in the form of software (i.e., computer-executable instructions) stored in a memory of an apparatus, such as the apparatus or computer system illustrated in FIGS. 1B and F, which computer executable instructions, when executed by a processor of the apparatus, perform the steps illustrated in FIG. 23. It is also understood that any transmitting and receiving steps illustrated in FIG. 36 may be performed by communication circuitry of the apparatus under control of the processor of the apparatus and the computer-executable instructions (e.g., software) that it executes.

Transmission of Other SI

According to a further embodiment of this aspect, the Minimum SI may periodically broadcast by the NR-Node during DL sweeping subframes may be very limited. In some scenarios, delaying the acquisition of the Other SI, which is defined as everything not broadcasted in the Minimum SI [3GPP TR 38.804], until after the random access procedure has completed successfully may be undesirable. For such scenarios, it is envisaged that the detection of preambles by the NR-Node may be used to trigger the broadcast of some or all of the Other SI during the DL sweeping subframes. If a subset of the Other SI is to be broadcast, then that subset may be predetermined or may be determined dynamically; e.g. the subset of Other SI to broadcast may be requested by a UE via data that is "piggy backed" with the preamble transmission. The Other SI may be broadcast on all DL beams/DL sweeping slots or on a subset of the DL beams/DL sweeping slots, where the subset of DL beams/DL sweeping slots may be based on the detected preamble(s) and/or PRACH(s) on which the preambles were detected. The Other SI may be broadcast during one or multiple DL sweeping subframes, where the multiple DL sweeping subframes may or may not be consecutive. A UE may optionally monitor the PDCCH for broadcasts of the Other SI throughout the random access procedure. An exemplary signaling diagram for triggering the transmission of the Other SI is shown in FIG. 37.

Figure 37:
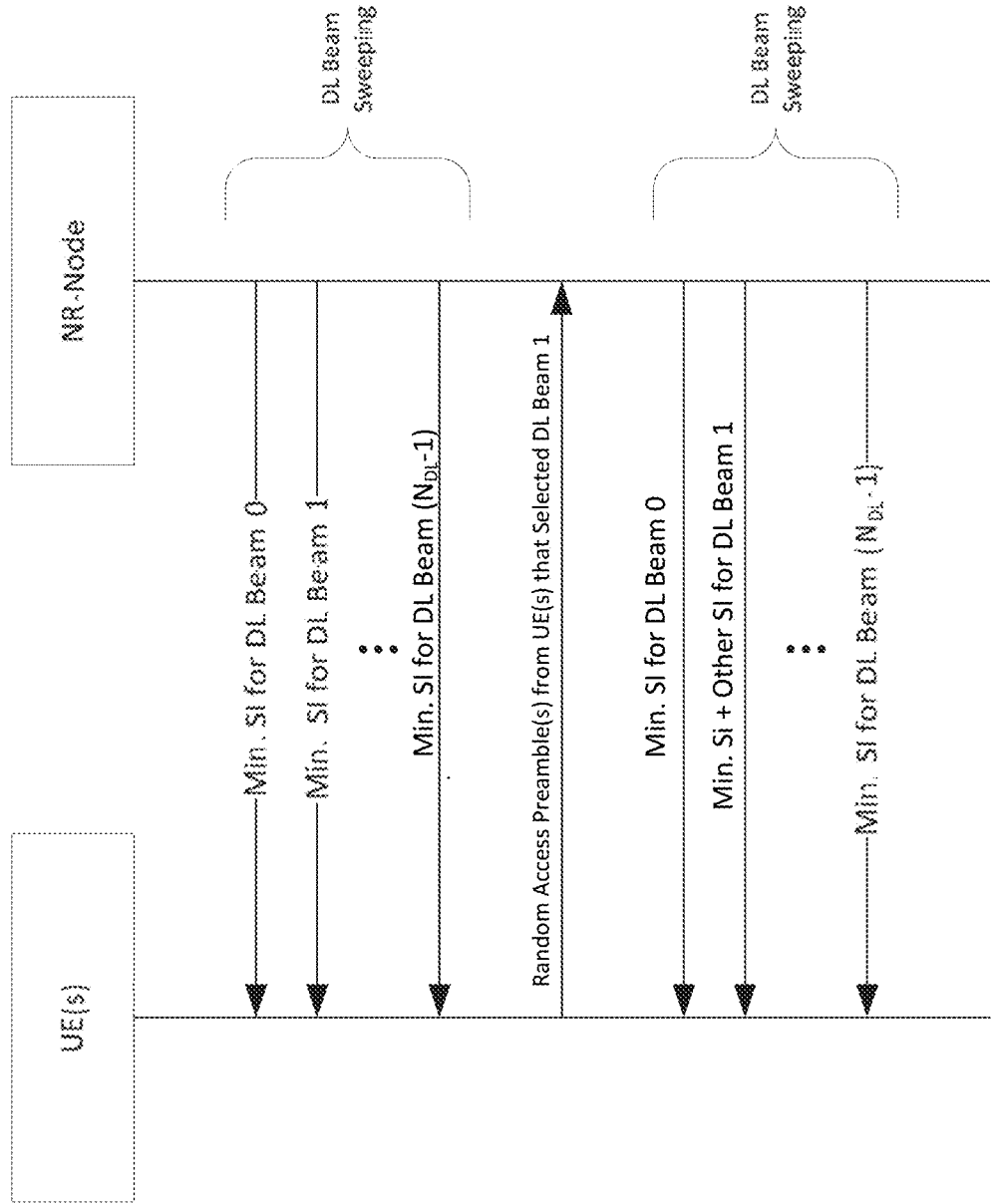
FIG. 37 is a diagram of a triggering transmission of other SI.

It is understood that the entities performing the steps illustrated in FIG. 37 may be logical entities that may be implemented in the form of software (i.e., computer-executable instructions) stored in a memory of, and executing on a processor of, an apparatus configured for wireless and/or network communications or a computer system such as those illustrated in FIGS. 1B and F. That is, the method(s) illustrated in FIG. 37 may be implemented in the form of software (i.e., computer-executable instructions) stored in a memory of an apparatus, such as the apparatus or computer system illustrated in FIGS. 1B and F, which computer executable instructions, when executed by a processor of the apparatus, perform the steps illustrated in FIG. 37. It is also understood that any transmitting and receiving steps illustrated in FIG. 37 may be performed by communication circuitry of the apparatus under control of the processor of the apparatus and the computer-executable instructions (e.g., software) that it executes.

Random Access in Beam Sweeping NR Networks

Figure 38:
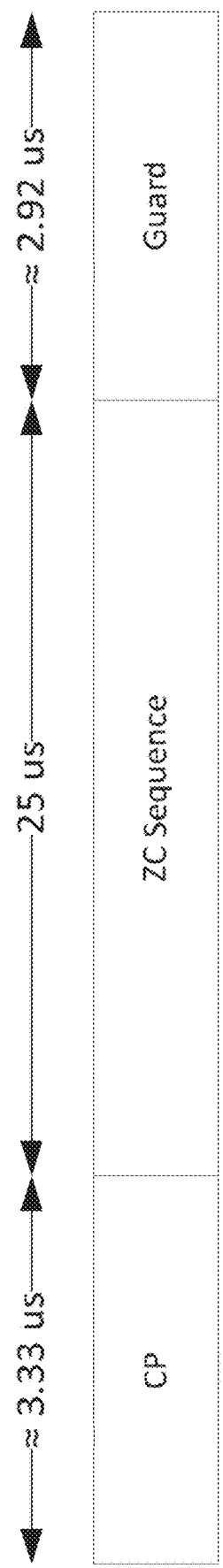
FIG. 38 is a diagram of an exemplary random access preamble format.

To support random access in beam sweeping NR networks, it is envisaged to configure PRACH resources during the UL sweeping slots. The random access preamble parameters may be optimized based on the sweeping subframe configuration. An exemplary random access preamble format that has been optimized for the sweeping subframe configuration is provided in Table 18 below and illustrated in more detail in FIG. 38. The parameters for this new preamble format are enumerated in Table 19 below. In this example, we assume a numerology with a sweeping subframe length of 0.125 ms, a subcarrier spacing $\Delta f=480$ kHz and corresponding basic unit of time $T's=1/(480000 \times 2048)$.

TABLE 18

| Parameter | Value |
| --- | --- |
| subframe | 0 |
| numSweepingSlots | 4 |
| numSymbolsPerSlot | 7 |
| ulSweepingSubframeOffset | 3 |
| Period | n10 |
| reciprocityIndicator | TRUE |

TABLE 19

| Preamble Format | $N_{ZC}$ | $\Delta f_{RA}$ (kHz) | $\varphi$ | $T_{CP}$ | $T_{SEQ}$ |
| --- | --- | --- | --- | --- | --- |
| 5 | 839 | 40 | 7 | $3276 \cdot T'_s$ | $24576 \cdot T'_s$ |

The subcarrier spacing for the random access preamble, $\Delta fRA$, was chosen to be ($\frac{1}{12} \times \Delta f$), as it is for LTE. The length of the CP, TCP, was chosen to support cell sizes up to 500 meters.

The NR-Node may be configured with the same PRACH configuration for all UL sweeping slots; i.e., for all UL beams. Alternatively, the NR-Node may be configured with different PRACH configurations for each UL sweeping slot. The PRACH configuration(s) may be signaled using an IE similar to the PRACH-Config IE signaled in SIB2, and broadcast to the UEs during the DL sweeping subframe.

The PRACH-ConfigIndex included in the PRACH-Config IE may be used to determine the random access configuration. Table 20 below shows an exemplary set of NR random access configurations. Additional random access configurations, which may include optimizations for specific uses cases, deployment scenarios etc., may also be signaled using this mechanism by extending the number of configurations defined in this table.

TABLE 20

| PRACH Configuration Index | Preamble Format | SFN | Num. PRACH Resources |
|---|---|---|---|
| 0 | 0 | Even | 1 |
| 1 | 0 | Even | 2 |
| 2 | 0 | Even | 3 |
| 3 | 0 | Even | 4 |
| 4 | 0 | Even | 5 |
| 5 | 0 | Even | 6 |
| 6 | 0 | Any | 1 |
| 7 | 0 | Any | 2 |
| 8 | 0 | Any | 3 |
| 9 | 0 | Any | 4 |
| 10 | 0 | Any | 5 |
| 11 | 0 | Any | 6 |
| 12 | 1 | Even | 1 |
| 13 | 1 | Even | 2 |
| 14 | 1 | Even | 3 |
| 15 | 1 | Even | 4 |
| 16 | 1 | Even | 5 |
| 17 | 1 | Even | 6 |
| 18 | 1 | Any | 1 |
| 19 | 1 | Any | 2 |
| 20 | 1 | Any | 3 |
| 21 | 1 | Any | 4 |
| 22 | 1 | Any | 5 |
| 23 | 1 | Any | 6 |
| 24 | 2 | Even | 1 |
| 25 | 2 | Even | 2 |
| 26 | 2 | Even | 3 |
| 27 | 2 | Even | 4 |
| 28 | 2 | Even | 5 |
| 29 | 2 | Even | 6 |
| 30 | 2 | Any | 1 |
| 31 | 2 | Any | 2 |
| 32 | 2 | Any | 3 |
| 33 | 2 | Any | 4 |
| 34 | 2 | Any | 5 |
| 35 | 2 | Any | 6 |
| 36 | 3 | Even | 1 |
| 37 | 3 | Even | 2 |
| 38 | 3 | Even | 3 |
| 39 | 3 | Even | 4 |
| 40 | 3 | Even | 5 |
| 41 | 3 | Even | 6 |
| 42 | 3 | Any | 1 |
| 43 | 3 | Any | 2 |
| 44 | 3 | Any | 3 |
| 45 | 3 | Any | 4 |
| 46 | 3 | Any | 5 |
| 47 | 3 | Any | 6 |
| 48 | 4 | Even | 1 |
| 49 | 4 | Even | 2 |
| 50 | 4 | Even | 3 |
| 51 | 4 | Even | 4 |
| 52 | 4 | Even | 5 |
| 53 | 4 | Even | 6 |
| 54 | 4 | Any | 1 |
| 55 | 4 | Any | 2 |
| 56 | 4 | Any | 3 |
| 57 | 4 | Any | 4 |
| 58 | 4 | Any | 5 |
| 59 | 4 | Any | 6 |
| 60 | 5 | Even | 1 |
| 61 | 5 | Even | 2 |
| 62 | 5 | Even | 3 |
| 63 | 5 | Even | 4 |
| 64 | 5 | Even | 5 |
| 65 | 5 | Even | 6 |
| 66 | 5 | Any | 1 |
| 67 | 5 | Any | 2 |
| 68 | 5 | Any | 3 |
| 69 | 5 | Any | 4 |
| 70 | 5 | Any | 5 |
| 71 | 5 | Any | 6 |
| 72 | 6 | Even | 1 |
| 73 | 6 | Even | 2 |
| 74 | 6 | Even | 3 |
| 75 | 6 | Even | 4 |
| 76 | 6 | Even | 5 |
| 77 | 6 | Even | 6 |
| 78 | 6 | Any | 1 |
| 79 | 6 | Any | 2 |
| 80 | 6 | Any | 3 |
| 81 | 6 | Any | 4 |
| 82 | 6 | Any | 5 |
| 83 | 6 | Any | 6 |

Random Access Procedure

Figure 39:
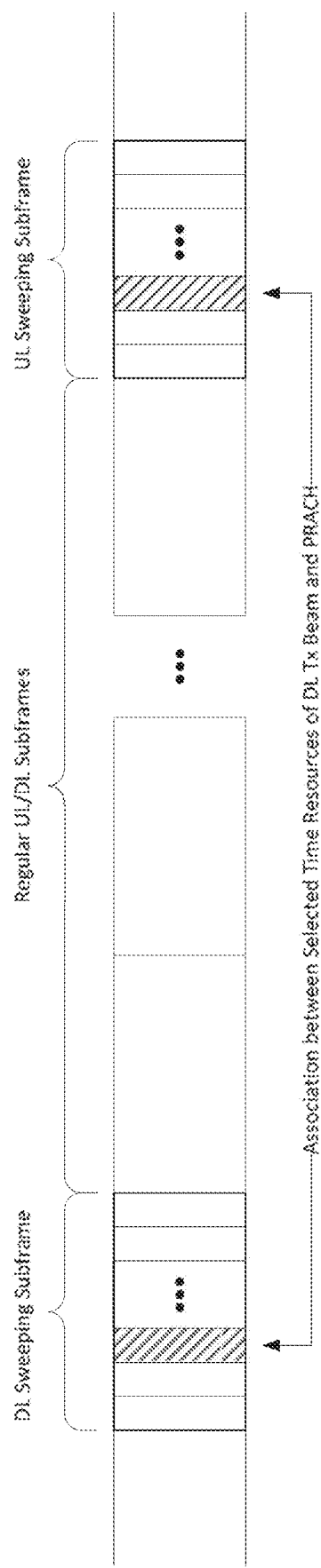
FIG. 39 is a diagram of an association between time resources of selected DL Tx beam and PRACH.

In another embodiment of this aspect, the UE may perform cell (re) selection before initiating the random access procedure. The steps of the LTE contention based random access procedure are discussed above. An enhanced procedure to perform contention based random access in beam sweeping NR networks is proposed. Prior to commencing with random access preamble transmission, the UE performs random access resource selection to determine the random access preamble and PRACH. If the NR-Node supports beam reciprocity and is configured with sweeping subframes, the time resource of the PRACH, i.e., the UL sweeping slot, can be determined from a time resource, i.e., the DL sweeping slot, used by the NR-Node to transmit the DL beam selected by the UE during the cell selection procedure, i.e., the "best" DL Tx beam. For example, if the UE selects a DL Tx beam transmitted during sweeping slot N of the DL sweeping subframe, then the time resource of the corresponding PRACH would be sweeping slot N of the UL sweeping subframe, as shown in FIG. 39.

Figure 40:
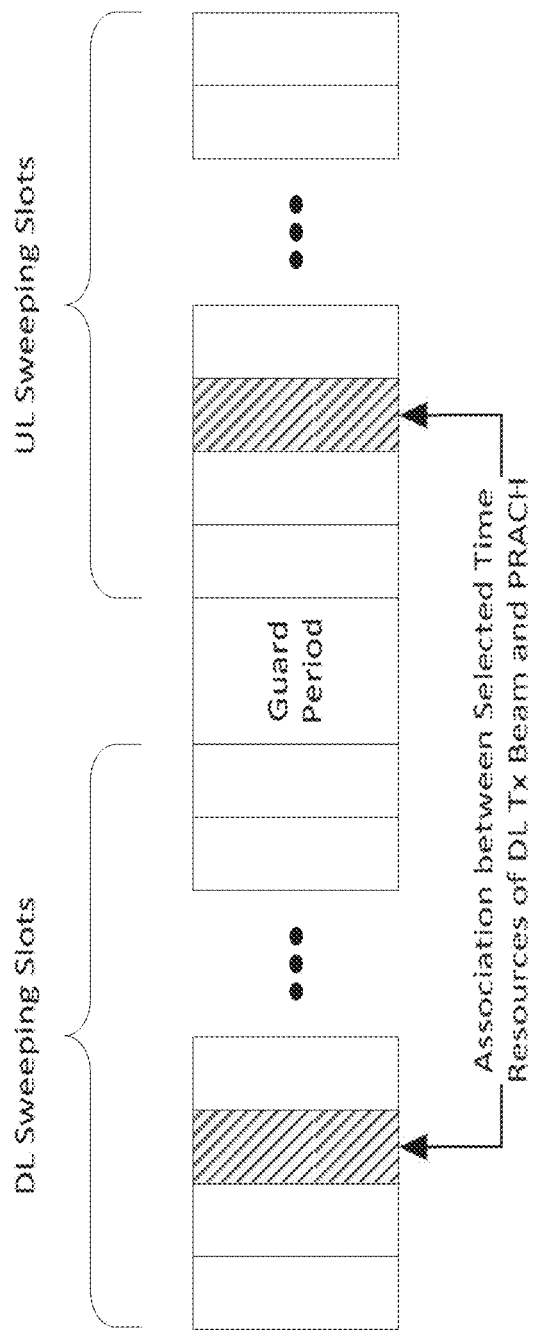
FIG. 40 is a diagram of an association between time resources of selected DL Tx beam and PRACH for Self-Contained DL/UL sweeping subframe.

FIG. 40 shows how an exemplary association may be defined if the self-contained DL/UL sweeping subframe is configured. The frequency resources of the corresponding PRACH may be determined from the PRACH-Config IE that is signaled as part of the Minimum SI broadcast by the NR-Node. If multiple PRACH resources are configured in an UL sweeping slot, the UE may select a PRACH resource at random from the set of PRACH resources.

Figure 41:
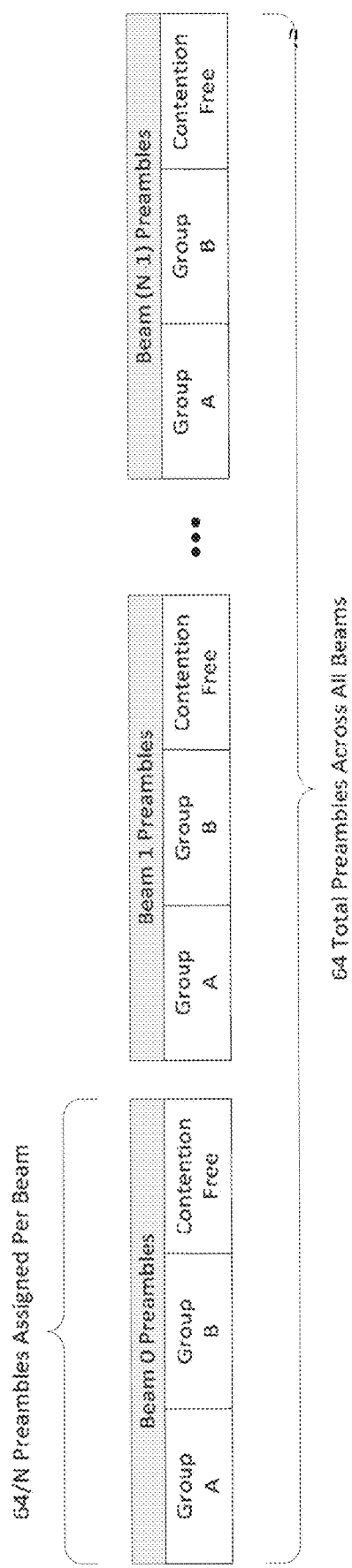
FIG. 41 is a diagram of partitioning of random access preambles to implicitly signal "Best" DL Tx beam.

If beam reciprocity is not supported by the NR-Node, creating an association between the time resources of the selected DL Tx beam and the PRACH may not be possible. In this scenario, the UE may select a PRACH at random from the set of PRACH resources. Alternatively, if the UE had successfully completed the random access procedure in the past, the UE may select a PRACH that is configured with the same time resource as the PRACH that was selected when the random access procedure completed successfully. For scenarios where beam reciprocity is not supported by the NR-Node, the DL beam selected by the UE may not be able to determine from the PRACH on which the random access preamble was detected. We therefore propose to partition the preamble space as shown in FIG. 41. A given UE would select preambles from the subset assigned to the corresponding DL beam that was selected by the UE as the "best" DL Tx beam. The NR-Node would then be able to determine the "best" DL Tx beam for a given UE based on the detected preamble.

Implicitly signaling the "best" DL Tx beam by partitioning the random access preambles as illustrated in FIG. 41 may also be used for scenarios where the NR-Node configures multiple UL Rx beams during a given UL sweeping slot. If the UL Rx beams configured during an UL sweeping slot overlap or cover similar areas of the cell, then a single preamble transmission may be detected on PRACHs of multiple UL Rx beams. The NR-Node may use this info to determine which DL Tx beam to use to transmit the RAR response to avoid sending RARs on a DL Tx beam that wasn't selected by the UE and is not being monitored by the UE for a RAR.

In some scenarios, it may be advantageous for the UE to select multiple PRACH resources corresponding to one or more UL sweeping slots. For example, if beam reciprocity is not supported by the NR-Node, the UE may select PRACH resources from each of the UL sweeping slots; i.e. transmit a random access preamble during each UL sweeping slot. This approach would allow the latency of the random access procedure to be reduced compared to the approach where the UE would have to wait for the RAR response to be considered not successful before attempting another random access transmission.

If the UE supports beam sweeping, the beam to use for the transmitted preamble may also be selected. If beam reciprocity is supported by the UE, the "best" UL Tx beam can be determined from the "best" DL Rx beam. If beam reciprocity is not supported by the UE, the UE may select any UL Tx beam; e.g. at random. Alternatively, if the UE had successfully completed the random access procedure in the past, the UE may select the UL Tx beam that was used when the random access procedure completed successfully.

If the Random Access Response is considered not successful, the UE may attempt another random access transmission. If beam reciprocity is not supported by the NR-Node and/or the UE, the UE may sweep the UL Tx beam on subsequent retransmissions of the random access preamble. Before switching the UL Tx beam, the UE completes power ramping using the selected UL Tx Beam. When the maximum number of attempts is reached using a given beam, the UE switches the UL Tx beam and resets the PREAMBLE_RECEIVED_TARGET_POWER to preambleInitialReceivedTargetPower+DELTA_PREAMBLE+(PREAMBLE_TRANSMISSION_COUNTER−1)
*powerRampingStep. The process may be repeated until all the UL Tx beams are swept or the random access procedure is successfully completed.

In step 1 of the random access procedure, the UE transmits the selected random access preamble(s) using the selected PRACH(s) and the selected UL Tx beam. In step 2 of the random access procedure, the UE monitors the DL control channel, e.g., PDCCH, for Random Access Responses (RARs). The UE monitors the PDCCH for RARs identified with RA-RNTIs corresponding to the PRACH resources used to transmit the random access preambles. It is envisaged to redefine the RA-RNTI such that the parameter t_id ($0 \leq t\_id < 28$) corresponds to the time resource of the PRACH; i.e. the UL sweeping slot. In an embodiment, it may be as follow: RA-RNTI=1+t_id+10*f_id Redefining the RA-RNTI in this way allows the NR-Node to implicitly signal the time resource of the PRACH on which the preamble was detected, which could be used to facilitate UL beam pairing in systems where beam reciprocity is not supported by the NR-Node.

Figure 42:
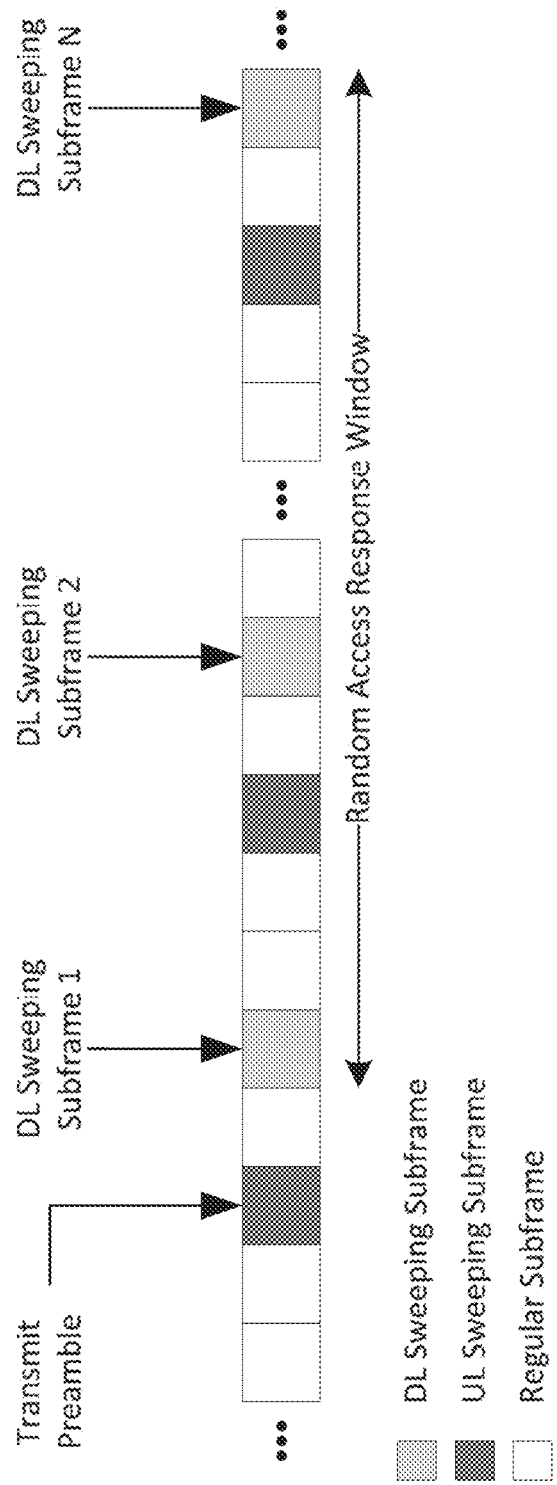
FIG. 42 is a diagram of a random access response window.

The UE monitors the PDCCH as described above during the Random Access Response window. In NR networks configured for beam sweeping, we propose to define the Random Access Response window as a number of DL sweeping subframes as shown in FIG. 42. The parameter ra-ResponseWindowSize included in the RACH-ConfigCommon IE may be used to signal this value.

The UE may stop monitoring RARs after successful reception of an RAR containing a Random Access Preamble identifier that matches the transmitted Random Access Preamble. Alternatively, if the UE transmitted multiple random access preambles, the UE may continue to monitor for additional RARs until all of the random access procedures initiated by the UE complete successfully; i.e., are acknowledged with an RAR containing the Random Access Preamble identifier of the transmitted Random Access Preamble, or timeout; i.e., an RAR containing the Random Access Preamble identifier of the transmitted Random Access Preamble is not received within the Random Access Response window.

The RAR includes an UL grant. It is envisaged when the UL Delay field of the grant is set to '0', the grant applies to the 1st UL sweeping subframe following the DL subframe in which the RAR was received; and when set to '1', the grant applies to 2nd UL sweeping subframe following the DL subframe in which the RAR was received as shown in FIG. 30.

We propose that the UL sweeping slot for the grant is the same as the UL sweeping slot that was used for the preamble transmission in step 1 of the random access procedure and therefore may not explicitly signaled by the grant.

Figure 43:
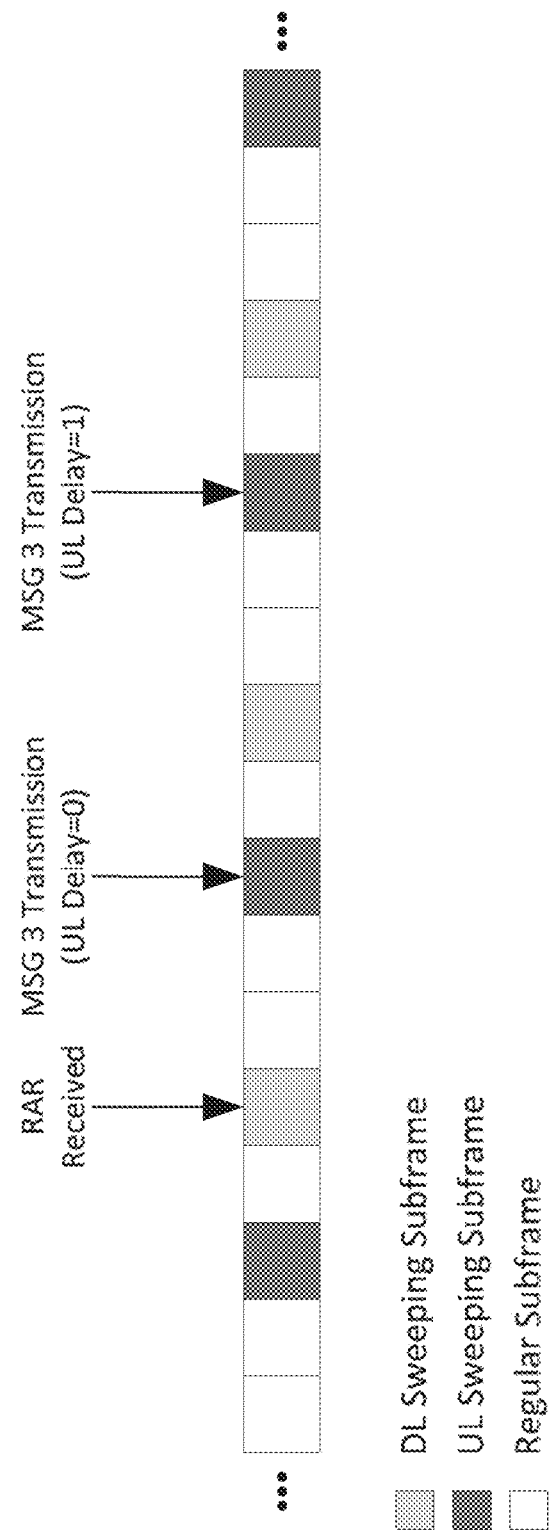
FIG. 43 is a diagram of a timing of an RAR grant.

Alternatively, the RAR grant may be used to schedule resources in a regular UL subframe, where the timing of the Msg3 transmission may be based on the LTE timing; i.e., " . . . the UE shall, according to the information in the response, transmit an UL-SCH transport block in the first subframe n+k1, k1≥6, if the UL delay field is set to zero where n+k1 is the first available UL subframe for PUSCH transmission, where for TDD serving cell, the first UL subframe for PUSCH transmission is determined based on the UL/DL configuration (i.e., the parameter subframeAssignment) indicated by higher layers. The UE shall postpone the PUSCH transmission to the next available UL subframe after n+k1 if the field is set to 1." An example of the RAR grant is illustrated in FIG. 43.

When performing contention based random access for LTE, the CSI request field of the RAR grant is reserved. It is envisaged to use this field when performing contention based random access in NR networks. The Beamformed Training Reference Signal(s) (BT-RS) that the UE measures to compute the CSI may correspond to the "best" DL Tx beam; i.e. the DL Tx beam selected during the cell (re-) selection procedure, or a set of beams where the BT-RSs may be signaled as part of the SI or determined from the BT-RSs of the "best" DL Tx beam. Alternatively, the BT-RSs to measure may be dynamically signaled using a field in the RAR.

It is further envisaged that the NR-Node transmits the RAR using the "best" DL Tx beam and the UE attempts to receive the RAR using the DL Rx beam paired with the "best" DL Tx beam, where the beam pairing may have been performed during a cell (re-)selection procedure. If beam reciprocity is supported by the NR-Node, the "best" DL Tx beam can be determined from the UL Tx beam on which the random access preamble was detected. If beam reciprocity is not supported by the NR-Node, the preamble may be used to implicitly signal the "best" DL Tx beam by partitioning the preamble space as described above.

In step 3 of the random access procedure, the UE transmits a message that may be used to request the (re-) establishment of a connection, e.g., RRCConnectionRequest, RRCConnectionReestablishmentRequest. The message is transmitted using the UL resources assigned in the grant that was part of the RAR received in step 2. If a CSI request was included in the RAR, the UE includes a CSI report in the transmission.

It is envisaged that the UL beam pair used for the preamble is also used for Msg3 and that the UE transmits BT-RSs that may be used to assist with UL beam training. The BT-RSs to use for the transmission may be signaled dynamically as part of the RAR. Alternatively, a mapping between the preamble and the BT-RSs may be defined, where the selected preamble is used to "lookup" the BT-RSs;

The NR-Node may use the transmitted BT-RSs to refine the UL Rx beam used to receive the initial transmission and/or retransmissions of Msg3. The NR-Node may use the beam training results from this step to configure UL Rx beams that may be used for reception of subsequent UL transmissions from the UE, which may occur during UL sweeping subframes and/or regular UL subframes.

In step 4 of the random access procedure, contention resolution is performed. The NR-Node may include a message to (re-)establish a connection in this transmission, e.g., RRCConnectionSetup, RRCConnectionReestablishment. We propose that the DL beam pair used for the RAR is also used for Msg4. It is also envisaged that Msg4 optionally includes beam management feedback/command(s) that may be used for refinement/training of beams used for subsequent UL/DL transmissions, which may occur during sweeping subframes and/or regular subframes.

Random Access Procedure Optimizations

Above, a unified NR random access procedure was described. In this section, optimizations for specific triggering events, use cases, deployment scenarios, etc. are described.

Optimizations for Power Constrained Devices and Extended Coverage Use Cases

The solutions described above may be used to compensate for the increased path loss in HF-NR systems. However, the solutions may also be applied to Low Frequency NR (LF-NR) systems to support use cases which may require support for power constrained UEs and/or a high Maximum Coupling Loss (MCL), e.g., extended/extreme coverage use cases. For example, the high gain beams that are swept during the sweeping subframe could be used to provide extended coverage for power constrained UEs. Appropriate selection of the PRACH resource would allow the preamble of a power constrained UE to be detected reliably at a lower Tx power compared to the case when beamforming was not being used. The high gain beams could also be used to overcome a high MCL, which may be experienced in some mMTC use cases, e.g., a sensor network deployment that requires the RF signals to penetrate through walls or other building materials.

Optimizations for Mobility Management

When performing intra-cell mobility, it is envisaged that an L2-based beam management procedure is used. If the beams originating from the same TRP experience the same propagation delay, then a "rach-less" procedure may be used for intra-TRP mobility. Beam management commands signaled via the serving beam(s) may be used to add/remove serving beams as the UE moves throughout the coverage area of the TRP.

Beams originating from different TRPs may not experience the same propagation delay. It is envisaged that the random access procedure is used to establish UL synchronization when performing inter-TRP mobility. A contention-based random access procedure may be used to enable UE based inter-TRP mobility. It is envisaged that Msg3 of the random access procedure signals a beam management command that is used to request the configuration of a new serving beam between the UE and the target TRP. Msg4 of the random access procedure may then be used to ACK/NACK the request. In one embodiment, the request includes the Beam Id of the DL beam the UE is requesting to add and Msg4 includes an ACK/NACK for the request. Alternatively, the request may include a request indication and Msg4 may include the Beam Id of the new DL serving beam.

A non-contention based random access procedure may be used to enable NW based inter-TRP mobility. Beam management commands signaled via the serving beam(s) may be used to signal the Beam ID of the DL beam to add and the dedicated random access parameters to use when performing the non-contention based random access procedure. Alternatively, to reduce the latency and signaling overhead, a two-step random access procedure may be used for intra-cell mobility management. The beam management commands signaled via Msg3 in the previous embodiments may be "piggy backed" with the preamble transmission and the beam management commands signaled via Msg4 may be signaled via Msg2. When performing inter-cell mobility, RRC signaling carried via the non-contention based random access procedure may be used.

Measurement Model for Beam Sweeping NR Networks

Figure 44:
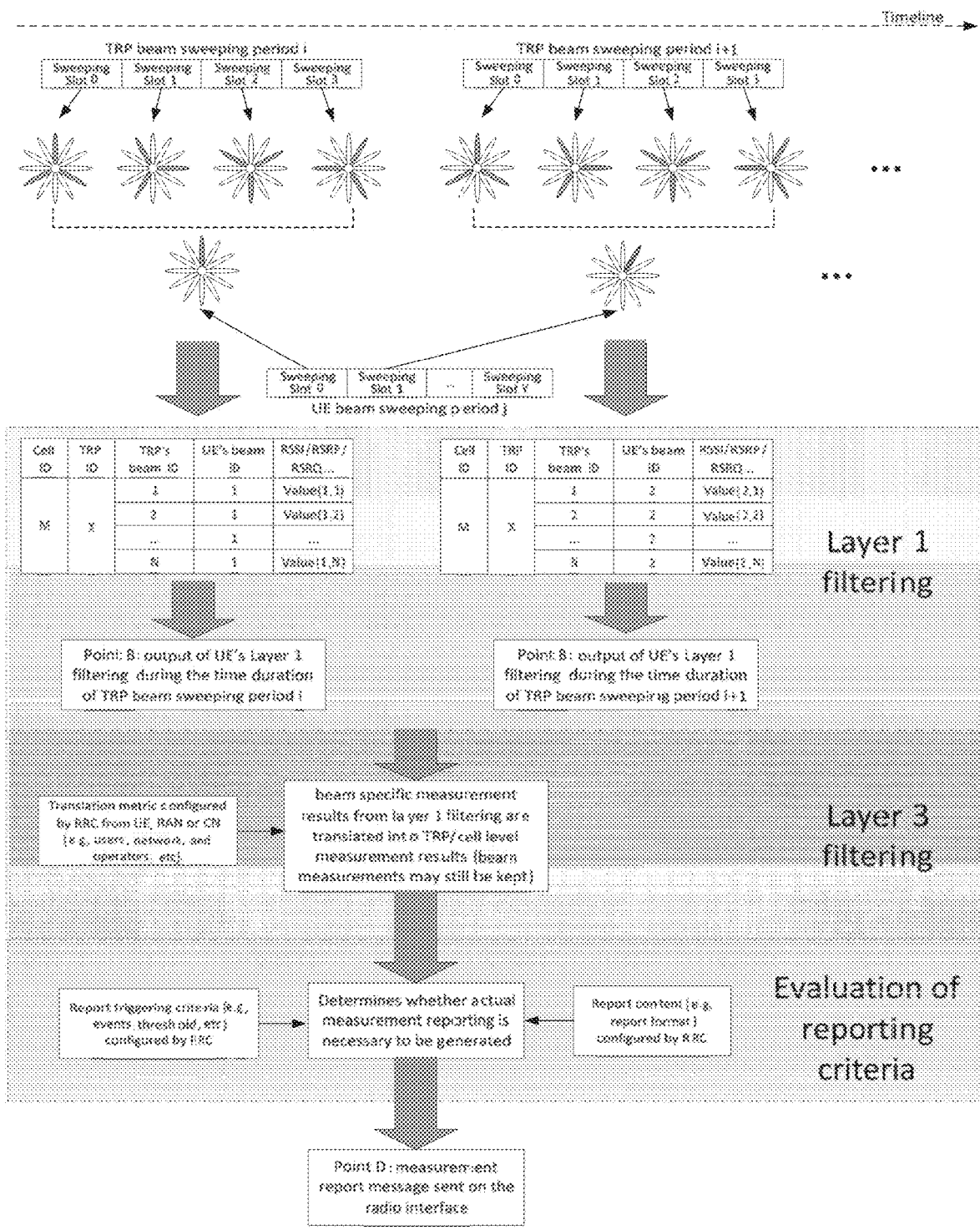
FIG. 44 is a diagram of a proposed measurement model for beam sweeping NR networks.

In the 5G new radio interface operating in mmWave frequency bands, all the mobility-related procedures of legacy LTE should be reconsidered from the perspective of beams. It is especially important to carefully investigate the effects of the beams on measurements, which are performed by a UE for various purposes (e.g., cell addition/deletion and handover). In this section, beam-based operations and a measurement model for beam sweeping NR networks are described in view of the measurement model in LTE. FIG. 44 is a diagram of a proposed measurement model for beam sweeping NR networks and described below in more detail.

In HF-NR with beam operations, a cell is covered by multiple beams either provided by one TRP or multiple TRPs, and each beam has its own reference signal. Measurement on the beam-specific reference signal is used not only by lower layer for beam administration (beam training, beam switching, etc.), but also used for TRP/cell level mobility. When a UE performs measurement on different beams, the UE can derive a set of measurement results with each element corresponding to one beam. It is necessary to determine a consolidation operation on the measurement results of different beams to stand for the overall TRP/cell quality. Based on the measurement model adopted by LTE, the modifications below are proposed:

Layer 1 filtering:

As shown in FIG. 44, beam-based measurements are added into the Layer 1 filtering, with distinguishable cell ID, TRP ID and beam ID. In this Layer 3 filtering, the raw beam specific measurement results from layer 1 filtering are translated into TRP/cell level measurement results. Some candidate translation metrics are listed below:

1. The averaged or weighted moving averaged RSRP/RSRQ/RS-SINR/RSSI of the best beam.

2. The averaged or weighted moving averaged RSRP/RSRQ/RS-SINR/RSSI of N-best beams (N>=1, the weight could be the same or different).

3. The averaged or weighted moving averaged RSRP/RSRQ/RS-SINR/RSSI of all detected beams.

4. The averaged or weighted moving averaged RSRP/RSRQ/RS-SINR/RSSI of the beams with RSRP above a threshold.

5. The aggregate RSRP/RSRQ/RS-SINR/RSSI of the beams with RSRP/RSRQ/RS-SINR/RSSI above a threshold.

6. The number of beams with RSRP/RSRQ/RS-SINR/RSSI above a threshold.

Depending on the UE category and use cases, these metrics may be used differently. That is, various UEs may have different RF/computing/memory capabilities. For example, metrics may be switched via RRC (re)configurations, or configured by operators or manufactures statically and saved into on-chip memory. In addition, different use cases (e.g. eMBB, mMTC, URLLC) in NR also prefer a flexible use of those metrics. For example, mMTC devices focus more on energy efficiency than data rate, and RRC (re)configurations are costly from overhead point of view and are also relatively slow. As a result, different impacts on PHY and RRC of those metrics are therefore suggested to be carefully considered during implementation. Below is an example of comparisons between the first three metrics.

Best Beam

Description: RRC takes the results of the best beam as the results of the corresponding cell/TRP. In this way, all the existing cell based measurement reporting criteria in LTE can be reused. Impacts on PHY and RRC: Simple for both PHY and RRC; beams are transparent to RRC; In this way, all the existing cell based measurement reporting criteria and procedures in LTE can be reused.

N Beams

Description: Average measurement results of the N beams from PHY to RRC for each individual cell/TRP. RRC takes the average results as the results of the corresponding cell. Impacts on PHY and RRC: Some average criteria for the N beams needs to be introduced in PHY (Maybe need not to be specified, just left to PHY implementation); Simple for RRC: beams are transparent to RRC; all the existing cell based measurement reporting criteria and procedures in LTE still can be reused.

All Detected Beams

Description: Measurement results of all the detected beams from PHY to RRC for each individual cell/TRP. RRC gets all the raw beam specific measurement results. Impacts on PHY and RRC: Simple for PHY, but complex to RRC since RRC process all the beam specific measurement results (not scalable when the number of detected beams is big); Some methods of filtering are needed to transfer these beam specific measurement results to cell specific measurement results before performing the cell/TRP based measurement reporting criteria. Some new measurement reporting criteria based on these beam specific measurement results should be introduced.

Proposed Measurement Reporting Configurations:

The following measurement configurations (provided to the UE) are proposed and include the parameters below:

Reporting Configurations: A list of reporting configurations where each reporting configuration consists of the following:

Reporting criterion: The criterion that triggers the UE to send a measurement report. This can either be periodical or a single event description.

Reporting format: The quantities that the UE includes in the measurement report and associated information (e.g. number of cells to report).

In the case of event-based measurement reports, a group of triggering events have been defined (e.g., A1~A6, etc.). In NR, it is envisaged that similar reporting criteria should be also included. An efficient design of the reporting criteria could potentially reduce unnecessary signal overhead and interference in the air interface, and still maintain prompt, accurate and reliable measurement results to facilitate mobility decision. Examples of report triggering criteria in NR may include one or several of the following:

Event NR-A1: Serving beam or/and TRP becomes better than a threshold. This event may be used to trigger sending of measurement report or not.

Examples of entering and leaving conditions can be defined as: Ms−Hys>Thresh (entering condition) and Ms+Hys<Thresh (leaving condition).

Ms is the measurement result of the serving beam (for simultaneous use of multiple beams, some sort of weighted average method could be used and implementation dependent), not taking into account any offsets. In the case of TRP evaluation, Ms can be measurement result of the serving TRP where the serving beam belongs to, and the value of Ms can be translated from beam level measurements by using the selected translation metric (see above layer 3 filtering).

Hys is the hysteresis parameter for this event. In case the measured value of Ms is fluctuating around the target value (Thresh), measurement report would not be triggered unless the fluctuation is wider than Hys.

Thresh is the threshold parameter for this event.

Ms is expressed in dBm in case of RSRP and RSSI, or in dB in case of RSRQ and RS-SINR.

Hys is expressed in dB.

Thresh is expressed in the same unit as Ms.

When the entering condition is satisfied, measurement report could be temporarily stopped sending so that to reduce signal overhead and interference in the network, and energy usage of the UE. When the leaving condition is satisfied, measurement report could be resumed sending unless other events/triggers need to be evaluated.

Event NR-A2: Serving beam or/and TRP become worse than threshold1 and neighbor beams or/and TRPs become better than threshold2. This event may be used to trigger the beginning of intra-TRP, inter-TRP and inter-cell mobility evaluation (beam level or TRP/cell level).

Example of entering and leaving conditions can be defined as: Ms+Hys<Thresh1 (entering condition 1), Mn+Ofn+Ocn−Hysh>Thresh2 (entering condition 2), Ms−Hys>Thresh1 (leaving condition 1) and Mn+Ofn+Ocn+Hys<Thresh2 (leaving condition 2).

Ms and Hys are the same as the event NR-A1.

Mn is the measurement result of the neighboring beams, not taking into account any offsets. In the case of neighboring TRPs evaluation, Mn can be measurement result of the neighboring TRPs where the neighboring beams belong to, and the value of Mn can be translated from beam level measurements by using the selected translation metric (see above layer 3 filtering).

Ofn is the frequency specific offset of the frequency of the neighbor beams. Different frequencies may have different value of Ofn. This value may be configurable so that operators or networks can provide preferences for some frequencies.

Ocn is the TRP/cell specific offset of the neighboring beams, and set to zero if not configured for the neighbor TRPs/cells. This value may be configurable so that operators or networks can provide preferences for some TRPs/cells.

Ofn, Ocn, Hys are expressed in dB.

Thresh1 is expressed in the same unit as Ms. Thresh2 is expressed in the same unit as Mn.

When entering condition 1 and 2 are both satisfied, UE may send measurement report more frequently, and if this condition has been satisfied for a timer defined duration, beam level, TRP level or even cell level mobility decision may be made based on the selected neighboring beams, TRPs and cells. When leaving condition 1 or 2 is satisfied, UE may go back to the measurement report behaviour before enters this event.

Event NR-A3: Serving beam or/and TRP becomes worse than a threshold. This event may be used to trigger mobility decision immediately, without requiring to be satisfied for a predefined time duration.

Example entering and leaving condition can be defined as: Ms+Hys<Thresh (entering condition) and Ms−Hys>Thresh (leaving condition).

Ms, Hys, Thresh are the same as the event NR-A1.

When the entering condition is satisfied, it means the quality of the serving beam may be significantly lower than a value, immediate beam switching is suggested. When the leaving condition is satisfied, other report evaluation criteria before this event may be resumed, such as continually measuring the quality of the serving beam for a time duration as defined in the event NR-A2.

The measurement event could be based on the expiry of a periodic timer. This may apply to periodic measurement report. The UE may be configured with a periodic measurement report timer for a given measurement configuration.

Content of measurement report at point D:

Include not only the measured cell information (e.g., NR cell ID) but also the measured TRP/beam information (e.g., TRP ID, beam ID) which satisfy the measurement reporting criteria. It may also include the TRPs (beams or cells) where the UE experience radio link failure or weak signal quality.

Figure 18:
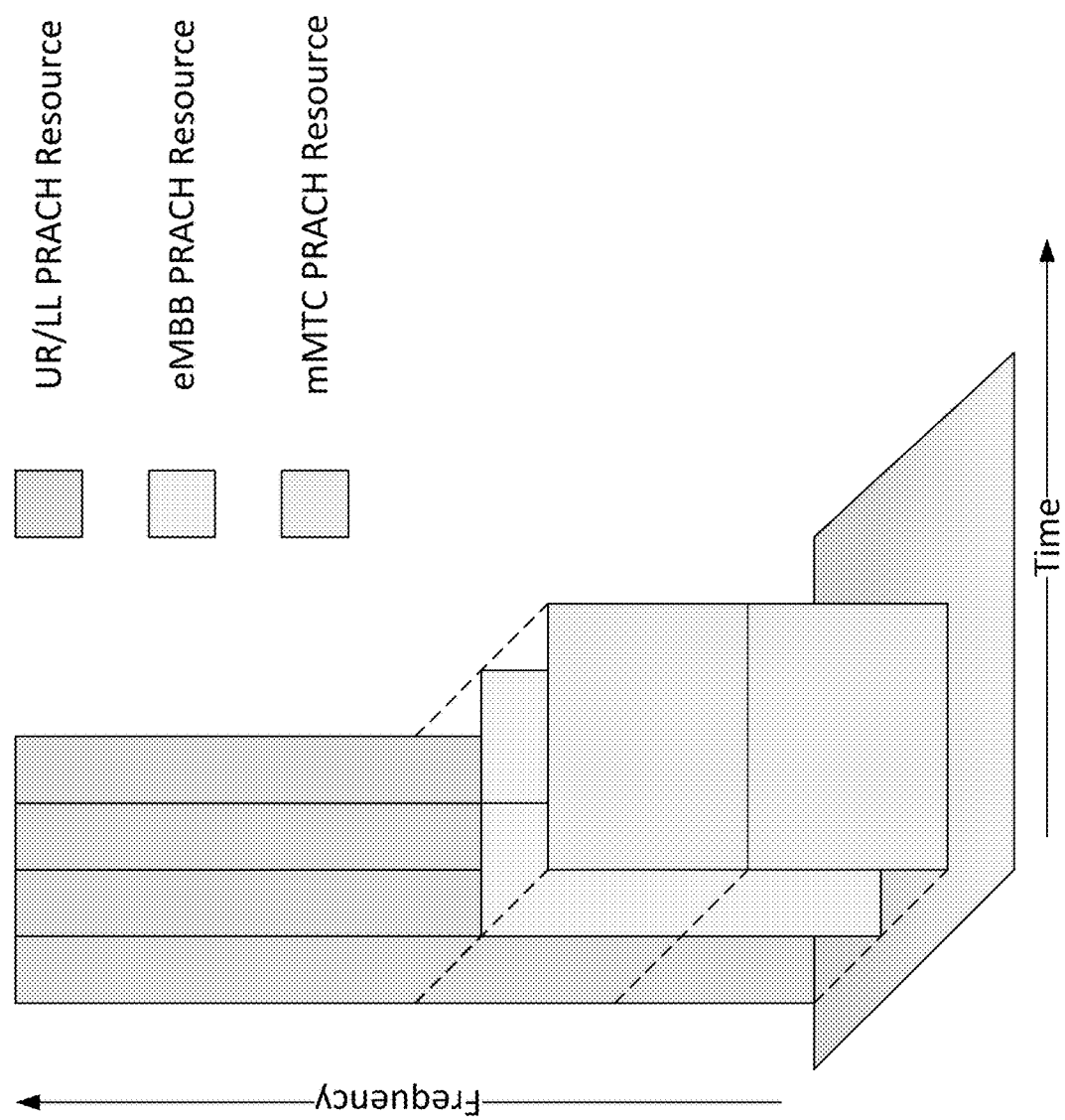
FIG. 18 is a diagram that illustrates an Exemplary Common PRACH Resource Configuration with "Stacked" mMTC PRACH Resources.

It is understood that the entities performing the steps illustrated in FIG. 18 may be logical entities that may be implemented in the form of software (i.e., computer-executable instructions) stored in a memory of, and executing on a processor of, an apparatus configured for wireless and/or network communications or a computer system such as those illustrated in FIGS. 1B and F. That is, the method(s) illustrated in FIG. 18 may be implemented in the form of software (i.e., computer-executable instructions) stored in a memory of an apparatus, such as the apparatus or computer system illustrated in FIGS. 1B and F, which computer executable instructions, when executed by a processor of the apparatus, perform the steps illustrated in FIGS. 20-24.

Figure 45:
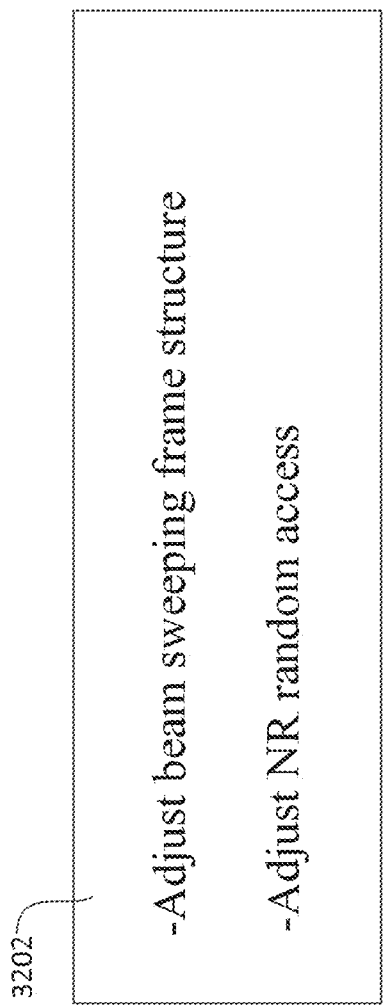
FIG. 45 is a diagram of a Graphical User Interface of an embodiment.

Interfaces, such GUIs, can be used to assist user to control and/or configure functionalities related to beam sweeping frame structure and NR random access. FIG. 45 is a diagram that illustrates an interface 3202 that allows a user to view and configure functionalities related to beam sweeping frame structure and NR random access. It is to be understood that interface 3202 can be produced using displays such as those shown in FIGS. 1C-D.

Figure 46:
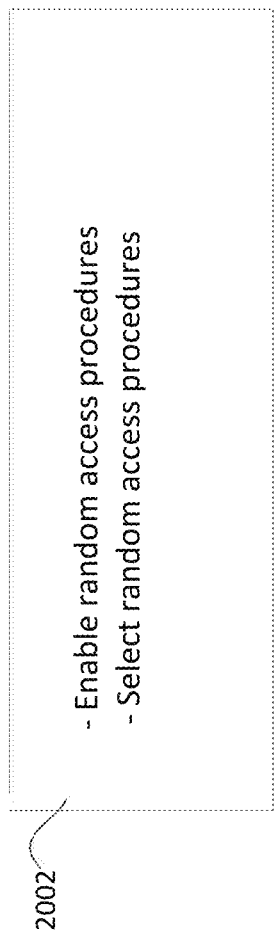
FIG. 46 is a diagram of a Graphical User Interface of another embodiment.

FIG. 46 is a diagram that illustrates a GUI 2002 that allows a user to input parameters corresponding to an index value. It is to be understood that interface 2002 can be produced using displays such as those shown in FIGS. 1B and 1F, which computer executable instructions, when executed by a processor of the apparatus, perform the steps illustrated in FIGS. 20-24.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed:

1. An apparatus comprising:
a non-transitory memory including instructions to perform random access in a beam sweeping network having a cell, the network including a downlink sweeping subframe, an uplink sweeping subframe and a regular subframes; and
a processor operably coupled to the non-transitory memory and configured to execute the instructions of:
selecting an optimal downlink transmission beam transmitted by the cell during the downlink sweeping subframe,
determining an optimal downlink reception beam from the optimal downlink transmission beam, and
determining a random access preamble and a physical random access channel (PRACH) resource associated with the optimal downlink transmission beam.

2. The apparatus of claim 1, wherein the random access preamble is selected at random from a set of random access preambles associated with the optimal downlink transmission beam.

3. The apparatus of claim 2, wherein the preamble successively includes a cyclic prefix period, Zadoff-Chu sequence period and a guard period.

4. The apparatus of claim 2, wherein the set of random access preambles are partitioned among all beams.

5. The apparatus of claim 1, wherein the processor is further configured to execute the instructions of:
monitoring a downlink control channel for a random access response (RAR), and
receiving the RAR from the node.

6. The apparatus of claim 1, wherein
the PRACH resources are configured during uplink sweeping slots of the uplink subframe, and
a time resource of the PRACH resource is determined by the optimal downlink transmission beam.

7. The apparatus of claim 5, wherein
the monitoring instruction proceeds for a period including one or more downlink sweeping subframes, and
the monitoring instruction includes identifying a RA-RNTI Random Access Radio Network Temporary Identifier of a RAR.

8. The apparatus of claim 7, wherein the RAR includes a random access preamble identifier matching the transmitted random access preamble.

9. The apparatus of claim 1, wherein the network is new radio (NR) and the cell is a NR cell.

10. An apparatus comprising:
a non-transitory memory including instructions to perform random access; and
a processor operably coupled to the non-transitory memory and configured to execute the instructions of:
obtaining configuration parameters for a common physical random access channel (PRACH) resource on a network,
selecting a preamble from a cell based upon a device type and a service type,
transmitting, to a node, the selected preamble via the common PRACH resource, and
monitoring, based on the transmission, a downlink control channel for a random access responses (RAR).

11. The apparatus of claim 10, wherein a set of preambles including the selected preamble are partitioned into service-specific subsets.

12. The apparatus of claim 11, wherein
the service-specific subsets are mMTC, eMBB or UR/LL or combinations thereof, and
the selected preamble is randomly selected from one of the service-specific subsets.

13. The apparatus of claim 10, wherein the RAR includes a timing advance command representing a change in uplink timing relative to current uplink timing.

14. The apparatus of claim 10, wherein
the processor is further configured to execute the instructions of transmitting a message to establish a connection, and
the message includes an establishment cause information element selected from mMTCAccess, eMBBAccess, URLLAccess or combinations thereof.

15. An apparatus comprising:
a non-transitory memory including instructions to perform random access; and
a processor operably coupled to the non-transitory memory and configured to execute the instructions of:
obtaining configuration parameters for a slice-specific physical random access channel (PRACH) resource;
randomly selecting a preamble from a slice of the network based upon a device type and a service type;
transmitting, to a node, the randomly selected preamble via the slice-specific PRACH resource; and
monitoring, based on the transmission, a downlink control channel for a random access response (RAR).

16. The apparatus of claim 15, wherein
the PRACH resource is dedicated, and
the configuration parameters are obtained via an extended radio resource configuration common information element.

17. The apparatus of claim 15, wherein
the preamble includes a cyclic prefix and a preamble sequence, and
the preamble sequence successively includes a cyclic prefix period, Zadoff-Chu sequence period and a guard period.

18. The apparatus of claim 15, wherein
the cell includes contention preambles,
the monitoring instructions include determining a size of the RAR via a slice-specific response window size, and
the RAR includes a timing advance command indicating a change in uplink timing relative to current uplink timing.

19. The apparatus of claim 15, wherein the processor is further configured to execute the instructions of:
transmitting a message including an establishment cause information element to establish a connection, and
receiving a contention resolution from the node.

20. An apparatus comprising:
a non-transitory memory including instructions to perform random access; and
a processor operably coupled to the non-transitory memory and configured to execute the instructions of:
selecting a preamble from a cell based upon a device type and a service type;
transmitting the selected preamble and an accompanying grantless message;
monitoring a downlink control channel for a random access response (RAR);
receiving, from a node, a connection setup message and an uplink grant; and
transmitting, via the received uplink grant, a status message on a connection.

21. An apparatus comprising:
a non-transitory memory including instructions to perform random access in a beam sweeping network having a cell, the network including a downlink sweeping subframe, an uplink sweeping subframe and a regular subframes; and
a processor operably coupled to the non-transitory memory and configured to execute the instructions of:
selecting a first downlink transmission beam transmitted by the cell during the downlink sweeping subframe,
determining a first downlink reception beam from the first downlink transmission beam, and
determining a first random access preamble and a physical random access channel (PRACH) resource associated with the first downlink transmission beam,
wherein the first random access preamble is selected at random from a set of random access preambles associated with the optimal downlink transmission beam, and
wherein the PRACH resource is configured during uplink sweeping slots of the uplink subframe, and a time resource of the PRACH resource is determined by the first downlink transmission beam.

* * * * *